United States Patent
Ganapathiappan et al.

(10) Patent No.: US 10,293,457 B2
(45) Date of Patent: May 21, 2019

(54) POROUS CHEMICAL MECHANICAL POLISHING PADS

(71) Applicant: Applied Materials, Inc., Santa Clara, CA (US)

(72) Inventors: Sivapackia Ganapathiappan, Los Altos, CA (US); Nag B. Patibandla, Pleasanton, CA (US); Rajeev Bajaj, Fremont, CA (US); Daniel Redfield, Morgan Hill, CA (US); Fred C. Redeker, Fremont, CA (US); Mahendra C. Orilall, Downington, PA (US); Boyi Fu, San Jose, CA (US); Mayu Yamamura, San Carlos, CA (US); Ashwin Chockalingam, San Jose, CA (US)

(73) Assignee: APPLIED MATERIALS, INC., Santa Clara, CA (US)

(*) Notice: Subject to any disclaimer, the term of this patent is extended or adjusted under 35 U.S.C. 154(b) by 90 days.

(21) Appl. No.: 15/394,044

(22) Filed: Dec. 29, 2016

(65) Prior Publication Data

US 2017/0203406 A1    Jul. 20, 2017

Related U.S. Application Data

(60) Provisional application No. 62/380,015, filed on Aug. 26, 2016, provisional application No. 62/331,234, (Continued)

(51) Int. Cl.
*B24D 3/20* (2006.01)
*B24D 3/28* (2006.01)
(Continued)

(52) U.S. Cl.
CPC .............. *B24B 37/22* (2013.01); *B24B 37/24* (2013.01); *B24B 37/26* (2013.01); *B33Y 10/00* (2014.12); *B33Y 80/00* (2014.12)

(58) Field of Classification Search
CPC ......... B24B 37/22; B24B 37/24; B24B 37/26; B33Y 10/00; B33Y 80/00; B24D 3/20; B24D 3/28; B24D 11/001; B24D 11/02
See application file for complete search history.

(56) References Cited

U.S. PATENT DOCUMENTS

| 5,387,380 A | 2/1995 | Cima et al. |
| 5,900,164 A | 5/1999 | Budinger et al. |

(Continued)

FOREIGN PATENT DOCUMENTS

| EP | 2431157 A1 | 3/2012 |
| WO | 03/103959 A1 | 12/2003 |

(Continued)

OTHER PUBLICATIONS

International Search Report and Written Opinion in related application PCT/US2016069193 dated Apr. 11, 2017.

*Primary Examiner* — Pegah Parvini
(74) *Attorney, Agent, or Firm* — Patterson + Sheridan LLP

(57) ABSTRACT

Implementations disclosed herein generally relate to polishing articles and methods for manufacturing polishing articles used in polishing processes. More specifically, implementations disclosed herein relate to porous polishing pads produced by processes that yield improved polishing pad properties and performance, including tunable performance. Additive manufacturing processes, such as three-dimensional printing processes provides the ability to make porous polishing pads with unique properties and attributes.

20 Claims, 18 Drawing Sheets

Related U.S. Application Data filed on May 3, 2016, provisional application No. 62/280,537, filed on Jan. 19, 2016.

(51) Int. Cl.
*B24D 11/02* (2006.01)
*B24B 37/22* (2012.01)
*B24B 37/24* (2012.01)
*B24B 37/26* (2012.01)
*B33Y 10/00* (2015.01)
*B33Y 80/00* (2015.01)

(56) References Cited

U.S. PATENT DOCUMENTS

| | | | |
|---|---|---|---|
| 5,932,290 | A | 8/1999 | Lombardi et al. |
| 5,940,674 | A | 8/1999 | Sachs et al. |
| 6,155,910 | A * | 12/2000 | Lamphere ............. B24B 7/24 451/41 |
| 6,423,255 | B1 | 7/2002 | Hoechsmann et al. |
| 6,641,471 | B1 | 11/2003 | Pinheiro et al. |
| 7,530,880 | B2 | 5/2009 | Bajaj et al. |
| 7,531,117 | B2 | 5/2009 | Ederer et al. |
| 7,815,778 | B2 | 10/2010 | Bajaj |
| 7,846,008 | B2 | 12/2010 | Bajaj |
| 8,066,555 | B2 | 11/2011 | Bajaj |
| 8,075,745 | B2 | 12/2011 | Bajaj |
| 8,142,860 | B2 | 3/2012 | Vanmaele et al. |
| 8,177,603 | B2 | 5/2012 | Bajaj |
| 8,292,692 | B2 | 10/2012 | Bajaj |
| 8,715,035 | B2 | 5/2014 | Roy et al. |
| 9,162,340 | B2 | 10/2015 | Joseph et al. |
| 9,630,249 | B2 | 4/2017 | Toyserkani et al. |
| 9,993,907 | B2 | 6/2018 | Murugesh et al. |
| 2004/0055223 | A1 * | 3/2004 | Ono ............. B24B 37/22 51/293 |
| 2004/0154533 | A1 | 8/2004 | Agarwal et al. |
| 2005/0110853 | A1 | 5/2005 | Gardner et al. |
| 2006/0019587 | A1 | 1/2006 | Deopura et al. |
| 2006/0052040 | A1 | 3/2006 | Prasad |
| 2006/0192315 | A1 | 8/2006 | Farr et al. |
| 2006/0226567 | A1 | 10/2006 | James et al. |
| 2007/0117393 | A1 | 5/2007 | Tregub et al. |
| 2007/0128991 | A1 | 6/2007 | Yoon et al. |
| 2007/0235904 | A1 | 10/2007 | Saikin |
| 2008/0157436 | A1 | 7/2008 | Patel |
| 2009/0093201 | A1 | 4/2009 | Kazuno et al. |
| 2009/0321979 | A1 | 12/2009 | Hiraide |
| 2010/0323050 | A1 | 12/2010 | Kumagai et al. |
| 2011/0059247 | A1 | 3/2011 | Kuzusako et al. |
| 2012/0315830 | A1 | 12/2012 | Joseph et al. |
| 2013/0012108 | A1 | 1/2013 | Li et al. |
| 2013/0017769 | A1 | 1/2013 | Kimura |
| 2013/0283700 | A1 * | 10/2013 | Bajaj ............. B24B 37/26 51/295 |
| 2014/0239527 | A1 | 8/2014 | Lee |
| 2015/0056895 | A1 | 2/2015 | Fotou et al. |
| 2015/0174826 | A1 | 6/2015 | Murugesh et al. |
| 2015/0216790 | A1 | 8/2015 | Feng et al. |
| 2016/0107288 | A1 | 4/2016 | Orilall et al. |
| 2016/0229023 | A1 | 8/2016 | Lugg et al. |
| 2018/0236632 | A1 | 8/2018 | Murugesh et al. |

FOREIGN PATENT DOCUMENTS

| | | |
|---|---|---|
| WO | 2009158665 A1 | 12/2009 |
| WO | 2011/088057 A1 | 7/2011 |
| WO | 2013162856 A1 | 10/2013 |
| WO | 2015/111366 A1 | 7/2015 |
| WO | 2015/120430 A1 | 8/2015 |

* cited by examiner

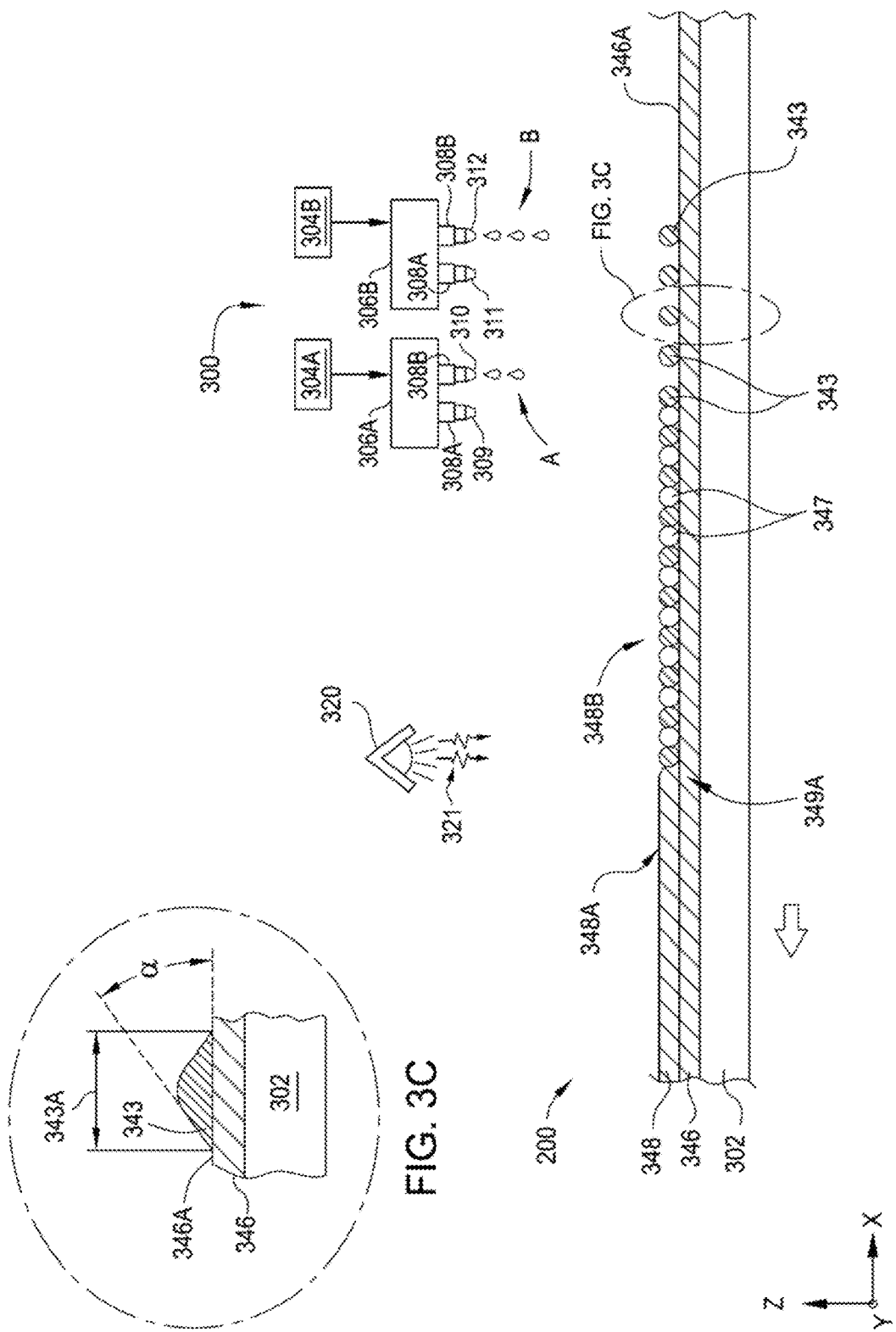

5X5  4X4  3X3

2X2

1X1

POROUS CHEMICAL MECHANICAL POLISHING PADS

CROSS-REFERENCE TO RELATED APPLICATIONS

This application claims the benefit of U.S. provisional patent application Ser. No. 62/280,537, filed Jan. 19, 2016, the benefit of U.S. provisional patent application Ser. No. 62/331,234, filed May 3, 2016, and the benefit of U.S. provisional patent application Ser. No. 62/380,015, filed Aug. 26, 2016. The aforementioned related patent applications are incorporated herein by reference in their entirety.

BACKGROUND

Field

Implementations disclosed herein generally relate to polishing articles and methods for manufacturing polishing articles used in polishing processes. More specifically, implementations disclosed herein relate to porous polishing pads produced by processes that yield improved polishing pad properties and performance, including tunable performance.

Description of the Related Art

Chemical mechanical polishing (CMP) is a conventional process used in many different industries to planarize surfaces of substrates. In the semiconductor industry, uniformity of polishing and planarization has become increasingly significant as device feature sizes continue to decrease. During a CMP process, a substrate, such as a silicon wafer, is mounted on a carrier head with the device surface placed against a rotating polishing pad. The carrier head provides a controllable load on the substrate to push the device surface against the polishing pad. A polishing liquid, such as slurry with abrasive particles, is typically supplied to the surface of the moving polishing pad and polishing head. The polishing pad and polishing head apply mechanical energy to the substrate, while the pad also helps to control the transport of slurry, which interacts with the substrate during the polishing process.

A conventional polishing pad is typically made by molding, casting or sintering polymeric materials that include polyurethane materials. In the case of molding, polishing pads can be made one at a time, e.g., by injection molding. In the case of casting, the liquid precursor is cast and cured into a cake, which is subsequently sliced into individual pad pieces. These pad pieces can then be machined to a final thickness. Pad surface features, including grooves, which aid in slurry transport, can be machined into the polishing surface, or be formed as part of the injection molding process.

Polishing pads made of harder materials often exhibit high removal rates and have long useful pad life, but undesirably tend to form numerous scratches on the substrate being polished. Polishing pads made of softer materials exhibit low scratching of substrates, but tend to exhibit lower removal rates and have shorter useful pad life.

In the case of porous polishing pads, open pore structures may be introduced into the pad via methods including poromerics and closed pore structures may be introduced into the pad via methods including blending with microspheres, frothing, microcellular foaming, blending with water-soluble spherical particles, and embedding with mineral oil. These methods of manufacturing polishing pads are expensive and time consuming, and often yield non-uniform polishing results due to the difficulties in the production and control of the pad surface feature dimensions. Non-uniformity has become increasingly significant as the dimensions of IC devices and feature sizes continue to shrink.

Accordingly, there remains a need in the art for polishing pads and methods of manufacturing polishing pads that provide uniform removal rates, have extended pad life, and minimizes scratching of the polished substrate.

SUMMARY

Implementations disclosed herein generally relate to polishing articles and methods for manufacturing polishing articles used in polishing processes. More specifically, implementations disclosed herein relate to porous polishing pads produced by processes that yield improved polishing pad properties and performance. In one implementation, a resin precursor composition is provided. The resin precursor composition comprises a first resin precursor component that comprises a multifunctional acrylate oligomer, a second resin precursor component that comprises a multifunctional acrylate monomer, a surfactant and a porosity-forming agent. In one configuration, the porosity-forming agent includes water. The first precursor formulation has a first viscosity that enables the first precursor formulation to be dispensed to form a portion of the polishing article by use of an additive manufacturing process.

In another implementation, a composition for forming a porous polishing pad is provided. In another implementation, a porous polishing pad is provided. The porous polishing pad is formed from a resin precursor composition comprising a first resin precursor component that comprises a multifunctional acrylate oligomer, a second resin precursor component that comprises a multifunctional acrylate monomer, a surfactant and a porosity-forming agent. The first precursor formulation has a first viscosity that enables the first precursor formulation to be dispensed to form a portion of the polishing article by use of an additive manufacturing process.

In yet another implementation, a method of forming a porous polishing pad is provided. The method comprises depositing a plurality of composite layers with a 3D printer to reach a target thickness. Depositing the plurality of composite layers comprises dispensing one or more droplets of a curable resin precursor composition onto a support. The curable resin precursor composition comprises a first resin precursor component that includes a multifunctional acrylate oligomer, a second resin precursor component that comprises a multifunctional acrylate monomer, a surfactant and a porosity-forming agent. The curable resin precursor composition has a first viscosity that enables the curable resin precursor composition to be dispensed to form a portion of the polishing pad by use of an additive manufacturing process. Depositing further comprises exposing the dispensed first droplet of the curable resin precursor composition to electromagnetic radiation for a first time period partially curing the curable resin precursor composition, repeating the dispensing, and exposing to build a 3D-relief on the support. The method further comprises solidifying the plurality of composite layers to form a porous pad body.

In one implementation, the porosity-forming agent is vaporizable. In one implementation, the porosity-forming agent is selected from the group of water, water-soluble inert materials, water-containing hydrophilic polymers, hydrophilic polymerizable monomers, and combinations thereof.

In one implementation, the porosity-forming agent contains ionic surfactants, glycols, or mixtures thereof. The ionic surfactants include, for example, ammonium-based salts. Exemplary salts include tetrabutylammonium tetrabutylborate, tetrafluoroborate, hexafluorophosphate, tetrabutylammonium benzoate, or combinations thereof. Exemplary glycols include diethylene glycol and propylene glycol. This non-reactive ionic surfactant/glycol mixture is dispersed into photo-curable ink formulations. After curing, nano-sized and micro-sized mixture drops are trapped in the cured materials. During CMP polishing, mixture drops dissolve into the polishing slurry leaving porous features in the CMP surface. This benefits pad surface interaction with slurry and slurry nanoparticle loading on pads; and in turn, enhances polishing removing rates and reduces the wafer-to-wafer removing rate deviation. Introduction of cationic materials can also bond to the polymer chain by Norrish Type II reactions and further enhancing the positive zeta potential of the pad.

In yet another implementation, a method of forming a porous polishing pad is provided. The method comprises depositing a plurality of composite layers with a 3D printer to reach a target thickness. Depositing the plurality of composite layers comprises dispensing one or more droplets of a curable resin precursor composition onto a support and dispensing one or more droplets of a porosity-forming composition onto the support, wherein at least one component of the porosity-forming composition is removable to form the pores in the porous polishing pad.

In yet another implementation, a method of forming a porous polishing pad is provided. The method comprises depositing a plurality of composite layers with a 3D printer to reach a target thickness and solidifying the plurality of composite layers to form a porous pad body. Depositing the plurality of composite layers comprises dispensing one or more droplets of a curable resin precursor composition onto a support. The curable resin precursor composition comprises a first resin precursor component that comprises a multifunctional acrylate oligomer, a second resin precursor component that comprise a multifunctional acrylate monomer, a surfactant and a porosity-forming agent. Depositing the plurality of composite layers further comprises exposing the one or more droplets of the curable resin precursor composition to electromagnetic radiation to at least partially cure the curable resin precursor composition and repeating the dispensing and exposing to build a 3D-relief on the support.

In yet another implementation, a resin precursor composition is provided. The resin precursor composition comprises a first precursor formulation. The first precursor composition comprises a first resin precursor component that comprises a multifunctional acrylate oligomer, a second resin precursor component that comprises a multifunctional acrylate monomer, a surfactant and water. The first resin precursor formulation has a viscosity that enables the first precursor formulation to be dispensed to form a portion of a polishing article by use of an additive manufacturing process.

BRIEF DESCRIPTION OF THE DRAWINGS

So that the manner in which the above-recited features of the present disclosure can be understood in detail, a more particular description of the implementations, briefly summarized above, may be had by reference to implementations, some of which are illustrated in the appended drawings. It is to be noted, however, that the appended drawings illustrate only typical implementations of this disclosure and are therefore not to be considered limiting of its scope, for the disclosure may admit to other equally effective implementations.

FIG. 3B is a schematic view of a portion of the system illustrated in FIG. 3A, according to an implementation of the present disclosure;

FIG. 3C is a schematic view of a dispensed droplet disposed on a surface of a region of the porous polishing pad illustrated in FIG. 3B, according to an implementation of the present disclosure;

Figure 1:
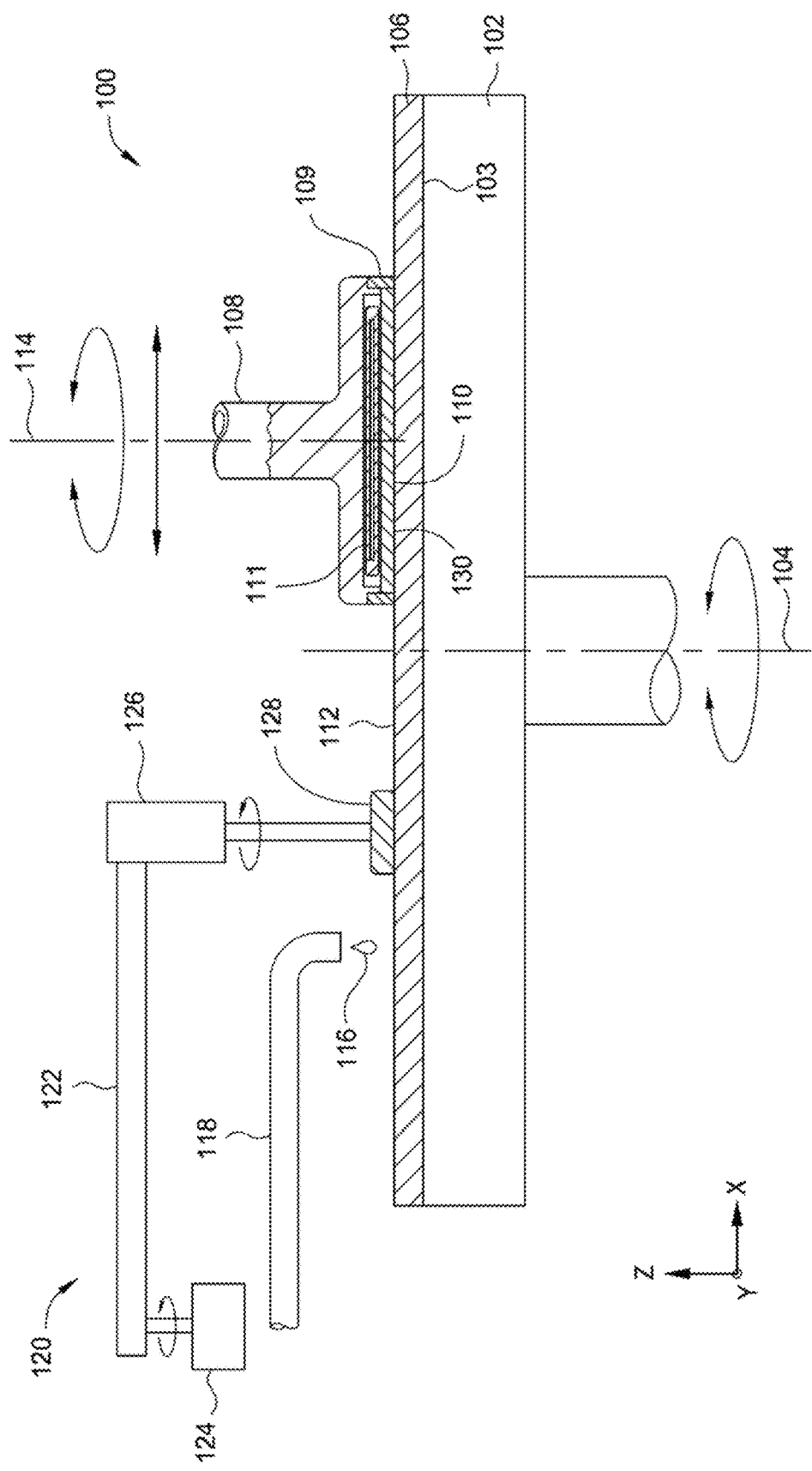
FIG. 1 is a schematic sectional view of a polishing station having a porous polishing pad formed according to implementations described herein.

To facilitate understanding, identical reference numerals have been used, where possible, to designate identical elements that are common to the figures. It is contemplated that elements and features of one implementation may be beneficially incorporated in other implementations without further recitation.

DETAILED DESCRIPTION

Implementations disclosed herein generally relate to polishing articles and methods for manufacturing polishing articles used in polishing processes. More specifically, implementations disclosed herein relate to porous polishing pads produced by processes that yield improved polishing pad properties and performance, including tunable performance. Additive manufacturing processes, such as three-dimensional printing ("3D printing") processes provide the ability to make polishing pads with unique properties and attributes. Implementations of the present disclosure provide an advanced polishing pad that has discrete features and geometries, formed from at least two different materials that are formed from liquid polymer precursors, or resin precursor compositions, that contain "resin precursor components." The resin precursor components include, but are not restricted to functional polymers, functional oligomers, monomers, reactive diluents, flow additives, curing agents, photoinitiators, one or more porosity-forming agents, surfactants and cure synergists.

Material and microstructure variations over length scales of a deposited 20-100 micron region are reproducible. This attribute may enable CMP process performance tuning on an unprecedented level. One technique for 3D printing utilizes inkjet technology, which involves dispensing a droplet of a liquid resin precursor composition in a predetermined pattern and curing or solidifying the dispensed precursor material into a solid polymer by exposing the dispensed precursor material to electromagnetic radiation, such as ultraviolet light. Inkjet technology produces microdroplets of precursor material by ejecting precursor materials through a small nozzle (e.g., 10-50 micron diameter). This creates high pressure and shear on the droplet. Additionally 3D printing techniques involve printing material in a layer-by-layer form, where thickness control of each deposited layer is critical.

Typically, complex shapes are created with 3D printing techniques, where the matrix material itself is solid. Implementations described herein, disclose a resin precursor composition for forming porous structures by incorporating one or more liquid porosity-forming agents in the resin precursor composition, which is also referred to herein as the liquid polymer precursor material. While, for simplicity reasons, the discussion below primarily discloses the use of water as the "porosity-forming agent" in a resin precursor composition, this type of porosity-forming agent is not intended to be limiting as to the scope of the disclosure provided herein since other non-miscible liquid components (e.g., organic liquids) may be used in its place within the resin precursor composition. Porosity-forming agents that may be used with the implementations described herein include but are not limited to water, water-soluble inert materials, water-containing hydrophilic polymers, hydrophilic polymerizable monomers, and combinations thereof. In some cases, it is also desirable for the porosity-forming agent to be vaporizable at temperatures below the decomposition temperature of polymer materials used to form the porous polishing pad. In some implementations where the porosity-forming agent is soluble in water or other solvents, the porosity-forming agent may be removed by a rinsing process to form the porous pad structure.

In some implementations described herein, the resin precursor composition further comprises a low hydrophilic lyophilic balance ("HLB") surfactant. In some implementations, since water, or other porosity-forming agents, is immiscible in the liquid polymer precursors found in the resin precursor composition and the water's dispersion may be aided by adding the low HLB surfactant, a uniform dispersion of water droplets can be formed within the resin precursor composition. The type and amount of surfactant used determine the size of porosity-forming agent droplets in the resulting emulsion. The water-liquid polymer precursor emulsion of the resin precursor composition is dispensed through the ink-jet printer and on exposure to energy (e.g., UV light), forms a solid polymer, which encloses porosity-forming agent micro-droplets. The final solidified material may be dried at a temperature below the softening temperature of the solid polymer to eliminate the residual porosity-forming agent, leaving a porous material. In one example, between about 5 wt. % to about 40 wt. % of a porosity-forming agent may be incorporated in the liquid polymer precursor formulation as discussed further below. In another example, between about 5 wt. % to about 30 wt. % of water may be incorporated in the liquid polymer precursor formulation as discussed further below. Suitable low HLB surfactants include, but are not limited to sorbitan stearate (HLB 4.7), polyglyceryl oleate (HLB 5.0), lecithin (HLB approx. 4.0), sorbitan monooleate, glyceryl monooleate, and lanolin & lanolin alcohols.

In some implementations, the porosity-forming agent is deposited separately from the resin precursor formulation. For example, the resin precursor formulation is deposited from a first nozzle and the porosity-forming agent is deposited from a second nozzle. Deposition of the resin precursor formulation and the porosity-forming agent may be followed by at least one of a curing process to form or partially form the porous structure, a rinsing process to remove the porosity-forming agent, and an annealing process to form the final porous structure.

Implementations of the present disclosure further provide polishing articles and methods of forming polishing articles that are porous and have varying regions of zeta potential throughout the surface of the polishing article. The varying regions of zeta potential of the polishing article may be tuned based on the slurry composition systems used and the materials to be polished. This varying zeta potential may be tuned to transport active slurry to the interface between the polishing article and substrate while removing polishing byproducts and contaminants from the interface. For example, in some implementations, the polishing article has a more positive zeta potential near the polishing surface of the polishing article (i.e. the interface between the polishing article and the liquid interface) and a more negative zeta potential near the bottom of a groove of the polishing article. The more positive zeta potential repels unwanted positively charged ions (e.g., metal ions, dielectric material ions) from the liquid interface while the more negative zeta potential attracts the unwanted positive ions toward the bottom of the groove where the collected ions can be removed from the polishing article. In polishing systems where the active slurry contains abrasives having a negative zeta potential (e.g., native silica, such as fumed silica), the abrasives may be attracted to the more positive zeta potential near the polishing surface and correspondingly repelled by the negative potential near the bottom of the groove. In some implementations where the active slurry contains an abrasives having a positive zeta potential (e.g., alumina) the polishing surface may be designed to have a more negative zeta potential relative to other regions of the surface of the polishing article to attract the abrasive to the interface between the polishing article and the liquid interface.

The following disclosure describes a polishing pad for chemical mechanical polishing comprising a porous polymeric material, wherein the polishing pad includes a porous structure. The following disclosure also describes formulations and processes for forming porous polishing pads.

Certain details are set forth in the following description and in FIGS. 1-13 to provide a thorough understanding of various implementations of the disclosure. Other details describing well-known structures and systems often associated with additive manufacturing processes and polishing article manufacturing are not set forth in the following disclosure to avoid unnecessarily obscuring the description of the various implementations. Many of the details, dimensions, angles and other features shown in the Figures are merely illustrative of particular implementations. Accordingly, other implementations can have other details, components, dimensions, angles and features without departing from the spirit or scope of the present disclosure. In addition, further implementations of the disclosure can be practiced without several of the details described below.

It should be understood that although the polishing articles described herein are polishing pads, the implementations describe herein are also applicable to other polishing articles including, for example, buffing pads. Further, although the polishing articles described herein are discussed in relation to a chemical mechanical polishing process, the polishing articles and methods of manufacturing polishing articles described herein are also applicable to other polishing processes including polishing lenses and other processes including both abrasive and non-abrasive slurry systems. In addition, the polishing articles described herein may be used in at least the following industries: aerospace, ceramics, hard disk drive (HDD), MEMS and Nano-Tech, metalworking, optics and electro-optics, and semiconductor, among others.

As will be discussed further below, the porous polishing pads described herein may be formed using an additive manufacturing process, for example, a 3D printing process. In one non-limiting example of a 3D printing process, a layer of the porous polishing pad starts with a thin pattern of droplets of a resin precursor composition that are dispensed on a surface and are then cured to form the polishing article in layer-by-layer fashion. Since 3D printing processes can exercise local control over the material composition, microstructure and surface texture, various (and previously inaccessible) geometries may be achieved with this method.

In another non-limiting example of a 3D printing process, a layer of the porous polishing pad starts with a thin pattern of droplets of a resin precursor composition that are dispensed on a surface from a first nozzle and a thin pattern of droplets of porosity-forming agent is deposited on the surface from a second nozzle. The thin pattern of the resin precursor composition and the porosity-forming agent are then cured to form the polishing article in layer-by-layer fashion. Since 3D printing processes can exercise local control over the material composition, microstructure and surface texture, various (and previously inaccessible) geometries may be achieved with this method.

In some implementations, the polishing pad includes a porous structure formed within the printed solidified material that contains open pores and/or closed pores. In one implementation, the polishing pad includes a porous structure formed within the printed solidified material that substantially contains closed pores. In another implementation, the polishing pad includes a porous structure within the printed solidified material that contains both open pores and closed pores. In one example, the open pores are formed at the polishing surface of the formed polishing pad and the closed pores are formed at a level beneath the surface of the polishing pad. Yet, in another implementation, it may be desirable to form a polishing pad that includes a porous structure within the printed solidified material that contains substantially all open pores, which may form an interwoven network of pores. However, in some implementations, the void volume of the porous polishing pad predominantly includes closed cells (i.e., closed pores). Preferably, at least about 75% or more, for example, about 80% or more, about 85% or more, about 90% or more, about 95% or more, about 98% or more, about 99% or more, or 100%, of the void volume of the porous polishing pad includes closed pores. In general, closed pores, or closed cells, include hollow interior regions of material that are not interconnected, or are only interconnected to a few adjacent cells. In some implementations, the closed pores are predominantly buried within the porous pad material until they are exposed and/or opened at the pad surface due to pad wear or a pad conditioning process.

The porous polishing pad can have a void volume fraction of about 1% or more, e.g., about 4% or more, about 5% or more, about 10% or more, about 12% or more, about 15% or more, about 20% or more, about 25% or more, about 30% or more, about 40% or more, or about 45% or more. Alternatively, or in addition, the porous polishing pad can have a void volume fraction of about 50% or less, e.g., about 45% or less, about 40% or less, about 30% or less, about 25% or less, about 20% or less, about 15% or less, about 12% or less, about 10% or less, about 5% or less, or about 4% or less. Thus, the porous polishing pad can have a void volume fraction bounded by any two of the endpoints recited for the void volume. For example, the porous polishing pad can have a void volume fraction of about 1% to about 50%, about 10% to about 40%, about 20% to about 30%, about 1% to about 20%, about 2% to about 18%, about 4% to about 5%, about 5% to about 15%, about 10% to about 20%, about 25% to about 30%, or about 35% to about 40%.

The void volume fraction of the porous polishing pad can be measured using any suitable measurement method. For example, the void volume fraction of the porous polishing pad can be measured using a density measurement, wherein the void volume fraction can be expressed by: void volume %=$(1-\delta_{foamed}/\delta_{solid})\times 100\%$, wherein $\delta_{foamed}$ is the density of the porous polishing pad and $\delta_{solid}$ is the density of the polymeric resin used to form the porous polishing pad. The terms "void volume," "void volume fraction," or "void volume percentage" as used herein can be synonymous with porosity.

The porous polishing pad, more specifically the closed pores of the porous polishing pad, can have an average pore size of about 1 μm or more, e.g., about 5 μm or more, about 10 μm or more, about 15 μm or more, about 20 μm or more, about 25 μm or more, about 30 μm or more, about 35 μm or more, about 40 μm or more, about 45 μm or more, about 50 μm or more, about 55 μm or more, about 60 μm or more, about 65 μm or more, about 70 μm or more, about 75 μm or more, about 100 μm or more, about 125 μm or more, or about 150 μm or more. Alternatively, or in addition, the porous polishing pad can have an average pore size of about 200 μm or less, e.g., about 190 μm or less, about 180 μm or less, about 175 μm or less, about 170 μm or less, about 160 μm or less, about 150 μm or less, 140 μm or less, 130 μm or less, about 125 μm or less, 120 μm or less, 110 μm or less, 100 μm or less, 90 μm or less, 80 μm or less, 70 μm or less, 60 μm or less, 50 μm or less, 40 μm or less, 30 μm or less, about 20 μm or less; 15 μm or less, 10 μm or less, or 5 μm or less. Thus, the porous polishing pad can have an average pore size bounded by any two of the endpoints recited for the average pore size. For example, the porous polishing pad can have an average pore size of about 1 μm to about 200 μm, about 5 μm to about 200 μm, about 5 μm to about 20 μm, about 5 μm to about 40 μm, about 5 μm to about 130 μm, about 25 μm to about 75 μm, about 50 μm to about 100 μm, about 75 μm to about 125 μm, about 100 μm to about 150 μm, about 125 μm to about 175 μm, or about 150 μm to about 200 μm.

As used herein, the average pore size refers to the average of the largest diameter of a representative sample of individual pores in the porous polishing pad. The largest diameter is the same as the Feret diameter. The largest diameter can be obtained from an image of a sample, such as a scanning electron microscope image, either manually or by using image analysis software. Typically, the sample is obtained by sectioning a portion of a porous polishing pad.

The average pore size as used herein refers to the average pore size within the bulk portion of the porous polishing pad, i.e., the portion of the porous polishing pad between, but not including, the surface(s) of the porous polishing pad. The surface can be the region of the pad within about 5 mm, e.g., within about 4 mm, within about 3 mm, within about 2 mm, or within about 1 mm, of the pad surface as produced and before any finishing operations, such as skiving, dressing, or the like.

Porous Polishing Pad Designs

According to one or more implementations of the disclosure, it has been discovered that a porous polishing pad with improved polishing and mechanical properties can be produced by an additive manufacturing process. A porous polishing pad, which is formed by additive manufacturing process, can be formed such that it has improved polishing performance and properties over conventionally formed porous or non-porous pads. The formed porous polishing pad generally includes a pad body and discrete features produced over, upon, and within the pad body, that may be formed simultaneously from a plurality of different materials and/or compositions of materials, thus enabling micron scale control of the pad architecture and properties. The disclosure provided herein can thus be used to form a porous polishing pad that includes desirable pad polishing properties over the complete polishing process range. Typical polishing pad mechanical properties include both static and dynamic properties of the polishing pad, which are affected by the individual materials within the polishing pad and the composite properties of the complete polishing pad structure. The porous polishing pad may include regions that contain a plurality of discrete materials and/or regions that contain gradients in material composition or porosity related properties (e.g., pore size, pore volume, etc.) in one or more directions within the formed polishing pad. Examples of some of the mechanical properties that can be adjusted to form a porous polishing pad that has desirable polishing performance over the polishing process range include, but are not limited to storage modulus E', loss modulus E'', hardness, yield strength, ultimate tensile strength, elongation, thermal conductivity, zeta potential, mass density, surface tension, Poison's ratio, fracture toughness, surface roughness (Ra) and other related properties. Examples of some of the dynamic properties that can be adjusted within an porous polishing pad may include, but are not limited to tan delta (tan δ), storage modulus ratio (or E'30/E'90 ratio) and other related parameters, such as the energy loss factor (KEL). The energy loss factor (KEL) is related to the elastic rebound and dampening effect of a pad material. KEL may be defined by the following equation: $KEL = \tan \delta * 10^{12}/[E'*(1+(\tan \delta)^2)]$, where E' is in Pascals. The KEL is typically measured using the method of Dynamic Mechanical Analysis (DMA) at a temperature of 40° C., and frequency of 1 or 1.6 hertz (Hz). Unless specified otherwise, the storage modulus E', the E'30/E'90 ratio and the percent recovery measurements provided herein were performed using a DMA testing process that was performed at a frequency of about 1 hertz (Hz) and a temperature ramp rate of about 5° C./min. By controlling one or more of the pad properties, an improved the polishing process performance, improved polishing pad lifetime, improved polishing slurry retention and improved polishing process repeatability can be achieved. Examples of pad configurations that exhibit one or more these properties are discussed further below in conjunction with one or more the implementations discussed herein.

Polishing Pad Apparatus and Polishing Methods:

The improved porous polishing pad designs disclosed herein can be used to perform a polishing process in many different types of polishing apparatus. In one example, which is not intended to limit the scope of the disclosure provided herein, the porous polishing pad may be used in a polishing station that is used to polish semiconductor substrates. FIG. 1 is a schematic sectional view of a polishing station 100 having a porous polishing pad 106 formed according to the implementations described herein. The polishing station 100 may be positioned within a larger chemical mechanical polishing (CMP) system that contains multiple polishing stations 100. The polishing station 100 includes a platen 102. The platen 102 may rotate about a central axis 104. The porous polishing pad 106 may be placed on the platen 102. While not intending to limit the disclosure provided herein, typically, the porous polishing pad 106 covers an upper surface 103 of the platen 102 which is at least one to two times larger than the size of a substrate 110 (e.g., substrate diameter) that is to be processed in the polishing station 100. In one example, the porous polishing pad 106 and platen 102 are between about 6 inches (150 millimeters) and about 40 inches (1,016 millimeters) in diameter. The porous polishing pad 106 includes a polishing surface 112 configured to contact and process one or more substrates 110. The platen 102 supports the porous polishing pad 106 and rotates the porous polishing pad 106 during polishing. A carrier head 108 may hold the substrate 110 being processed against the polishing surface 112 of the porous polishing pad 106. A polishing interface 130 is formed between the polishing surface 112 and the substrate 110. The carrier head 108 typically includes a flexible diaphragm 111 that is used to urge the substrate 110 against the porous polishing pad 106 and a carrier ring 109 that is used to correct for an inherently non-uniform pressure distribution found across the substrate's surface during the polishing process. The carrier head 108 may rotate about a central axis 114 and/or move in a sweeping motion to generate relative motions between the substrate 110 and the porous polishing pad 106.

During polishing, a polishing fluid 116, such as an abrasive slurry or non-abrasive slurry, may be supplied to the polishing surface 112 by a delivery arm 118. The polishing fluid 116 may contain abrasive particles, a pH adjuster and/or chemically active components to enable chemical mechanical polishing of the substrate. The slurry chemistry of 116 is designed to polish substrate surfaces and/or features that may include metals, metal oxides, and semimetal oxides. One will note that the surface topography of the porous polishing pad 106 is used to control the transport of the polishing fluid 116 (e.g., slurry) which interacts with the substrate 110 during the polishing process. For example, the surface topology of the porous polishing pad 106 may consist of grooves, channels and other protuberances, which are formed by casting, molding, or machining, which may be disposed over, upon and within the porous polishing pad 106.

In some implementations, the polishing station 100 includes a pad conditioning assembly 120 that includes a conditioning arm 122 and actuators 124 and 126. The actuators 124 and 126 are configured to cause a pad conditioning disk 128 (e.g., diamond impregnated disk) to be urged against and sweep across the polishing surface 112 at different times during the polishing process cycle to abrade and rejuvenate the polishing surface 112 of the porous polishing pad 106. During processing, moving the porous polishing pad 106 and carrier head 108 apply mechanical energy to the substrate 110, which in combination with the chemicals and abrasive components in the polishing fluid 116, will cause the surface of the substrate to become planarized.

Porous Polishing Pad Configuration Examples

Examples of various structural configurations of porous polishing pads that can be used in a polishing apparatus are discussed in conjunction with FIGS. 2A-2K. The porous polishing pads illustrated in FIGS. 2A-2K may be used, for example, in the polishing station 100 depicted in FIG. 1. Unless otherwise specified, the terms first polishing element(s) 204 and the second polishing element(s) 206 broadly describe portions, regions and/or features within the polishing body of a porous polishing pad 200. The specific examples of different porous polishing pad configurations, shown in FIGS. 2A-2K, are not intended to be limiting as to the scope of the disclosure provided herein, since other similar configurations may be formed by use of the one or more of the additive manufacturing processes described herein.

The porous polishing pads may be formed by a layer-by-layer automated sequential deposition of at least one resin precursor composition followed by at least one curing step, wherein each layer may represent at least one polymer composition, and/or regions of different compositions. The compositions may include functional polymers, functional oligomers, porosity-forming agent(s), emulsifiers/surfactants, photoinitiators inorganic particles, reactive diluents, and additional additives. The functional polymers may include multifunctional acrylate precursor components. To form a plurality of solid polymeric layers, one or more curing steps may be used, such as exposure of one or more compositions to UV radiation and/or thermal energy. In this fashion, an entire polishing pad may be formed from a plurality of polymeric layers by an additive manufacturing process. A thickness of the cured layer may be from about 0.1 micron to about 1 mm, such as 5 microns to about 100 microns, and such as 25 microns to about 30 microns.

The porous polishing pads according to the present disclosure may have differing porosity across a pad body 202, as reflected by at least one compositional gradient from polishing element to polishing element. Porosity across the porous polishing pad 200 may be symmetric or non-symmetric, uniform or non-uniform to achieve target polishing pad properties, which may include static mechanical properties, dynamic mechanical properties and wear properties. In one implementation, the pores form near the interface of each adjacent deposited layer. The patterns of either of the polishing elements 204, 206 across the pad body 202 may be radial, concentric, rectangular, spiral, fractal or random according to achieve target properties including porosity, across the porous polishing pad. Advantageously, the 3D printing process enables specific placement of material compositions with desired properties in specific areas of the pad, or over larger areas of the pad, so the properties can be combined and represent a greater average of properties or a "composite" of the properties.

Figure 2A:
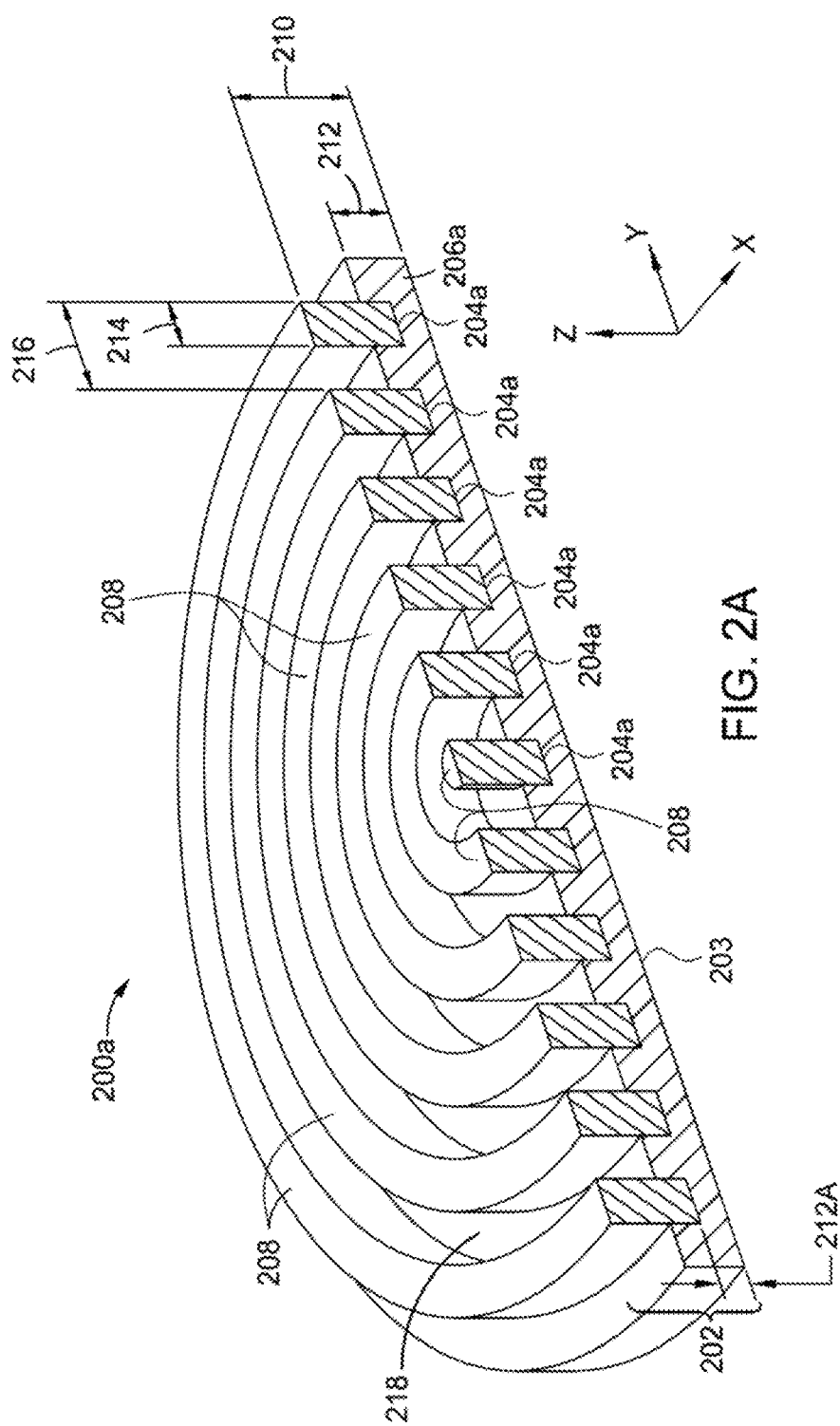
FIG. 2A is a schematic isometric and cross-sectional view of a porous polishing pad according to an implementation of the present disclosure.

FIG. 2A is a schematic perspective sectional view of a porous polishing pad 200a according to one implementation of the present disclosure. One or more first polishing elements 204a may formed in alternating concentric rings that are coupled to one or more second polishing elements 206a to form a pad body 202 that is circular. At least one of the one or more first polishing elements 204a and the one or more second polishing elements 206a may be porous and formed according to the implementations described herein. In one implementation, a height 210 of the first polishing element(s) 204a from the supporting surface 203 is higher than a height 212 of the second polishing element(s) 206a so that the upper surface(s) 208 of the first polishing element(s) 204a protrude above the second polishing element(s) 206a. In one implementation, the first polishing element 204 is disposed over a portion 212A of the second polishing element(s) 206a. Grooves 218 or channels are formed between the first polishing element(s) 204a, and at least include a portion of the second polishing element(s) 206a. During polishing, the upper surface(s) 208 of the first polishing elements 204a form a polishing surface that contacts the substrate, while the grooves 218 retain and channel the polishing fluid. In one implementation, the first polishing element(s) 204a are thicker than the second polishing element(s) 206a in a direction normal to a plane parallel to the polishing surface, or upper surface(s) 208, of the pad body 202 (i.e., Z-direction in FIG. 2A) so that the channels or grooves 218 are formed on the top surface of the pad body 202.

In one implementation, a width 214 of the first polishing elements 204a may be between about 250 microns and about 5 millimeters. The pitch 216 between the hard first polishing element(s) 204a may be between about 0.5 millimeters and about 5 millimeters. Each first polishing element 204a may have a width within a range between about 250 microns and about 2 millimeters. The width 214 and/or the pitch 216 may vary across a radius of the porous polishing pad 200 to define zones of varied hardness, porosity, or both hardness and porosity.

Figure 2B:
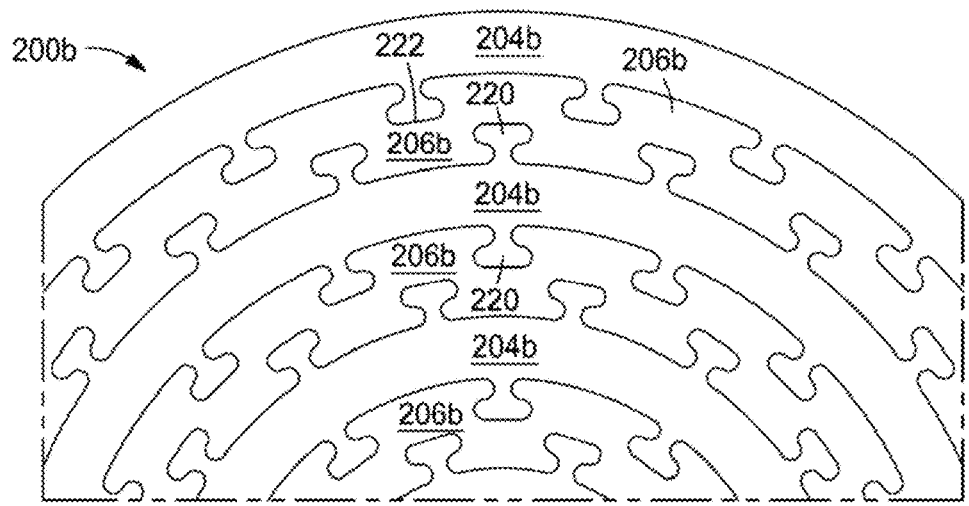
FIG. 2B is a schematic partial top view of a porous polishing pad according to an implementation of the present disclosure.

FIG. 2B is a schematic partial top view of a porous polishing pad 200b according to an implementation of the present disclosure. The porous polishing pad 200b is similar to the porous polishing pad 200 of FIG. 2A except that the porous polishing pad 200b includes interlocking first polishing elements 204b and second polishing elements 206b. At least one of the interlocking first polishing elements 204b and the second polishing elements 206b may be porous and formed according to the implementations described herein. The interlocking first polishing elements 204b and the second polishing elements 206b form a plurality of concentric rings. The interlocking first polishing elements 204b may include protruding vertical ridges 220 and the second polishing elements 206b may include vertical recesses 222 for receiving the vertical ridges 220. Alternatively, the second polishing elements 206b may include protruding ridges while the interlocking first polishing elements 204b include recesses. By having the second polishing elements 206b interlock with the interlocking first polishing elements 204b, the porous polishing pad 200b will be mechanically stronger in relation to applied shear forces, which may be generated during the CMP process and/or material handling. In one implementation, the first polishing elements and the second polishing elements may be interlocked to improve the strength of the porous polishing pad and improve physical integrity of the porous polishing pads. The interlocking of the features may be due to physical and/or chemical forces.

Figure 2C:
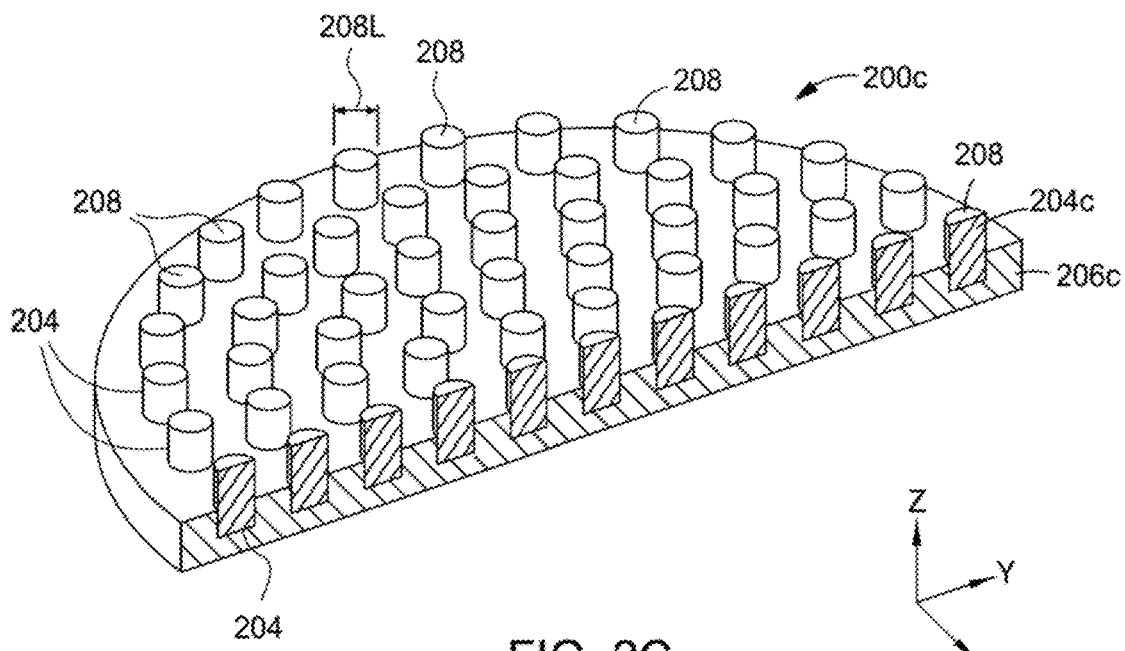
FIG. 2C is a schematic isometric and cross-sectional view of a porous polishing pad according to an implementation of the present disclosure.

FIG. 2C is a schematic perspective sectional view of a porous polishing pad 200c according to an implementation of the present disclosure. The porous polishing pad 200c includes a plurality of first polishing elements 204c extending from a base material layer, such as the second polishing element 206c. At least one of the one the plurality of first polishing elements 204c and the second polishing element 206c may be porous and formed according to the implementations described herein. Upper surfaces 208 of the first polishing elements 204c form a polishing surface for contacting the substrate during polishing. The first polishing elements 204c and the second polishing elements 206c have different material and structural properties. For example, the first polishing elements 204c may be formed from a porous material, while the second polishing elements 206c may be formed from a non-porous material as described herein. The porous polishing pad 200c may be formed by 3D printing, similar to the porous polishing pad 200.

The first polishing elements 204c may be substantially the same size, or may vary in size to create varied mechanical properties, such as porosity, across the porous polishing pad 200c. The first polishing elements 204c may be uniformly distributed across the porous polishing pad 200c, or may be arranged in a non-uniform pattern to achieve target properties in the porous polishing pad 200c.

In FIG. 2C, the first polishing elements 204c are shown to be circular columns extending from the second polishing elements 206c. Alternatively, the first polishing elements 204c may be of any suitable cross-sectional shape, for example columns with toroidal, partial toroidal (e.g., arc), oval, square, rectangular, triangular, polygonal, or other irregular section shapes, or combinations thereof. In one implementation, the first polishing elements 204c may be of different cross-sectional shapes to tune hardness, mechanical strength or other desirable properties of the porous polishing pad 200c.

Figure 2D:
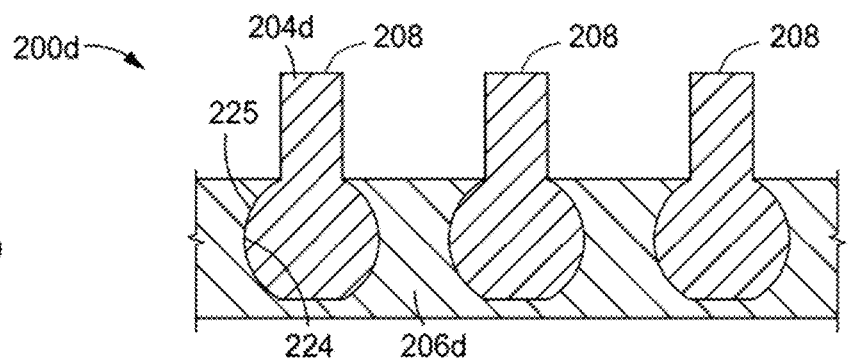
FIG. 2D is a schematic side cross-sectional view of a portion of a porous polishing pad according to an implementation of the present disclosure.

FIG. 2D is a schematic partial side cross-sectional view of a pad body 202 of a porous polishing pad 200d according to an implementation of the present disclosure. The porous polishing pad 200d is similar to the porous polishing pad 200a, 200b or 200c of FIGS. 2A-2C except that the porous polishing pad 200d includes interlocking first polishing elements 204d and second polishing elements 206d. At least one of the one the plurality of interlocking first polishing elements 204d and the second polishing element 206d may be porous and formed according to the implementations described herein. The interlocking first polishing elements 204d and the second polishing elements 206d may include a plurality of concentric rings and/or discrete elements that form part of the pad body 202, which are illustrated, for example, in FIG. 2A, 2B or 2C. In one implementation, the interlocking first polishing elements 204d may include protruding sidewalls 224 while the second polishing elements 206d may include regions 225 to receive the protruding sidewalls 224 of the interlocking first polishing elements 204d. Alternatively, the second polishing elements 206d may include protruding sidewalls while the interlocking first polishing elements 204d include regions that are configured to receive the protruding sidewalls. By interlocking the second polishing elements 206c with the interlocking first polishing elements 204d, the porous polishing pad 200d may exhibit an increased tensile, compressive and/or shear strength. Additionally, the interlocking sidewalls prevent the porous polishing pad 200d from being pulled apart.

In one implementation, the boundaries between the interlocking first polishing elements 204d and second polishing elements 206d include a cohesive transition from at least one composition of material to another, such as a transition or compositional gradient from a first composition used to form the interlocking first polishing element 204d and a second composition used to form the second polishing element 206d. The cohesiveness of the materials is a result of the additive manufacturing process described herein, which enables micron scale control and intimate mixing of the two or more chemical compositions in a layer-by-layer additively formed structure.

Figure 2E:
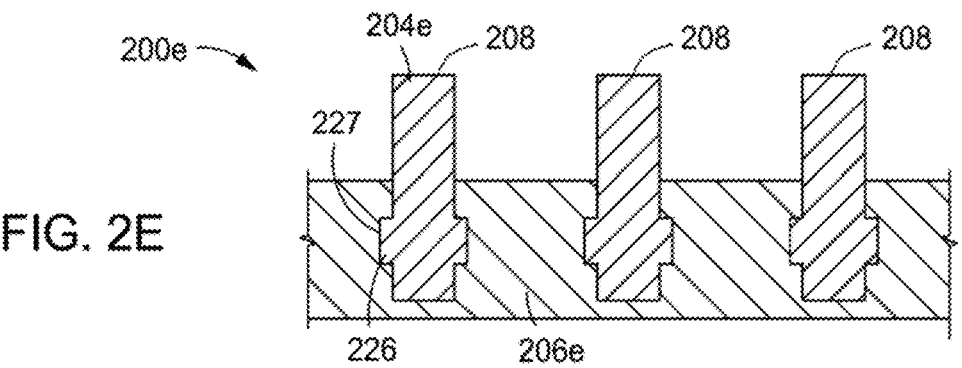
FIG. 2E is a schematic side cross-sectional view of a portion of a porous polishing pad according to an implementation of the present disclosure.
Figure 2H:
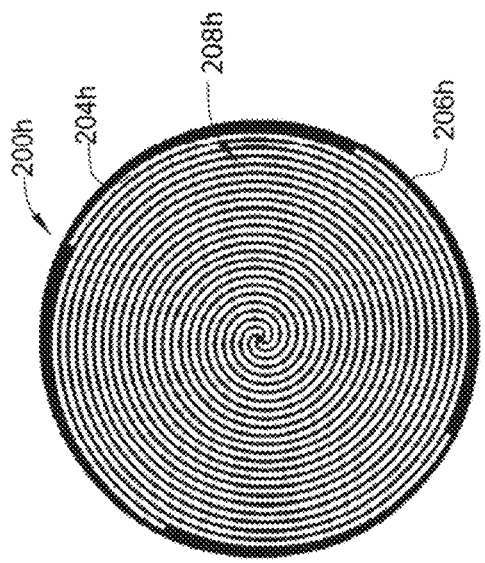
FIGS. 2F-2K are top views of polishing pad designs according to implementations of the present disclosure.
Figure 2K:
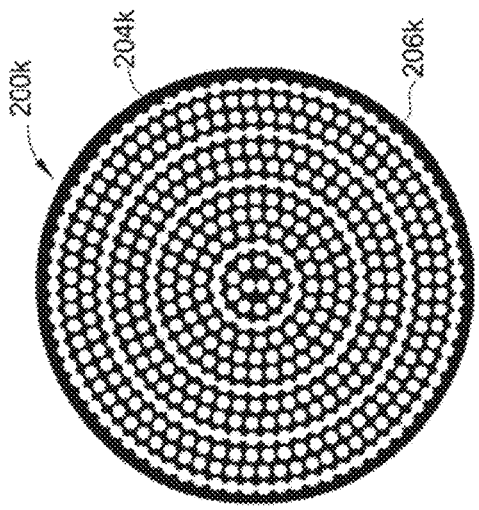
Figure 2G:
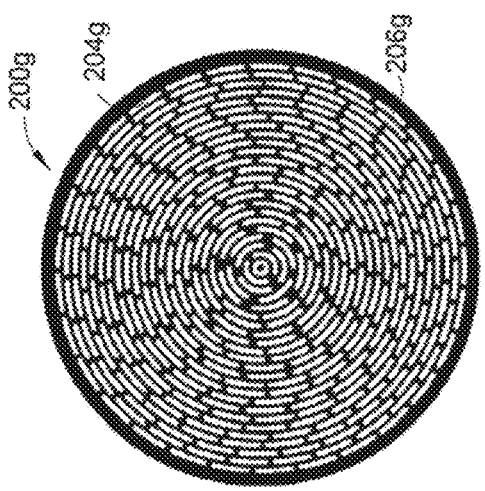
Figure 2J:
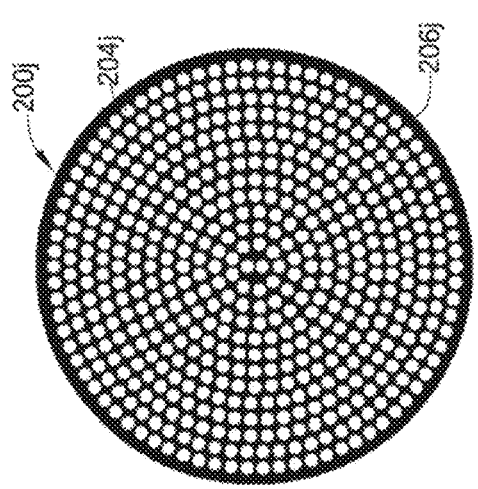
Figure 2F:
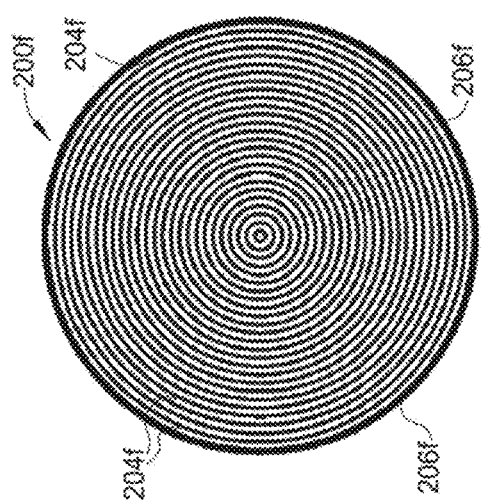
Figure 2I:
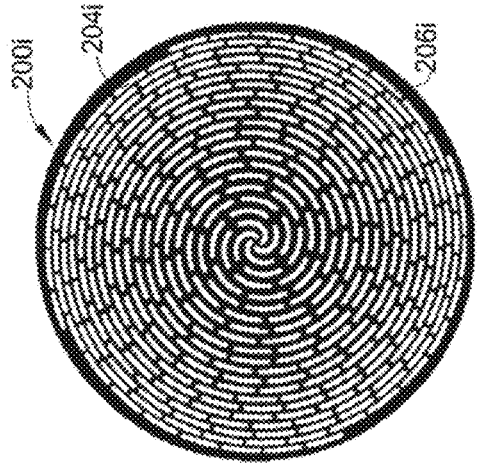

FIG. 2E is a schematic partial sectional view of a porous polishing pad 200e according to an implementation of the present disclosure. The porous polishing pad 200e is similar to the porous polishing pad 200d of FIG. 2D except that the porous polishing pad 200e includes differently configured interlocking features. The porous polishing pad 200e may include first polishing elements 204e and second polishing elements 206e having a plurality of concentric rings and/or discrete elements. At least one of the one the first polishing elements 204e and the second polishing elements 206e may be porous and formed according to the implementations described herein. In one implementation, the first polishing elements 204e may include horizontal ridges 226 while the second polishing elements 206e may include horizontal recesses 227 to receive the horizontal ridges 226 of the first polishing elements 204e. Alternatively, the second polishing elements 206e may include horizontal ridges while the first polishing elements 204e include horizontal recesses. In one implementation, vertical interlocking features, such as the interlocking features of FIG. 2B and horizontal interlocking features, such as the interlocking features of FIGS. 2D and 2E, may be combined to form a porous polishing pad.

FIGS. 2F-2K are schematic plan views of various polishing pad designs according to implementations of the present disclosure. Each of FIGS. 2F-2K include pixel charts having white regions (regions in white pixels) that represent the first polishing elements 204f-204k, respectively, for contacting and polishing a substrate, and black regions (regions in black pixels) that represent the second polishing element(s) 206*f*-206*k*. As similarly discussed herein, the white regions generally protrude over the black regions so that channels are formed in the black regions between the white regions. In one example, the pixels in a pixel chart are arranged in a rectangular array type pattern (e.g., X and Y oriented array) that are used to define the position of the various materials within a layer, or a portion of layer, of an porous polishing pad. In another example, the pixels in a pixel chart are arranged in a hexagonal close pack array type of pattern (e.g., one pixel surrounded by six nearest neighbors) that are used to define the position of the various materials within a layer, or a portion of layer of a polishing pad. Polishing slurry may flow through and be retained in the channels during polishing. The polishing pads shown in FIGS. 2F-2K may be formed by depositing a plurality of layers of materials using an additive manufacturing process. Each of the plurality of layers may include two or more materials to form the first polishing elements 204*f*-204*k* and second polishing element(s) 206*f*-206*k*. In one implementation, the first polishing elements 204*f*-204*k* may be thicker than the second polishing element(s) 206*f*-206*k* in a direction normal to a plane that is parallel to the plurality of layers of materials so that grooves and/or channels are formed on a top surface of the polishing pad.

The first polishing elements 204*a*-204*k* in the porous polishing pads 200*a*-200*k* of FIGS. 2A-2K may be formed from an identical material or identical compositions of materials. Alternatively, the material composition and/or material properties of the first polishing elements 204*a*-204*k* in the designs of FIG. 2A-2K may vary from polishing feature to polishing feature. Individualized material composition and/or material properties allow tailoring of the polishing pads for specific needs.

It has been found that the structural configuration of the first polishing elements 204 relative to the second polishing elements 206 can also be used to control polishing process repeatability and improve the polishing rate of a polishing process. One such structural configuration relates to the relative physical layout of the first polishing elements 204 to the second polishing elements 206 in a formed advanced polishing pad, and is known herein as the total exposed surface area to volume ratio (SAVR) of the first polishing elements 204 within a formed advanced polishing pad. It is believed that by adjusting the total exposed surface area to volume ratio by controlling the relative physical layout of the first polishing elements 204 relative to the second polishing elements 206 and the mechanical properties (e.g., thermal conductivity, hardness, loss modulus, polishing contact area, etc.) of the materials used to form the first polishing elements 204 and/or the second polishing elements 206, the polishing process repeatability and substrate polishing rate can, along with other polishing parameter, be greatly improved. In one example, the mechanical properties of the material(s) within the first polishing elements 204 include a thermal diffusivity (m$^2$/s) that is less than about $6.0 \times 10^{-6}$, such as between about $1.0 \times 10^{-7}$ and $6.0 \times 10^{-6}$ m$^2$/s.

Figure 2L:
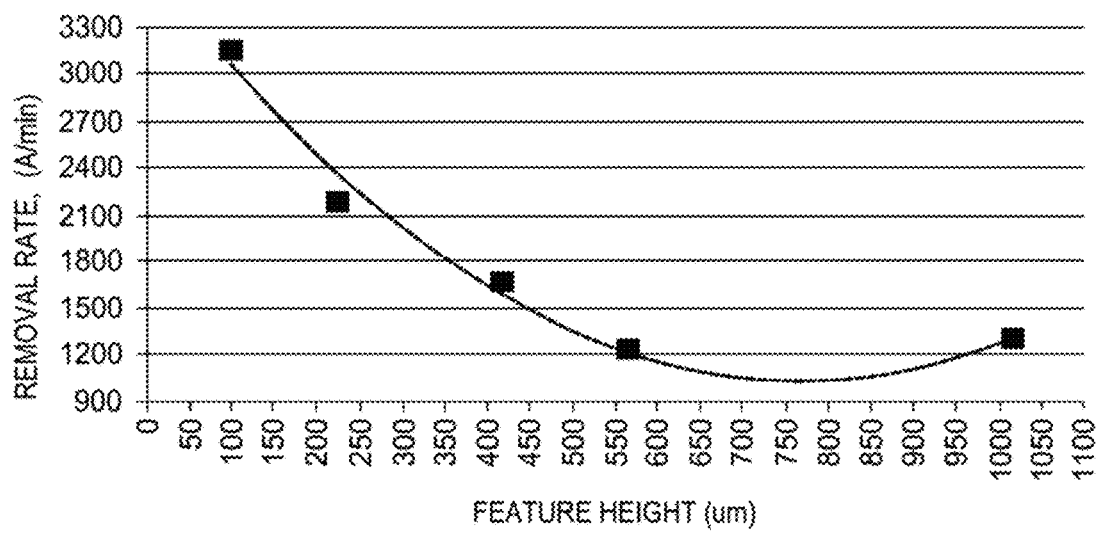
FIG. 2L illustrates a plot of polished material removal rate versus feature height of a polishing pad, according to an implementation of the present disclosure.
Figure 2M:
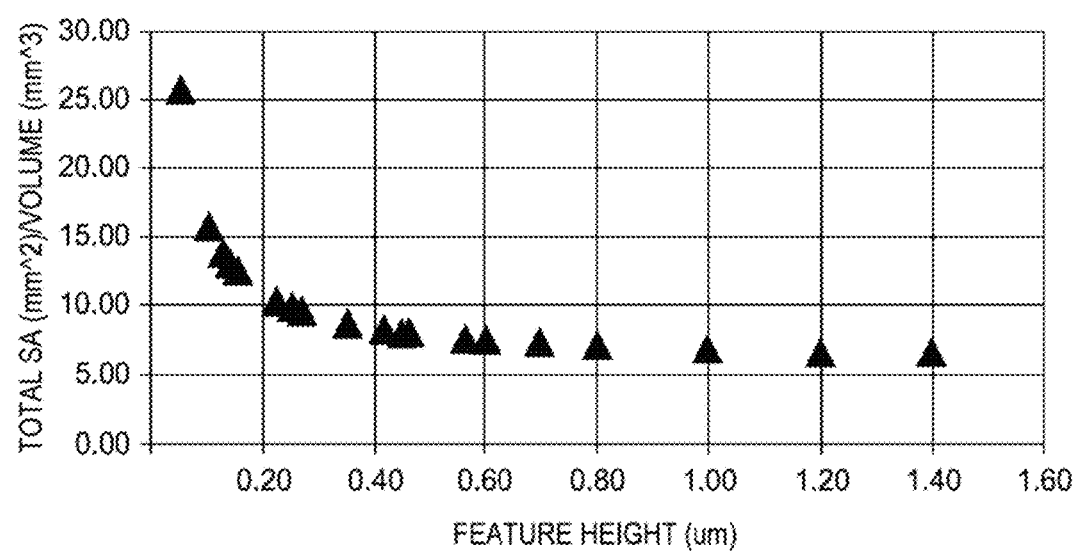
FIG. 2M illustrates a plot of surface area to volume ratio versus feature height of a polishing pad, according to an implementation of the present disclosure.
Figure 2N:
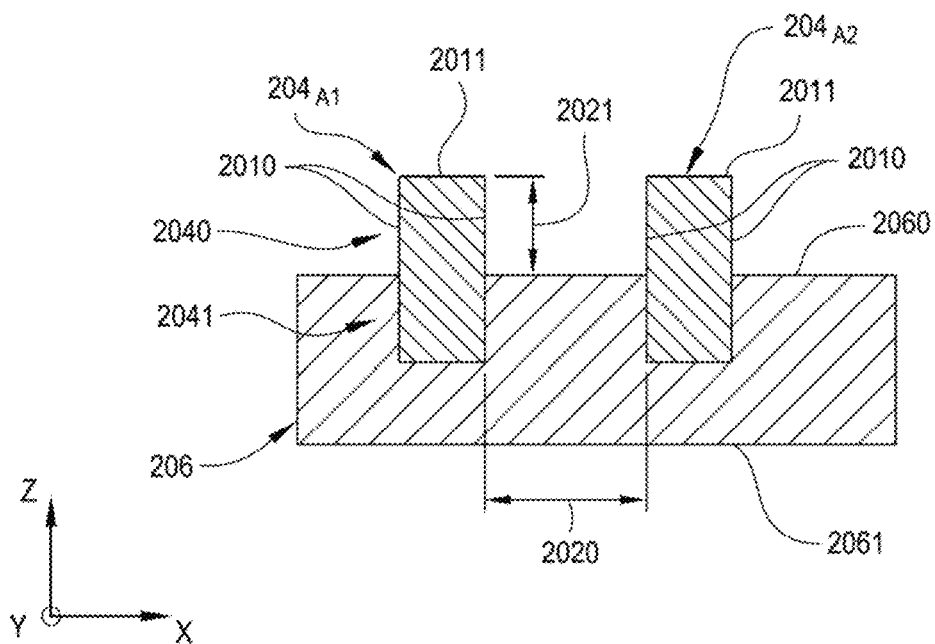
FIG. 2N is a schematic cross-sectional view of a polishing pad according to an implementation of the present disclosure.

FIG. 2N illustrates two first polishing elements $204_{A1}$ and $204_{A2}$ that are supported by a second polishing element 206, such that a portion of the each of the first polishing elements $204_{A1}$ and $204_{A2}$ is embedded within a portion of the second polishing element 206. The second polishing element 206 has a base surface 2061, which is supported by components in a polishing tool (not shown). The embedded region of the first polishing element is generally described herein as being an unexposed portion 2041 and the portion of the first polishing elements that is not embedded within the second polishing element 206 is referred to herein as the exposed portion 2040. Each of the first polishing elements $204_{A1}$ and $204_{A2}$ have a feature height 2021 that extends from the surface 2060 of the second polishing element 206 to the top surface 2011 of each first polishing element 204. The first polishing elements $204_{A1}$ and $204_{A2}$, which are formed within an array of first polishing elements, have a spacing 2020 that may be constant or vary within the X-Y plane depending on the configuration of the advanced polishing pad. In some implementations, as illustrated in FIGS. 2A and 2F-2K the spacing 2020 within the array may be oriented in a radial direction (e.g., X-Y plane) and an arc direction (e.g., X-Y plane), and may be constant or vary in one or more of these directions, as discussed above.

Structurally the first polishing elements $204_{A1}$, $204_{A2}$ each have an exposed surface that includes a portion of the sides 2010 that is above the surface 2060 of the second polishing element 206 and a top surface 2011, on which a substrate is placed during polishing. In one example, first polishing elements, which are configured similarly to the first polishing elements illustrated in FIG. 2A, have a total surface area that varies depending on the radial position of each of the first polishing elements (e.g., concentric rings of differing diameters). Whereas, in another example, for the first polishing elements that are configured similarly to the first polishing elements illustrated in FIG. 2C, the total exposed surface area of each first polishing element may not vary from one first polishing element to the next. In general, the total exposed surface area (TESA) of each first polishing element 204 includes the substrate contact area (SCA), which is the area of the top surface 2011, and the total exposed sidewall area of the first polishing element, which is the sum of the areas of the exposed portions of each of the sides 2010.

One will note that the total surface contact area, which is generally the area that a substrate contacts as it is being polished, is the sum of all of the areas of the top surfaces 2011 of all of the first polishing elements 204 in an advanced polishing pad. However, the percent contact area is the total contact area of the first polishing elements 204 divided by the total pad surface area of the polishing pad (e.g., $\pi D^2/4$, where D is the outer diameter of the pad). The volume (V) of a first polishing element, is generally the total internal volume of a first polishing element 204, such as, for example, the volume of a cylinder for the first polishing elements 204 illustrated in FIG. 2C. However, the total exposed surface area to volume ratio (SAVR) for first polishing elements 204 (e.g., SAVR=TESA/V), which have a similar cross-sectional shape, such as have the same radial width (e.g., width 214 in FIG. 2A) or feature size (e.g., length 208L in FIG. 2C), embedded depth within the second polishing element 206 and polishing element height, will generally have the same total exposed surface area to volume ratio for each of the first polishing elements 204 in the array used to form the advanced polishing pad.

Figure 2O:
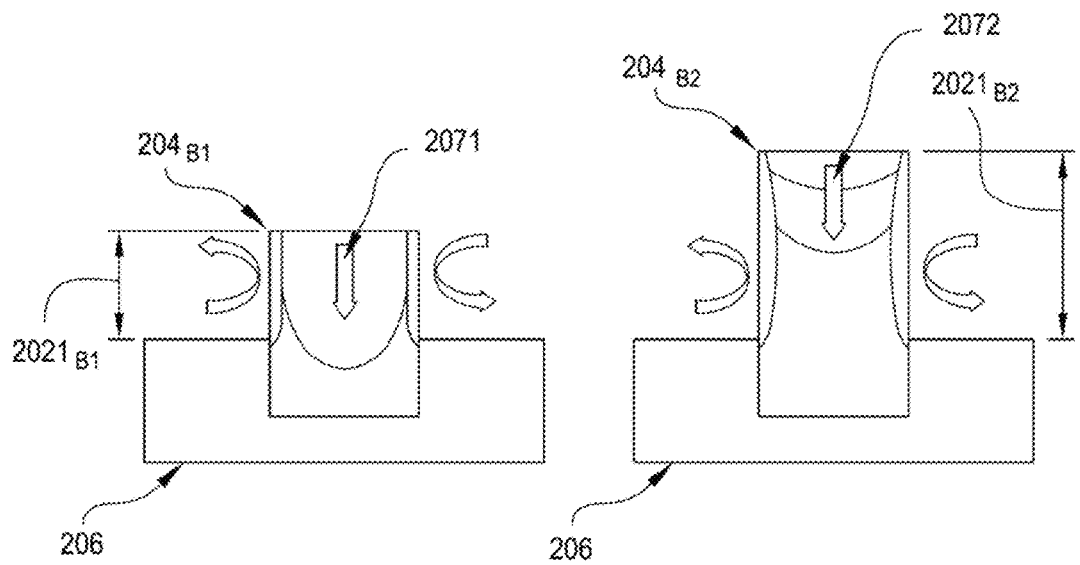
FIG. 2O is a schematic cross-sectional view of a polishing pad according to an implementation of the present disclosure.

FIG. 2O illustrates two first polishing elements $204_{B1}$ and $204_{B2}$ that are each supported by separate second polishing elements 206, and have differing feature heights $2021_{B1}$, $2021_{B2}$. During a polishing process, the friction created between the top surface of each of the first polishing elements $204_{B1}$ and $204_{B2}$ and the respective substrates, generates a heat flux 2071 or a heat flux 2072 that are conducted away from the top surface of each of the first polishing elements $204_{B1}$ and $204_{B2}$. In general, the heat fluxes 2071, 2072 will be similar if the surface properties of the top surface 2011 and polishing parameters used to polish the substrate remain the same for each of these configurations. However, it has been found that the exposed surface area and volume of the first polishing elements $204_{B1}$ and $204_{B2}$ has an effect on the polishing process results, due in part to a difference in temperature that is achieved in differently configured first polishing elements $204_{B1}$ and $204_{B2}$ during normal polishing. An increase in process temperature will generally cause degradation in the mechanical properties of the polymer containing material(s) used to form each of the differently configured first polishing elements $204_{B1}$ and $204_{B2}$. Moreover, one will note that higher polishing temperatures generally increase the polishing rate of the polishing process, and variations in the polishing process conditions from one substrate to the next is generally undesirable for most polishing processes.

Referring to FIG. 2O, convective heat transfer created by the movement of the polishing slurry relative to the exposed surfaces of the first polishing elements $204_{B1}$ and $204_{B2}$ will remove at least a portion of the heat generated during the polishing process. Typically, the polishing slurry is at a temperature below the normal temperature of the top surface (e.g., contact surface) of the first polishing elements $204_{B1}$ and $204_{B2}$ during polishing. Therefore, at least due to: 1) the difference in difference in the exposed surface area, which affects the ability of the differently configured first polishing elements to exchange heat with the slurry, 2) the difference in the insulating effect of the second polishing element 206 due to the difference in feature heights, and 3) the difference in mass (e.g., volume) of the first polishing elements, the polishing process results will be different for the first polishing element $204_{B1}$ and the first polishing element $204_{B2}$.

FIG. 2L illustrates the effect of feature height 2021 on the removal rate for a first polishing element during a standard polishing process. As illustrated in FIG. 2O, material removal rate will increase as the feature height is reduced. FIG. 2M illustrates the effect of feature height 2021 on the total exposed surface area to volume ratio. It is believed that the structural and thermal effects created by the difference in the total exposed surface area to volume ratio of the formed first polishing elements leads to the difference in the polishing process results for each of the differently configured first polishing elements (e.g., different feature height 2021) illustrated in FIG. 2L.

One will note that due to the need to "pad condition" the polymer containing polishing pads, the act of abrading the top surface 2011 of the first polishing elements will decrease the feature height 2021 over the lifetime of the polishing pad. However, the variation in feature height 2021 will cause the total exposed surface area to volume ratio, and thus cause the polishing process results, to vary as the advanced pad is abraded by the pad conditioning process. Therefore, it has been found that it is desirable to configure the first polishing elements 204 in an advanced polishing pad, such that the total exposed surface area to volume ratio remains stable over the life of the polishing pad. In some implementations, the total exposed surface area to volume ratio of the first polishing elements 204, which are partially embedded within a second polishing element 206, are designed to have a total exposed surface area to volume ratio of less than 20 per millimeter ($mm^{-1}$). In another example, the total exposed surface area to volume ratio of less than 15 $mm^{-1}$, such as less than 10 $mm^{-1}$, or even less than 8 $mm^{-1}$.

In some implementations, the first polishing elements 204 in an advanced polishing pad are designed such that the total exposed surface area to volume ratio is within a stable region, for example the SAVR is less than 20 $mm^{-1}$, and a porosity of the first polishing element 204 is added and/or controlled so that the slurry retention at the top surface 2011 is desirably maintained. It has been found that the addition of porous features to the surface of the first polishing elements 204 can also be used to stabilize the temperature variation in the formed first polishing elements 204 from wafer to wafer, as similarly found by adjusting the total exposed surface area to volume ratio. In one example, the porosity of the formed first polishing element is formed such that the thermal diffusivity ($m^2/s$) of the material is between about $1.0 \times 10^{-7}$ and $6.0 \times 10^{-6}$ $m^2/s$. The pores within the first polishing element 204, can have an average pore size of about 50 nm or more, such as about 1 µm to about 150 µm, and have a void volume fraction of about 1% to about 50%.

FORMULATION AND MATERIAL EXAMPLES

As discussed above, the materials used to form portions of the pad body 202, such as the first polishing element 204 and second polishing element 206 may each be formed from at least one ink jettable pre-polymer composition that may be a mixture of functional polymers, functional oligomers, surfactants, reactive diluents, porosity-forming agent(s) and curing agents to achieve the desired properties of the porous polishing pad. In general, during the additive manufacturing process, the pre-polymer inks or compositions may be processed after being deposited by use of any number of means including exposure or contact with radiation or thermal energy, with or without a curing agent or chemical initiator. In general, the deposited material can be exposed to electromagnetic radiation, which may include ultraviolet radiation (UV), gamma radiation, X-ray radiation, visible radiation, IR radiation, and microwave radiation and accelerated electrons and ion beams may be used to initiate polymerization reactions. For the purposes of this disclosure, we do not restrict the method of cure, or the use of additives to aid the polymerization, such as sensitizers, initiators, catalysts, and/or curing agents, such as through cure agents or oxygen inhibitors.

In one implementation, two or more polishing elements, such as the first and second polishing elements 204 and 206, within a pad body 202 that is unitary, may be formed from the sequential deposition and post deposition processing of at least one radiation curable resin precursor composition, wherein the compositions contain functional polymers, functional oligomers, monomers, porosity-forming agent(s) and/or reactive diluents that have unsaturated chemical moieties or groups, including but not restricted to: vinyl groups, acrylic groups, methacrylic groups, acrylamido groups, allyl groups, olefinic groups, and acetylene groups. During the porous polishing pad formation process, the unsaturated groups may undergo free radical polymerization when exposed to radiation, such as UV radiation, in the presence of a curing agent, such as a free radical generating photoinitiator, such as an Irgacure® product manufactured by BASF of Ludwigshafen, Germany.

Two types of free radical photoinitiators may be used in one or more of the implementations of the disclosure provided herein. The first type of photoinitiator, also referred to herein as a bulk cure photoinitiator, is an initiator that cleaves upon exposure to UV radiation yielding a free radical immediately, which may initiate a polymerization. The first type of photoinitiator can be useful for both surface and through or bulk cure of the dispensed droplets. The first type of photoinitiator may be selected from the group including, but not restricted to benzoin ethers, benzyl ketals, acetyl phenones, alkyl phenones, and phosphine oxides. The second type of photoinitiator, also referred to herein as a surface cure photoinitiator, is a photoinitiator that is activated by UV radiation and forms free radicals by hydrogen abstraction from a second compound, which becomes the actual initiating free radical. This second compound is often called a co-initiator or polymerization synergist, and may be an amine synergist.

Amine synergists are used to diminish oxygen inhibition, and therefore, the second type of photoinitiator may be useful for fast surface cure. The second type of photoinitiator may be selected from the group including but not restricted to benzophenone compounds and thioxanthone compounds. An amine synergist may be an amine with an active hydrogen, and in one implementation an amine synergist, such as an amine containing acrylate may be combined with a benzophenone photoinitiator in a resin precursor composition formulation to: a) limit oxygen inhibition, b) fast cure a droplet or layer surface so as to fix the dimensions of the droplet or layer surface, and c), increase layer stability through the curing process. In some cases, to retard or prevent free radical quenching by diatomic oxygen, which slows or inhibits the free radical curing mechanism. One may choose a curing atmosphere or environment that is oxygen limited or free of oxygen, such as an inert gas atmosphere, and chemical reagents that are dry, degassed and mostly free of oxygen.

It has been found that controlling the amount of the chemical initiator in the printed formulation is a significant factor in controlling the properties of a formed porous polishing pad, since the repeated exposure of underlying layers to the curing energy as the porous polishing pad is formed will affect the properties of these underlying layers. In other words, the repeated exposure of the deposited layers to some amount of the curing energy (e.g., UV light, heat, etc.) will affect the degree of cure, or over curing the surface of that layer, within each of the formed layers. Therefore, in some implementations, it is desirable to ensure that the surface cure kinetics are not faster than through-cure (bulk-cure), as the surface will cure first and block additional UV light from reaching the material below the surface cured region; thus causing the overall partially cured structure to be "under-cured." In some implementations, it is desirable to reduce the amount of photoinitiator to ensure proper chain extension and cross-linking. In general, higher molecular weight polymers will form with a slower controlled polymerization. It is believed that if the reaction products contain too many radicals, reaction kinetics may proceed too quickly and molecular weights will be low which will in turn reduce mechanical properties of the cured material.

In some implementations, the resin precursor composition includes a polymeric photoinitiator and/or an oligomer photoinitiator that has a moderate to high molecular weight that is selected so that it is relatively immobile within bulk region of a dispensed droplet prior to, during and/or after performing a curing process on the droplet. The moderate to high molecular weight type of photoinitiator is typically selected such that it will not, or at least minimally, migrate within a partially cured droplet. In one example, after UV or UV LED curing a droplet that has a moderate to high molecular weight type of photoinitiator, as compared with the traditional small molecular weight photoinitiator, the polymeric and oligomeric photoinitiators will tend to be immobilized within the bulk region of cured material and not migrate to or vaporize from the surface or interfacial region of the cured material, due to the photoinitiator's relatively high molecular weight. Since the moderate to high molecular weight type of photoinitiator is relatively immobile within the formed droplet, the curing, composition and mechanical properties of the bulk region and the curing, composition, mechanical properties and surface properties (e.g., hydrophilicity) of the surface of the dispensed droplet will remain relatively uniform and stable. In one example, the moderate to high molecular weight type of photoinitiator may be a material that has a molecular weight that is greater than 600, such as greater than 1000. In one example, the moderate to high molecular weight type of photoinitiator may be a material that is selected from the group of PL Industrials PL-150 and IGM Resins Omnipol 1001. The immobile feature of the polymeric and oligomeric photoinitiators, in comparison to small molecular photoinitiators, will also enhance the health, safety, and environmental impact of the additive manufacturing process used to form an advanced polishing pad.

In some implementations, a moderate to high molecular weight type of photoinitiator is selected for use in a droplet formulation such that it will not significantly alter the viscosity of the final formulation used to form the droplet that is dispensed on the surface of the growing polishing pad. Traditionally, lower molecular weight photoinitiator undesirably alter the viscosity of the formulation used to form the droplet. Therefore, by selecting a desirable moderate to high molecular weight type of photoinitiator the viscosity of the final droplet formulation can be adjusted or maintained at a level that can be easily dispensed by the deposition hardware, such as a print head, during an additive manufacturing process (e.g., 3D printing process).

In some implementations, the first and second polishing elements 204 and 206 may contain at least one oligomeric and/or polymeric segments, compounds, or materials selected from: polyamides, polycarbonates, polyesters, polyether ketones, polyethers, polyoxymethylenes, polyether sulfone, polyetherimides, polyimides, polyolefins, polysiloxanes, polysulfones, polyphenylenes, polyphenylene sulfides, polyurethanes, polystyrene, polyacrylonitriles, polyacrylates, polymethylmethacrylates, polyurethane acrylates, polyester acrylates, polyether acrylates, epoxy acrylates, polycarbonates, polyesters, melamines, polysulfones, polyvinyl materials, acrylonitrile butadiene styrene (ABS), halogenated polymers, block copolymers and copolymers thereof. Production and synthesis of the compositions used to form the first polishing element 204 and second polishing element 206 may be achieved using at least one UV radiation curable functional and reactive oligomer with at least one of the aforementioned polymeric and/or molecular segments, such as that shown in chemical structure A:

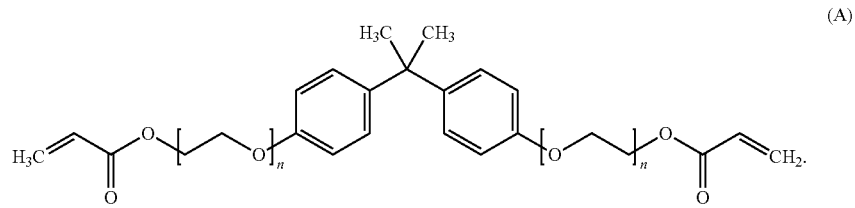

(A)

The difunctional oligomer as represented in chemical structure A, bisphenol-A ethoxylate diacrylate, contains segments that may contribute to the low, medium, and high storage modulus E' character of materials found in the first polishing element 204 and second polishing element 206 in the pad body 202. For example, the aromatic groups may impart added stiffness to the pad body 202 because of some local rigidity imparted by the phenyl rings. However, those skilled in the art will recognize that by increasing the ether chain segment "n" will lower the storage modulus E' and thus produce a softer material with increased flexibility. In one implementation, a rubber-like reactive oligomer, polybutadiene diacrylate, may be used to create a softer and more elastic composition with some rubber-like elastic elongation as shown in chemical structure B:

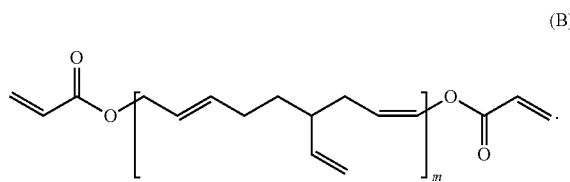

(B)

Polybutadiene diacrylate includes pendant allylic functionality (shown), which may undergo a crosslinking reaction with other unreacted sites of unsaturation. In some implementations, the residual double bonds in the polybutadiene segment "m" are reacted to create crosslinks, which may lead to reversible elastomeric properties. In one implementation, a porous polishing pad containing compositional crosslinks may have a percent elongation from about 5% to about 40%, and an E'30:E'90 ratio of about 6 to about 15. Examples of some crosslinking chemistries include sulfur vulcanization and peroxide, such as tert-butyl peroxybenzoate, dicumyl peroxide, benzoyl peroxide, di-tert-butyl peroxide and the like. In one implementation, 3% benzoyl peroxide, by total formulation weight, is reacted with polybutadiene diacrylate to form crosslinks such that the crosslink density is at least about 2%.

Chemical structure C represents another type of reactive oligomer, a polyurethane acrylate, a material that may impart flexibility and elongation to the porous polishing pad. An acrylate that contains urethane groups may be an aliphatic or an aromatic polyurethane acrylate, and the R or R' groups shown in the structure may be aliphatic, aromatic, oligomeric, and may contain heteroatoms such as oxygen.

Reactive oligomers may contain at least one reactive site, such as an acrylic site, and may be monofunctional, difunctional, trifunctional, tetrafunctional, pentafunctional and/or hexafunctional and therefore serve as foci for crosslinking. The oligomers may represent "soft" or a low storage modulus E' materials, "medium soft" or medium storage modulus E' materials, or "hard" or high storage modulus E' materials. The storage modulus E' (e.g., slope, or Δy/Δx) increases from a soft and flexible and stretchable polyurethane acrylate to an acrylic acrylate, then to a polyester acrylate, and then to the hardest in the series, a hard and high storage modulus E" epoxy acrylate. Functional oligomers may be obtained from a variety of sources including Sartomer USA of Exton, Pa., Dymax Corporation of Torrington, Conn., USA, and Allnex Corporation of Alpharetta, Ga., USA.

In implementations of the disclosure, multifunctional acrylates, including di, tri, tetra, and higher functionality acrylates, may be used to create crosslinks within the material used to form, and/or between the materials found in, the first polishing element 204 and second polishing element 206, and thus adjust polishing pad properties including storage modulus E', viscous dampening, rebound, compression, elasticity, elongation, and the glass transition temperature. It has been found that by controlling the degree of crosslinking within the various materials used to form the first polishing element 204 and second polishing element 206 desirable pad properties can be formed. Moreover, by controlling the porosity characteristics (e.g., average pore size, pore volume, etc.) of the material within one or more of the polishing elements 204, 206 in the porous polishing pad, the pad properties can be further tailored and or refined to achieve a further improved polishing performance.

In some configurations, multifunctional acrylates may be advantageously used in lieu of rigid aromatics in a polishing pad formulation, because the low viscosity family of materials provides a greater variety of molecular architectures, such as linear, branched, and/or cyclic, as well as a broader range of molecular weights, which in turn widens the formulation and process window. Some examples of multifunctional acrylates are shown in chemical structures D (1,3,5-triacryloylhexahydro-1,3,5-triazine), and E (trimethylolpropane triacrylate):

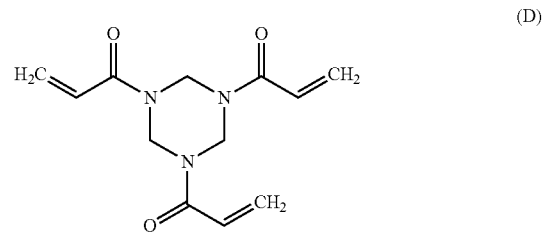

(D)

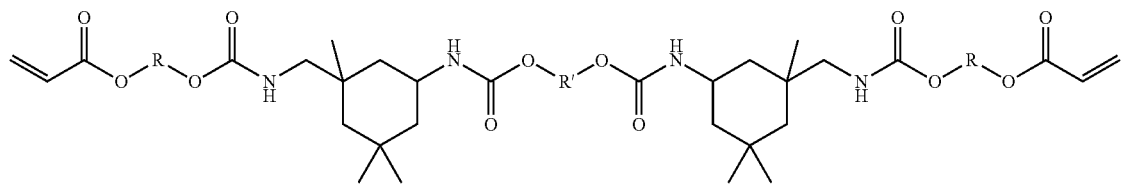

(C)

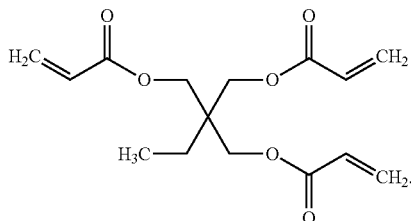

(E)

The type or crosslinking agent, chemical structure, or the mechanism(s) for forming the crosslinks are not restricted in the implementations of this disclosure. For example, an amine containing oligomer may undergo a Michael addition type reaction with acrylic moiety to form a covalent crosslink, or an amine group may react with an epoxide group to create a covalent crosslink. In other implementations, the crosslinks may be formed by ionic or hydrogen bonding. The crosslinking agent may contain linear, branched, or cyclic molecular segments. The crosslinking agent may further contain oligomeric and/or polymeric segments, and may contain heteroatoms such as nitrogen and oxygen. Crosslinking chemical compounds that may be useful for polishing pad compositions are available from a variety of sources including Sigma-Aldrich of St. Louis, Mo., USA, Sartomer USA of Exton, Pa., Dymax Corporation of Torrington, Conn., USA, and Allnex Corporation of Alpharetta, Ga., USA.

As mentioned herein, reactive diluents can be used as viscosity thinning solvents that are mixed with high viscosity functional oligomers to achieve the appropriate viscosity formulation to allow the formulation to be deposited by an additive manufacturing process, followed by copolymerization of the diluent(s) with the higher viscosity functional oligomers when exposed to a curing energy. In one implementation, when n~4, the viscosity of bisphenol-A ethoxylate diacrylate may be about 1350 centipoise (cP) at 25 degrees Celsius, a viscosity which may be too high to effect dispense of a such a material in a 3D printing process. Therefore, it may be desirable to mix bisphenol-A ethoxylate diacrylate with a lower viscosity reactive diluents, such as low molecular weight acrylates, to lower the viscosity to about 1 cP to about 100 cP at 25° C., such as about 1 cP to about 20 cP at 25 degrees Celsius. The amount of reactive diluent used depends on the viscosity of the formulation components and the diluent(s) themselves. For example, a reactive oligomer of 1000 cP may involve at least 40% dilution by weight of formulation to achieve a target viscosity. Examples of reactive diluents are shown in chemical structures F (isobornyl acrylate), G (decyl acrylate), and H (glycidyl methacrylate):

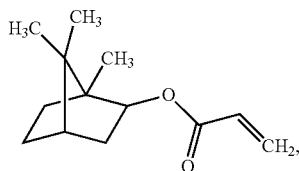

(F)

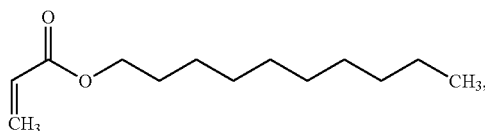

(G)

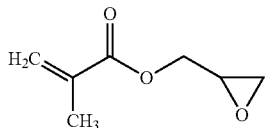

(H)

The respective viscosities of F-G at 25 degrees Celsius are 9.5 cP, 2.5 cP, and 2.7 cP, respectively. Reactive diluents may also be multifunctional, and therefore may undergo crosslinking reactions or other chemical reactions that create polymer networks. In one implementation, glycidyl methacrylate (H), serves as a reactive diluent, and is mixed with a difunctional aliphatic urethane acrylates, so that the viscosity of the mixture is about 15 cP. The approximate dilution factor may be from about 2:1 to about 10:1, such as about 5:1. An amine acrylate may be added to this mixture, such as dimethylaminoethyl methacrylate, so that it is about 10% by weight of the formulation. Heating the mixture from about 25 degrees Celsius to about 75 degrees Celsius causes the reaction of the amine with the epoxide, and formation of the adduct of the acrylated amine and the acrylated epoxide. A suitable free radical photoinitiator, such as Irgacure® 651, may be then added at 2% by weight of formulation, and the mixture may be dispensed by a suitable 3D printer so that a 20-micron thick layer is formed on a substrate. In one example, the layer may then be cured by exposing the droplet or layer for between about 0.1 µs to about 10 seconds, such as about 15 seconds, to UV light from about 200 nm to about 400 nm using a scanning UV diode laser at an intensity of about 10 to about 50 mJ/cm² to create a thin polymer film. Reactive diluent chemical compounds that may be useful for 3D printed polishing pad compositions are available from a variety of sources including Sigma-Aldrich of St. Louis, Mo., USA, Sartomer USA of Exton, Pa., Dymax Corporation of Torrington, Conn., USA, and Allnex Corporation of Alpharetta, Ga., USA.

Another method of radiation cure that may be useful in the production of polishing pads is cationic cure, initiated by UV or low energy electron beam(s). Epoxy group containing materials may be cationically curable, wherein the ring opening polymerization of epoxy groups may be initiated by cations such as protons and Lewis acids. The epoxy materials may be monomers, oligomers or polymers, and may have aliphatic, aromatic, cycloaliphatic, arylaliphatic or heterocyclic structures; and can include epoxide groups as side groups or groups that form part of an alicyclic or heterocyclic ring system.

UV-initiated cationic photopolymerization exhibits several advantages compared to the free-radical photopolymerization including lower shrinkage, better clarity, better through cure via living polymerization, and the lack of oxygen inhibition. UV cationic polymerization may polymerize classes of monomers, which cannot be polymerized by free radical means, such as epoxides, vinyl ethers, propenyl ethers, siloxanes, oxetanes, cyclic acetals and formals, cyclic sulfides, lactones and lactams. These cationically polymerizable monomers include both unsaturated monomers, such as glycidyl methacrylate (chemical structure H) that may also undergo free-radical polymerization through the carbon-carbon double bonds as described herein. Photoinitiators that generate a photoacid when irradiated with UV light (~225 to 300 nm) or electron beams include, but are not limited to aryl onium salts, such as iodonium and sulfonium salts, such as triarylsulfonium hexafluorophosphate salts, which may be obtained from BASF of Ludwigshafen, Germany (Irgacure® product).

In one implementation, the material(s) used to form the first polishing element 204 and the second polishing element 206, and thus the pad body 202, may be formed from the sequential deposition and cationic cure of at least one radiation curable resin precursor composition, wherein the compositions contain functional polymers, functional oligomers, monomers, porosity-forming agent(s) (e.g., water, organic liquids, or water-soluble materials) and/or reactive diluents that have epoxy groups. Mixed free radical and cationic cure systems may be used to save cost and balance physical properties. In one implementation, the first polishing element 204 and the second polishing element 206, may be formed from the sequential deposition and cationic and free radical cure of at least one radiation curable resin precursor composition, wherein the compositions contain functional polymers, functional oligomers, monomers, surfactants, porosity-forming agent(s), and reactive diluents that have acrylic groups and epoxy groups. In another implementation, to take advantage of the clarity and lack of light absorption inherent in some cationically cured systems, an observation window or CMP end-point detection window, which is discussed further below, may be formed from a composition cured by the cationic method. In some implementations, some of the layers in the formed porous polishing pad may be formed by use of a cationic curing method and some of the layers may be formed from a free radical curing method.

In one implementation, as is discussed further below, the 3D printed polymer layers may contain inorganic and/or organic particles that are used to enhance one or more pad properties of selected material layers found in the formed porous polishing pad 200. Because the 3D printing process involves layer-by-layer sequential deposition of at least one composition per layer, additional deposition of inorganic or organic particles disposed upon or within a pad layer may also be desirable to obtain a certain pad property and/or to perform a certain function. The inorganic or organic particles may be added during the porous polishing pad formation process to improve the ultimate tensile strength, improve yield strength, improve the stability of the storage modulus over a temperature range, improve heat transfer, adjust a surfaces zeta potential, and/or adjust a surface's surface energy. The particle type, chemical composition, or size, and the added particles may vary by application or desired effect that is to be achieved. The particles that are integrated in a 3D printed polishing pad may also serve as foci for crosslinking, which may lead to a higher storage modulus E' depending on a percent by weight loading. In another example, a polymer composition containing polar particles, such as ceria, may have a further affinity for polar materials and liquids at the pad surface, such as CMP slurries.

EXEMPLARY FORMULATIONS

The porous polishing pad described herein may be formed from at least one resin precursor composition as described herein. The resin precursor composition may comprise at least one pre-polymer composition. The pre-polymer composition may be an ink jettable pre-polymer composition. The resin precursor composition may comprise, consist essentially of, or consist of at least one of: (1) one or more oligomer components, (2) one or more monomer components, (3) porosity-forming agent(s), (4) one or more emulsifiers/surfactants; (5) a photoinitiator component, (6) reactive diluents, (7) inorganic particles, organic particles or both, and (8) additional additives.

The resin precursor composition may comprise one or more oligomer components (1). Any suitable oligomer component capable of achieving desired properties in the final porous polishing article may be used. The one or more oligomer components may comprise at least one of an acrylic oligomer, a urethane (meth)acrylate oligomer, a polyester based (meth)acrylate oligomer, a polyether based (meth)acrylate oligomer, a silicone based meth(acrylate), vinyl(meth)acrylates, an epoxy (meth)acrylate oligomer or any of the other oligomer components described herein. The oligomer component may be of low viscosity, low volatility, high reactivity, and low glass transition temperature. The oligomer component may be a multifunctional component. The functionality of the oligomer component may be 3 or less. The functionality of the oligomer component may be 2 or less.

Examples of suitable acrylic oligomers include, but are not limited to, those under the designations of CN820, CN152, and CN146, etc. from Sartomer®. Examples of suitable urethane (meth)acrylates include, but are not limited to, aliphatic and aromatic urethane (meth)acrylates under the designations of CN929, CN966, CN978, CN981, CN991, CN992, CN994, CN997, CN1963, CN9006, CN9007, etc. from Sartomer® and those from Cytek® Surface Specialty under the designations of Ebecryl 8402, Ebecryl 1290.

Examples of suitable polyester or polyether based (meth)acrylate oligomers include, but are not limited to, those under the designations of CN292, CN293, CN294E, CN299, CN704, CN2200, CN2203, CN2207, CN2261, CN2261LV, CN2262, CN2264, CN2267, CN2270, CN2271E, CN2273, CN2279, CN2282, CN2283, CN2303, CN3200 etc. from Sartomer® USA, LLC. Examples of suitable epoxy (meth) acrylates oligomer include, but are not limited to, those under the designations of Ebecryl 3701, Ebecryl 3708, Ebecryl 3200, Ebecryl 3600, etc. from Cytek® Surface Specialty, and CN151 from Sartomer®.

The one or more oligomer components may comprise at least 5 wt. %, 10 wt. %, 15 wt. %, 20 wt. %, 25 wt. %, 30 wt. %, 35 wt. %, 40 wt. %, 45 wt. %, 50 wt. %, or 55 wt. % based on the total weight of the resin precursor composition. The one or more oligomer components may comprise up to 10 wt. %, 15 wt. %, 20 wt. %, 25 wt. %, 30 wt. %, 35 wt. %, 40 wt. %, 45 wt. %, 50 wt. %, 55 wt. %, or 60 wt. % based on the total weight of the resin precursor composition. The amount of the oligomer component in the resin precursor composition may be from about 5 wt. % to about 60 wt. % based on the total weight of the resin precursor composition (e.g., from about 10 wt. % to about 60 wt. %., from about 20 wt. % to about 50 wt. %; from about 40 wt. % to about 50 wt. %; or from about 10 wt. % to about 30 wt. %).

The resin precursor composition may further comprise one or more monomer components (2). The monomer component typically offers good solvency to the oligomer component in ink formulations, which dilutes the ink to a low viscosity. The monomer component may also have a low glass transition temperature, which contributes to the flexibility of ink after curing. The monomer component may be a multifunctional component. The functionality of the monomer component may be 3 or less. The functionality of the monomer component may be 2 or less. In one implementation, the monomer component comprises both monofunctional and di-functional monomers.

Examples of suitable mono-functional monomers include, but are not limited to, tetrahydrofurfuryl acrylate (e.g. SR285 from Sartomer®), tetrahydrofurfuryl methacrylate, vinyl caprolactam, isobornyl acrylate, isobornyl methacrylate, 2-phenoxyethyl acrylate, 2-phenoxyethyl methacrylate, 2-(2-ethoxyethoxy)ethyl acrylate, isooctyl acrylate, isodecyl acrylate, isodecyl methacrylate, lauryl acrylate, lauryl methacrylate, stearyl acrylate, stearyl methacrylate, cyclic trimethylolpropane formal acrylate, 2-[[(Butylamino) carbonyl] oxy]ethyl acrylate (e.g. Genomer 1122 from RAHN USA Corporation), 3,3,5-trimethylcyclohexane acrylate, and mono-functional methoxylated PEG (350) acrylate, etc.

Examples of suitable di-functional monomers include, but not are limited to, diacrylates or dimethacrylates of diols and polyether diols, such as propoxylated neopentyl glycol diacrylate, 1,6-hexanediol diacrylate, 1,6-hexanediol dimethacrylate, 1,3-butylene glycol diacrylate, 1,3-butylene glycol dimethacrylate 1,4-butanediol diacrylate, 1,4-butanediol dimethacrylate, alkoxylated aliphatic diacrylate (e.g., SR9209A from Sartomer®), diethylene glycol diacrylate, diethylene glycol dimethacrylate, dipropylene glycol diacrylate, tripropylene glycol diacrylate, triethylene glycol dimethacrylate, and alkoxylated hexanediol diacrylates, e.g. SR562, SR563, SR564 from Sartomer®.

The one or more monomer components may comprise at least 10 wt. %, 15 wt. %, 20 wt. %, 25 wt. %, 30 wt. %, 35 wt. %, 40 wt. %, 45 wt. %, 50 wt. %, or 55 wt. % based on the total weight of the resin precursor composition. The one or more monomer components may comprise up to 15 wt. %, 20 wt. %, 25 wt. %, 30 wt. %, 35 wt. %, 40 wt. %, 45 wt. %, 50 wt. %, 55 wt. %, or 60 wt. % based on the total weight of the resin precursor composition. The amount of the monomer component in the resin precursor composition may be from about 10 wt. % to about 60 wt. % relative to the total weight of the resin precursor composition (e.g., from about 30 wt. % to about 60 wt. %; from about 20 wt. % to about 50 wt. %; from about 40 wt. % to about 50 wt. %; or from about 10 wt. % to about 30 wt. %).

In some implementations, it is desirable to control the properties of one or more of the polishing elements 204, 206 in the porous polishing pad by controlling the relative amounts of oligomers to monomers, or also referred to herein as controlling the oligomer-monomer ratio, in a resin precursor composition to control the amount of cross-linking within the cured material formed by the resin precursor composition. By controlling the oligomer-monomer ratio in a resin precursor composition, the properties (e.g., mechanical, dynamic, polishing performance, etc.) of the formed material can be further controlled. In some configurations, monomers have a molecular weight of less than 600. In some configurations, oligomers have a molecular weight of 600 or more. In some configurations, the oligomer-monomer ratio is defined as a weight ratio of the oligomer component to the monomer component, and is typically selected to achieve the desired strength and modulus. In some implementations, the oligomer-monomer ratio is from about 3:1 to about 1:19 (e.g., 2:1 to 1:2; 1:1 to 1:3; 3:1 to 1:1). In some implementations the oligomer-monomer ratio is from about 3:1 to about 1:3 (e.g., 2:1 to 1:2; 1:1 to 1:3; 3:1 to 1:1). In one example, an oligomer-monomer ratio of 1:1 can be used to achieve desirable toughness properties such as elongation and storage modulus E' while maintaining printability.

The resin precursor composition further comprises a porosity-forming agent (3). A porosity-forming agent may comprise at least 5 wt. %, 10 wt. %, 15 wt. %, 20 wt. %, 25 wt. %, 30 wt. %, 35 wt. %, 40 wt. %, 45 wt. %, 50 wt. %, or 55 wt. % of the total weight of the resin precursor composition. A porosity-forming agent may comprise up to 10 wt. %, 15 wt. %, 20 wt. %, 25 wt. %, 30 wt. %, 35 wt. %, 40 wt. %, 45 wt. %, 50 wt. %, 55 wt. %, or 60 wt. % of the total weight of the resin precursor composition. The amount of porosity-forming agent in the resin precursor composition may be from about 10 wt. % to about 40 wt. % relative to the total weight of the resin precursor composition (e.g., from about 20 wt. % to about 40 wt. %; from about 30 wt. % to about 40 wt. %; from about 20 wt. % to about 30 wt. %; or from about 10 wt. % to about 40 wt. %). The amount of porosity-forming agent in the resin precursor composition may be from about 5 wt. % to about 30 wt. % relative to the total weight of the resin precursor composition (e.g., from about 5 wt. % to about 25 wt. %; from about 10 wt. % to about 25 wt. %; from about 10 wt. % to about 20 wt. %; or from about 10 wt. % to about 30 wt. %).

In one implementation, the porosity-forming agent (3) is selected from water, water-soluble polymers, water-soluble inert materials, water-containing hydrophilic polymers, hydrophilic polymerizable monomers, ionic surfactants and combinations thereof. In one implementation, the porosity-forming agent is vaporizable, soluble in water or soluble in another solvent.

In one implementation, the porosity-forming agent is water. Examples of the water include pure water or ultrapure water such as ion-exchanged water, ultrafiltration water, reverse osmotic water, and distilled water. In another implementation, the porosity-forming agent is an organic liquid. Examples of an organic liquid include ethylene glycol.

In another implementation, the porosity-forming agent is a water-soluble inert material. The water-soluble inert material is added during the additive manufacturing process and then removed to generate pores. The water-soluble inert material may be removed via a rinsing process. In some implementations, the water-soluble inert material is inert to UV radiation used during the curing process. In some implementations, the water-soluble inert material lowers the viscosity of the printable composition. In some implementations, as the deposited material is cured, the water-soluble inert material phase separates from the oligomers and monomers present.

Examples of suitable water-soluble inert materials include, but not are limited to, glycols (e.g., polyethylene glycols), glycol-ethers, and amines. In one implementation, the water-soluble inert material is selected from the group comprising ethylene glycol, butanediol, dimer diol, propylene glycol-(1,2) and propylene glycol-(1,3), octane-1,8-diol, neopentyl glycol, cyclohexane dimethanol (1,4-bis-hydroxymethylcyclohexane), 2-methyl-1,3-propane diol, glycerine, trimethylolpropane, hexanediol-(1,6), hexanetriol-(1, 2,6), butanetriol-(1,2,4), trimethylolethane, pentaerythritol, quinitol, mannitol and sorbitol, methylglycoside, also diethylene glycol, triethylene glycol, tetraethylene glycol, polyethylene glycols, dibutylene glycol, polybutylene glycols, ethylene glycol, ethylene glycol monobutyl ether (EGMBE), diethylene glycol monoethyl ether, ethanolamine, diethanolamine (DEA), triethanolamine (TEA) and combinations thereof.

In another implementation, the porosity-forming agent is a water-containing hydrophilic polymer. Examples of suitable water-containing hydrophilic polymers include, but are not limited to vinyl polymers such as polyvinyl alcohol, polyvinylpyrrolidone (PVP) and polyvinyl methyl ether.

In another implementation, the porosity-forming agent is hydrophilic polymerizable monomer in water. Examples of suitable hydrophilic polymerizable monomers in water include, but are not limited to, triethanolamine (TEA) surfactant, polyoxyethylene alkyl phenyl ether ammonium sulfates, polyoxyethylene alkyl phenyl ethers, anionic phosphate esters, and combinations thereof. In one implementation, the water-containing hydrophilic polymers are selected from Hitenol™ (polyoxyethylene alkyl phenyl ether ammonium sulfate) and Noigen™ (polyoxyethylene alkyl phenyl ether) surfactants commercially available from Dai-Ichi Kogyo Seiyaku Co., Ltd. of Japan; and the Maxemul™ (anionic phosphate ester) surfactants commercially available from Uniqema of The Netherlands. Suitable grades of some of the materials listed above may include Hitenol BC-10™, Hitenol BC-20™, Hitenol BC-30™, Noigen RN-10™, Noigen RN-20™, Noigen RN-30™, Noigen RN-40™, and Maxemul 6106™, which has both phosphonate ester and ethoxy hydrophilicity, a nominal $C_{18}$ alkyl chain with an acrylate reactive group, and 6112™.

In another implementation, the porosity-forming agent contains ionic surfactants, glycols, or mixtures thereof. The ionic surfactants include, for example, ammonium-based salts. Exemplary ammonium-based salts include tetrabutylammonium tetrabutylborate, tetrafluoroborate, hexafluorophosphate, tetrabutylammonium benzoate, or combinations thereof. Exemplary glycols include diethylene glycol and propylene glycol. This non-reactive ionic surfactant/glycol mixture is dispersed into photo-curable ink formulations. After curing, nano-sized and micro-sized mixture drops are trapped in the cured materials. During CMP polishing, mixture drops dissolve into the polishing slurry leaving porous features in the CMP surface. This benefits pad surface interaction with slurry and slurry nanoparticle loading on pads; and in turn, enhances polishing removing rates and reduces the wafer-to-wafer removing rate deviation.

Introduction of cationic materials can also bond to the polymer chain by Norrish Type II reactions further enhancing the positive zeta potential of the pad. These cationic materials contain active hydrogen and may participate in the Norrish Type II reactions thus incorporating into the polymer matrix. Not to be bound by theory but it is believed that addition of higher concentrations (>10%) of acrylic group containing amino materials may increase positive zeta potential. Under such conditions, the formulation becomes thermally unstable and gets cross-linked. In order to overcome this issue, just cationic species are added. These compounds are also miscible very well in the formulation. In some instances with polar components, during the curing these materials phase separate out to form islands that can be removed by treating with water, as they are soluble in water. This will create pores. Exemplary structures of the cationic materials are as follows:

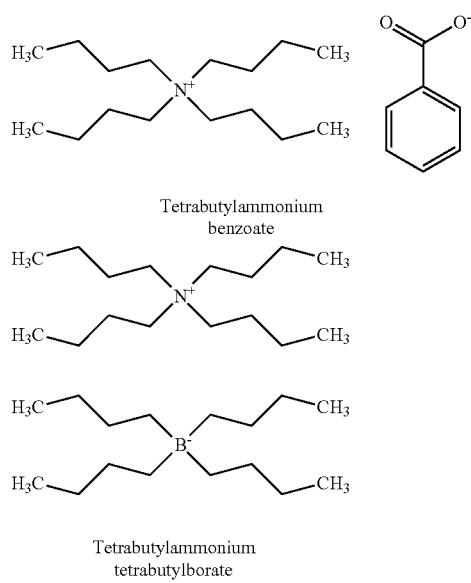

Tetrabutylammonium benzoate

Tetrabutylammonium tetrabutylborate

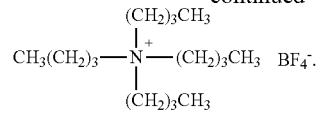

Tetrabutylammonium tetrafluoroborate

In one implementation, the porosity-forming agent is removed by at least one of dissolution from the printed-pad during the polishing process; the porosity-forming agent is sublimated from the printed-pad through annealing post print, and/or evaporated post-printing to create pores/voids within the pad.

The resin precursor composition further comprises one or more emulsifiers (4). The one or more emulsifiers are selected from an anionic surfactant, a cationic surfactant, a nonionic surfactant, an amphoteric or a combination thereof. As used herein, "emulsifier" refers to any compound or substance that enables the formation of an emulsion. The emulsifier may be selected from any surface-active compound or polymer capable of stabilizing emulsions, providing the emulsifier contains at least one anionic, cationic, amphoteric or nonionic surfactant and is used in sufficient quantities to provide the resin precursor composition with a porosity-forming agent-in-liquid polymer emulsion. Typically, such surface-active compounds or polymer stabilize emulsions by preventing coalescence of the dispersed amounts of porosity-forming agent within the emulsion. The surface-active compounds useful as emulsifiers in the present resin precursor composition are anionic, cationic, amphoteric or nonionic surfactant or combination of surfactants. Mixtures of surfactants of different types and/or different surfactants of the same type can be used.

In one implementation, the emulsifier comprises a surfactant with an HLB ranging from 3 to 20. In one implementation, the surfactant has an HLB of at least 3, 4, 5, 6, 7, 8, 9, 10, 11, 12, 13, 14, 15, 16, 17, 18, or 19. In one implementation, the surfactant has an HLB of up to 4, 5, 6, 7, 8, 9, 10, 11, 12, 13, 14, 15, 16, 17, 18, 19, or 20. Thus, the surfactant can have an HLB bounded by any two of the aforementioned endpoints recited for the HLB. In one implementation, the emulsifier comprises a surfactant having an HLB value ranging from 4 to about 14. In one implementation, the emulsifier comprises a surfactant having an HLB of 10 or less. In one implementation, the emulsifier comprises a low HLB surfactant having an HLB value ranging from 3 to about 6.

In one implementation, the emulsifier is a nonionic surfactant. Some suitable nonionic surfactants that can be used include polyoxyethylene alkyl ethers, polyoxyethylene alkyl phenyl ethers, alkylglucosides, polyoxyethylene fatty acid esters, sorbitan fatty acid esters, and polyoxyethylene sorbitan fatty acid esters. Examples of suitable nonionic surfactants include, but are not limited to, octylphenol ethoxylate based surfactants (available from The Dow Chemical Company as TRITON™ X-45, TRITON™ X-100, TRITON™ X-102, TRITON™ X-114, TRITON™ X-305, TRITON™ X-405); benzyl-polyethylene glycol tert-octylphenyl ether (available from The Dow Chemical Company as TRITON™ CF-10); saturated, predominantly unbranched $C_{13}C_{15}$ oxo alcohol conforming to the following structure formula: $RO(CH_2CH_2O)_xH$, wherein R is $C_{13}C_{15}$ oxo alcohol and x is 3, 4, 5, 7, 8, 10, 11 or 30 (available from BASF as Lutensol® AO 3, Lutensol® AO 4, Lutensol® AO 5, Lutensol® AO 7, Lutensol® AO 79, Lutensol® AO 8, Lutensol® AO 89, Lutensol® AO 109, Lutensol® AO 11, Lutensol® AO 30, Lutensol® AO 3109); alkylpolyethylene glycol ethers made from a linear, saturated $C_{16}C_{18}$ fatty alcohol, conforming to the following structure formula: $RO(CH_2CH_2O)_xH$, wherein R is $C_{16}C_{18}$ fatty alcohol and x is 11, 13, 18, 25, 50, or 80 (available from BASF as Lutensol® AT 11, Lutensol® AT 13, Lutensol® AT 18, Lutensol® AT 18 Solution, Lutensol® AT 25 E, Lutensol® AT 25 Powder, Lutensol® AT 25 Flakes, Lutensol® AT 50 E, Lutensol® AT 50 Powder, Lutensol® AT 50 Flakes, Lutensol® AT 80 E, Lutensol® AT 80 Powder, Lutensol® AT 80 Flakes); alkyl polyethylene glycol ethers based on $C_{10}$-Guebet alcohol and ethylene oxides (available from BASF as Lutensol® XP 30, Lutensol® XP 40, Lutensol® XP 50, Lutensol® XP 60, Lutensol® XP 69, Lutensol® XP 70, Lutensol® XP 79, Lutensol® XP 80, Lutensol® XP 89, Lutensol® XP 90, Lutensol® XP 99, Lutensol® XP 100, Lutensol® XP 140); alkyl polyethylene glycol ethers based on $C_{10}$-Guebet alcohol and alkylene oxides (available from BASF as Lutensol® XL 40, Lutensol® XL 50, Lutensol® XL 60, Lutensol® XL 70, Lutensol® XL 79, Lutensol® XL 80, Lutensol® XL 89, Lutensol® XL 90, Lutensol® XL 99, Lutensol® XL 100, Lutensol® XL 140); polyoxyethylene alkylphenyl ether based surfactants (available from Montello, Inc. as NOIGEN RN-10™, NOIGEN RN-20™, NOIGEN RN-30™, NOIGEN RN-40™, NOIGEN RN-5065™); reactive surfactants with one reactive group (available from Ethox Chemicals, LLC as E-Sperse® RS-1616); reactive surfactants with two reactive groups (available from Ethox Chemicals, LLC as E-Sperse® RS-1617); polyoxyethylene alkyl ether (available from Kao Corporation as EMULGEN 1118S-70, HLB value: 16.4); alkoxylated surfactants (available from Air Products and Chemical, Inc. as Nonidet™ RK-18, Nonidet™ SF-3, Nonidet™ SF-5); alkoxylated surfactants (available from Air Products and Chemical, Inc. as Nonidet™ RK-18, Nonidet™ SF-3, Nonidet™ SF-5); ethoxylated alcohol surfactants (available from Air Products and Chemical, Inc. as Tomadol™ 1-3, Tomadol™ 1-5, Tomadol™ 1-7, Tomadol™ 1-9, Tomadol™ 23-1, Tomadol™ 3-3, Tomadol™ 23-5, Tomadol™ 23-6.5, Tomadol™ 400, Tomadol™ 600, Tomadol™ 900, Tomadol™ 1200); polyoxyethylene vegetable-based fatty ethers derived from lauryl, cetyl, stearyl and oleyl alcohols (available from Croda International Plc as Brij™ C10, Brij™ O10, Brij™ L23, Brij™ 58, Brij™ 93).

In one implementation, the emulsifier is an anionic surfactant. Some suitable anionic surfactants, which can be used include (i) sulfonic acids and their salts, including alkyl, alkylaryl, alkylnapthalene, and alkyldiphenylether sulfonic acids, and their salts, having at least 6 carbon atoms in the alkyl substituent, such as dodecylbenzenesulfonic acid, and its sodium salt or its amine salt; (ii) alkyl sulfates having at least 6 carbon atoms in the alkyl substituent, such as sodium lauryl sulfate; (iii) the sulfate esters of polyoxyethylene monoalkyl ethers; (iv) long chain carboxylic acid surfactants and their salts, such as lauric acid, steric acid, oleic acid, and their alkali metal and amine salts.

Examples of suitable anionic surfactants include, but are not limited to, sodium dodecyl sulfate, Poly(ethylene glycol) 4-nonylphenyl 3-sulfopropyl ether potassium salt, surfactants having both phosphonate ester and ethoxy hydrophilicity, a nominal $C_{18}$ alkyl chain with an acrylate reactive group (available from Croda International Plc as MAX-EMUL™ 6106); reactive surfactants based on a styrenated phenol hydrophobe with one equivalent of allyl glycidyl ether, then ethoxylated with 16 moles of EO, sulfated, and neutralized (available from Ethox Chemicals, LLC as E-Sperse® RS-1596); reactive surfactants based on the a styrenated phenol hydrophobe with two equivalents of allyl glycidyl ether, then ethoxylated with 15 moles of EO, sulfated, and neutralized (available from Ethox Chemicals, LLC as E-Sperse® RS-1618); E-Sperse® RS-1684, E-Sperse® RS-1685 (available from Ethox Chemicals, LLC); alternative anionic surfactants suitable for use with various implementations of the present disclosure include polyoxyethylene alkylphenyl ether ammonium sulfates (available from Montello, Inc. as HITENOL BC-10™, HITENOL BC-1025™, HITENOL BC-20™, HITENOL BC-2020™, HITENOL BC-30™); polyoxyethylene styrenated phenyl ether ammonium sulfates (available from Montello, Inc. as HITENOL AR10™, HITENOL AR-1025™, HITENOL AR-20™, HITENOL AR-2020™, HITENOL BC-30™); sodium polyoxyethylene alkylether sulfuric esters (available from Montello, Inc. as HITENOL KH-O5™, HITENOL KH-10™, HITENOL KH-1025™, HITENOL BC-2020™, HITENOL BC-30™; polyoxyethylene nonylphenyl ether phosphates (available from SOLVAY as Rhodafac® RE 610, Rhodafac® RE 610/LC, Rhodafac® RE 610-E); alkyl phosphate esters (available from SOLVAY as Rhodafac® RA 600, Rhodafac® RA 600-E); alkylphenol ethoxylate based phosphate esters (available from SOLVAY as Rhodafac® RM 710, Rhodafac® RP 710); alkyldiphenyloxide disulfonate based surfactants (available from The Dow Chemical Company as DOWFAX™ 2A1, DOWFAX™ 3B2, DOWFAX™ 8390, DOWFAX™ C6L, DOWFAX™ C10L).

In one implementation, the emulsifier is a cationic surfactant. Some suitable cationic surfactants which can be used include an ammonium salt, especially a primary and a quaternary ammonium salt with straight chain alkyl group, such as a primary ammonium salt or an amino acid containing a straight chain alkyl with 3 carbons to 17 carbons, cetyltrimethylammonium bromide (CTAB), cetyltrimethylammonium chloride (CTAC), distearyldimethylammonium chloride, distearyldimethylammonium bromide, stearylbenzyldimethylammonium chloride, n-alkyltriethylammonium bromides or chloride, n-alkyltriethylammonium bromides or chloride and so on, wherein the carbon number of the n-alkyl is 13, 15, 17, 21, or 23, and Lauryl methyl gluceth-10 hydroxypropyldimonium chloride.

In one implementation, the emulsifier is an amphoteric surfactant. Suitable amphoteric surfactants include N-coco β-amino propionic acid; N-lauryl-, myristyl β-amino propionic acid, disodium N-tallow β-iminodipropionate; N-coco β-amino butyric acid; and coco betaine in amounts of about 0.5 weight percent to about 5 weight percent, N-coco-3-aminopropionic acid/sodium salt, N-tallow 3-iminodipropionate disodium salt, N-carboxymethyl-N-dimethyl-N-9-octadecenyl ammonium hydroxide, and N-cocoamidethyl-N-hydroxyethylglycine/sodium salt.

The emulsifier component in the resin precursor composition may comprise at least 0.1 wt. %, 1 wt. %, 2 wt. %, 5 wt. %, 10 wt. %, 15 wt. %, or 17 wt. % based on the total weight of the resin precursor composition. The emulsifier component may comprise up to 1 wt. %, 2 wt. %, 5 wt. %, 10 wt. %, 15 wt. %, 17 wt. %, or 20 wt. % based on the total weight of the resin precursor composition. The amount of emulsifier component in the resin precursor composition may be from about 0.1 wt. % to about 20 wt. % relative to the total weight of the emulsifier (e.g., from about 1 wt. % to about 5 wt. %; from about 5 wt. % to about 10 wt. %; from about 10 wt. % to about 15 wt. %; or from about 15 wt. % to about 20 wt. %).

The resin precursor formulation may further comprise one or more hydrophobes. The hydrophobe may be part of the emulsifier component. Suitable hydrophobes include hexadecane, octadecane, hexadecanol, or polydimethylsiloxane.

The hydrophobe component in the resin precursor composition may comprise at least 0.1 wt. %, 1 wt. %, 2 wt. %, 5 wt. %, 8 wt. %, or 0 wt. % based on the total weight of the resin precursor composition. The hydrophobe component may comprise up to 1 wt. %, 2 wt. %, 5 wt. %, 8 wt. %, 9 wt. %, or 10 wt. % based on the total weight of the resin precursor composition. The amount of hydrophobe component in the resin precursor composition may be from about 0.1 wt. % to about 10 wt. % relative to the total weight of the emulsifier (e.g., from about 1 wt. % to about 5 wt. %; from about 5 wt. % to about 10 wt. %).

The resin precursor composition may further comprise one or more photoinitiator components (5). In the radiation curing process, the photoinitiator component initiates the curing in response to incident radiation. The selection of the type of the photoinitiator component in the resin precursor composition is generally dependent on the wavelength of curing radiation employed in curing the resin precursor composition. Typically, the peak absorption wavelengths of selected photoinitiator vary with the range of wavelength of curing radiation to effectively utilize radiation energy, especially using ultraviolet light as radiation.

Examples of suitable photoinitiators include, but are not limited to, 1-hydroxycyclohexylphenyl ketone, 4-isopropylphenyl-2-hydroxy-2-methyl propan-1-one, 1-[4-(2-hydroxyethoxy)-phenyl]-2-hydroxy-2-methyl-1-propan-1-one, 2,2-dimethyl-2-hydroxy-acetophenone, 2,2-dimethoxy-2-phenylacetophenone, 2-hydroxy-2-methylpropionphenone, Diphenyl (2,4,6-trimethylbenzoyl) phosphine oxide, bis(2,6-dimethoxy-benzoyl)-2,4,6 trimethyl phenyl phosphine oxide, 2-methyl-1-1[4-(methylthio) phenyl]-2-morpholino-propan-1-one, 3,6-bis(2-methyl-2-morpholino-propionyl)-9-n-octylcarbazole, 2-benzyl-2-(dimethylamino)-1-(4-morpholinyl)phenyl)-1-butanone, benzophenone, 2,4,6-trimethylbenzophenone, isopropyl thioxanthone. Suitable blends of photoinitiators commercially available include, but are not limited to, those under the designations of Darocur 4265, Irgacure 1173, Irgacure 2022, Irgacure 2100 from Ciba® Specialty Chemicals; and Esacure KT37, Esacure KT55, Esacure KTO046 from Lamberti®).

The photoinitiator component in the resin precursor composition may comprise at least 0.1 wt. %, 1 wt. %, 2 wt. %, 5 wt. %, 10 wt. %, 15 wt. %, or 17 wt. % based on the total weight of the resin precursor composition. The photoinitiator component may comprise up to 1 wt. %, 2 wt. %, 5 wt. %, 10 wt. %, 15 wt. %, 17 wt. %, or 20 wt. % based on the total weight of the resin precursor composition. The amount of photoinitiator component in the resin precursor composition may be from about 0.1 wt. % to about 20 wt. % relative to the total weight of the resin precursor composition (e.g., from about 1 wt. % to about 5 wt. %; from about 5 wt. % to about 10 wt. %; from about 10 wt. % to about 15 wt. %; or from about 15 wt. % to about 20 wt. %).

The resin precursor composition may further comprise reactive diluents (6). Any suitable reactive diluent suitable to achieve the desired pad porosity may be used. Exemplary reactive diluents are described herein.

The resin precursor composition may further comprise inorganic particles, organic particles or both (7). Because the 3D printing process involves layer-by-layer sequential deposition of at least one composition per layer, it may also be desirable to additionally deposit inorganic or organic particles disposed upon or within a pad layer to obtain a certain pad property and/or to perform a certain function. The inorganic or organic particles may be in the 50 nanometer (nm) to 100 micrometer (μm) range in size and may be added to the precursor materials prior to being dispensed by the 3D printer 306 or added to an uncured printed layer in a ratio of between 1 and 50 weight percent (wt. %). The inorganic or organic particles may be added to during the porous polishing pad formation process to improve the ultimate tensile strength, improve yield strength, improve the stability of the storage modulus over a temperature range, improve heat transfer, adjust a surfaces zeta potential, and adjust a surface's surface energy.

The particle type, chemical composition, or size, and the added particles may vary by application or desired effect that is to be achieved. The inorganic or organic particles may be in the 25 nanometer (nm) to 100 micrometer (μm) range in size and may be added to the precursor materials prior to being dispensed by the droplet ejecting printer or added to an uncured printed layer in a ratio of between 1 and about 50 weight percent (wt. %). In some implementations, the particles may include intermetallics, ceramics, metals, polymers and/or metal oxides, such as ceria, alumina, silica, zirconia, nitrides, carbides, or a combination thereof. In one example, the inorganic or organic particles disposed upon or within a pad may include particles of high performance polymers, such PEEK, PEK, PPS, and other similar materials to improve the thermal conductivity and/or other mechanical properties of the porous polishing pad.

The particle component in the resin precursor composition may comprise at least 0.1 wt. %, 1 wt. %, 2 wt. %, 5 wt. %, 10 wt. %, 15 wt. %, or 17 wt. % based on the total weight of the resin precursor composition. The particle component may comprise up to 1 wt. %, 2 wt. %, 5 wt. %, 10 wt. %, 15 wt. %, 17 wt. %, or 20 wt. % based on the total weight of the resin precursor composition. The amount of particle component in the resin precursor composition may be from about 0.1 wt. % to about 20 wt. % relative to the total weight of the resin precursor composition (e.g., from about 1 wt. % to about 5 wt. %; from about 5 wt. % to about 10 wt. %; from about 10 wt. % to about 15 wt. %; or from about 15 wt. % to about 20 wt. %).

The resin precursor composition may further comprise one or more additional components (8). Additional additives include, but are not limited to stabilizers, surfactants, leveling additives, pH adjusters, sequestering agents, polymer spheres and colorants.

In some implementations, it is desirable to select a surfactant and/or perform a process on the resin precursor composition to assure that the dispersion of one or more components within resin precursor composition, such as the porosity-forming agent and/or particles, is substantially uniform. The "process" performed on the resin precursor composition is also referred to herein as a dispersion process. In one configuration, a process is performed on the resin precursor composition that causes the dispersion of the porosity-forming agent within the formed emulsion to be substantially uniform. In another configuration, a process is performed on a resin precursor composition that contains a surfactant, with an HLB ranging from 3 to 20, that causes the dispersion of the porosity-forming agent within the formed emulsion to be substantially uniform. In some implementations, the dispersed regions of the porosity-forming agent within the formed resin precursor composition is selected such that each dispersed region (e.g., more than one) is only a percentage of the size of the droplet of the resin precursor composition dispensed during the formation of a layer during the additive manufacturing process.

The process of dispensing the droplet of the resin precursor composition is discussed further below. In one example, the droplet of the resin precursor composition used to form part of a layer of the porous polishing pad has a physical size that is between about 10 and 200 micrometers (μm), such as between about 50 and 150 μm, in diameter, and the regions of the porosity-forming agent within the mixed resin precursor composition are between about 1% and 20% of the physical droplet size (e.g., 0.5 μm-30 μm in size). In one configuration, the droplet of the resin precursor composition has a volume between about 10 and about 420 picoliters. It is believed that forming a substantially uniform mixture of the porosity-forming agent can be useful to assure that the porosity in the deposited/printed and cured material is substantially uniform. In some implementations, the dispersion process includes a method of agitating and/or providing a high shear mixing process, for example by use of an impeller or rotor type mixing device, to assure that the dispersion of components within resin precursor composition is substantially uniform.

In some implementations, the resin precursor composition includes polymer spheres, such as 100 nm-1 μm of diameter sized polymer nano-spheres or micro-spheres that are disposed within the droplets that are used to form the CMP pads. In some implementations, the polymer sphere is between 100 nm and 20 μm in size, such as between 100 nm and 5 μm in size. In some additive manufacturing implementations, it may be desirable to dispense a resin precursor composition containing droplet out of a first nozzle and also dispense a droplet of a polymer sphere containing formulation out of a second nozzle so that the two dispensed droplets can mix to form a complete droplet that can then be partially or fully cured to form part of the growing polishing pad.

The polymer spheres may comprise one or more solid polymer materials that have desirable mechanical properties, thermal properties, wear properties, degradation properties, or other useful property for use within the formed advanced polishing pad. Alternately, the polymer spheres may comprise a solid polymer shell that encloses a liquid (e.g., water) or gas material so that the polymer sphere will provide desirable mechanical, thermal, wear, or other useful property to the formed advanced polishing pad. The polymer spheres may include materials that have hydrophilic and/or have hydro-degradable behaviors, such as hydrogels and poly(lactic-co-glycolic acid), PLGA, which degrade in the presence of an aqueous solutions. The polymer spheres are typically uniformly dispersed in the droplet formulations and in the cured materials after performing the additive manufacturing process (e.g., 3D printing).

In some configurations, during a CMP polishing process, the polymer spheres are configured to dissolve into the aqueous slurry or degrade in the presence of slurry, and leave a pore (e.g., 100 nm-1 μm pore feature) in the exposed surface of the advanced polishing pad. It is believed that the use of this type of polymer sphere benefits pad surface interaction with slurry and slurry nanoparticle (such as ceria oxide and silicon dioxide) loading on the pad, which can enhance the polishing removal rate and reduce the common wafer-to-wafer removal rate deviations found in CMP processes.

In one implementation, the method of agitating and/or providing a high shear mixing process is performed with an emulsification apparatus. Examples of an emulsification apparatus that is used include, but are not limited to, an ultrasonic homogenizer, TK Homomixer (manufactured by PRIMIX Corporation), TK Filmics (manufactured by PRIMIX Corporation), a high pressure homogenizer (PANDA 2K, manufactured by GEA Niro Soavi), Microfluidizer® (manufactured by Microfluidics), Nanomizer (manufactured by Yoshida Kikai Co., Ltd.), and the like.

In some implementations, the dispersion process may be performed just prior to placing the resin precursor composition within the hardware used to deposit the resin precursor composition on a substrate. In one example, the resin precursor composition is mixed minutes, or even 1-2 hours, before depositing the resin precursor composition using the hardware in the deposition section 355 of an additive manufacturing system 350 (FIG. 3A), which is discussed below. In some implementations, the dispersion process may be performed prior to the shipment, or transfer, of the resin precursor composition from a point where the resin precursor composition is blended (e.g., precursor formulation section 354 in FIG. 3A) to the point where the resin precursor composition is deposited (e.g., deposition section 355). In this example, the resin precursor composition is mixed days or weeks before the resin precursor composition is deposited/printed by the hardware found within the deposition section 355 of an additive manufacturing system 350 (FIG. 3A).

In some implementations, it is desirable to deliver components of the resin precursor composition separately during deposition. In one implementation, for example, the porosity-forming agent is deposited separately from the other components of the resin precursor composition. In implementations where the resin precursor is deposited separately from the porosity-forming agent(s), the resin precursor formulation may comprise at least one of the following components as described herein: 1) one or more oligomer components, (2) one or more monomer components, (3) one or more emulsifiers/surfactants, (4) a photoinitiator component, (5) reactive diluents, (6) inorganic particles, organic particles or both, and (7) additional additives. The porosity-forming agent may be part of a porosity-forming agent mixture containing additional components. For example, the porosity-forming agent may be combined with any of the following components as described herein: 1) one or more oligomer components, (2) one or more monomer components, (3) one or more emulsifiers/surfactants, (4) a photoinitiator component, (5) reactive diluents, (6) inorganic particles, organic particles or both, and (7) additional additives.

Additive Manufacturing Apparatus and Process Examples

Figure 3A:
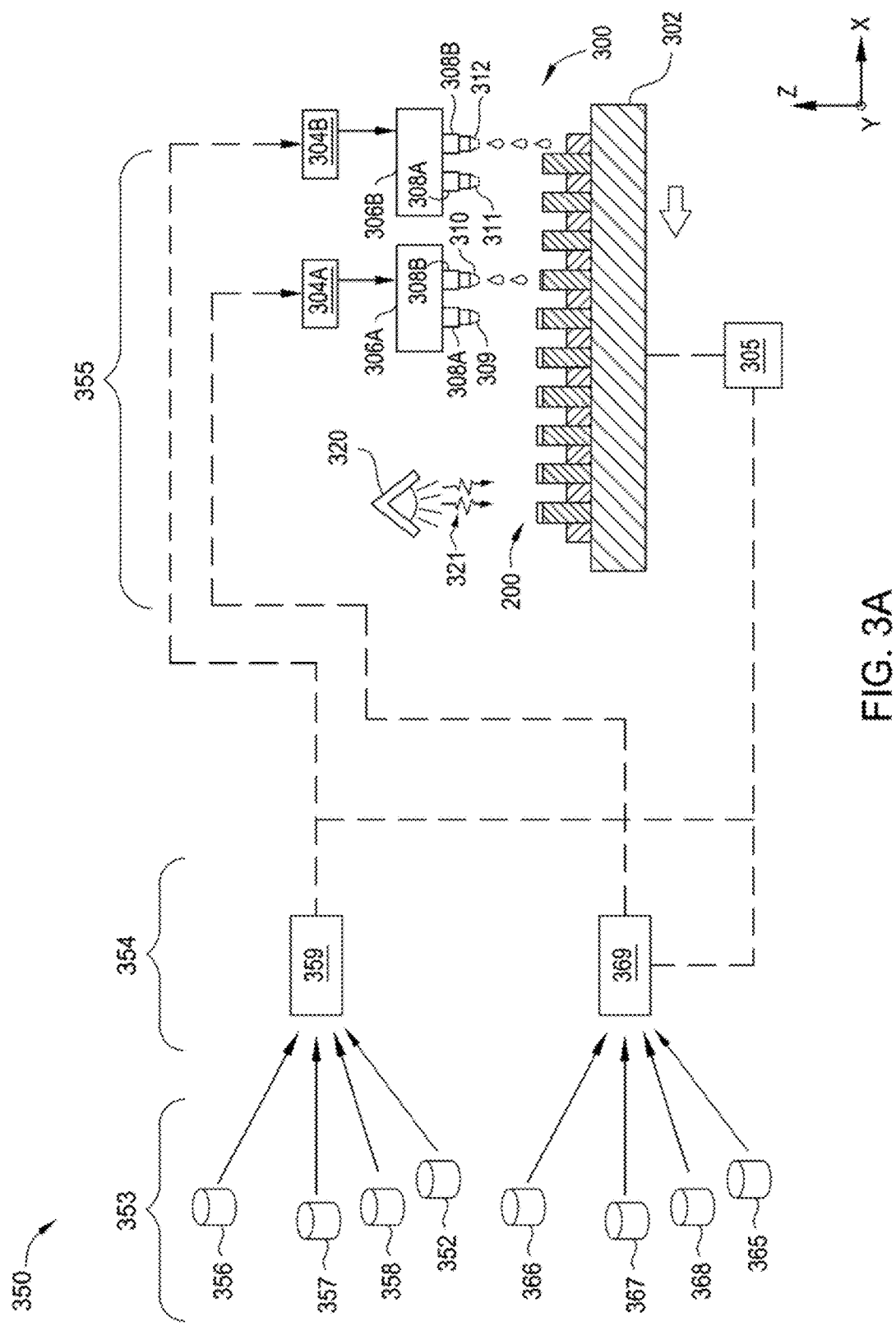
FIG. 3A is a schematic view of a system for manufacturing porous polishing pads, according to an implementation of the present disclosure.

FIG. 3A is a schematic sectional view of an additive manufacturing system 350 that can be used to form a porous polishing pad using an additive manufacturing process according to one or more implementations of the present disclosure. An additive manufacturing process may include, but is not limited to, a process, such as a polyjet deposition process, inkjet printing process, fused deposition modeling process, binder jetting process, powder bed fusion process, selective laser sintering process, stereolithographic process, vat photopolymerization process, digital light processing, sheet lamination process, directed energy deposition process, or other similar 3D deposition process.

The additive manufacturing system 350 generally includes a precursor delivery section 353, a precursor formulation section 354 and a deposition section 355. The precursor formulation section 354 includes a section of the additive manufacturing system 350 where the resin precursor components positioned in the precursor delivery section 353 are mixed to form one or more resin precursor compositions. The deposition section 355 will generally include an additive manufacturing device, or hereafter printing station 300, that is used to deposit one or more resin precursor compositions on layers disposed over a support 302. The porous polishing pad 200 may be printed on the support 302 within the printing station 300. Typically, the porous polishing pad 200 is formed layer-by-layer using one or more droplet ejecting printers 306, such as printer 306A and printer 306B illustrated in FIG. 3A, from a CAD (computer-aided design) program. The printers 306A, 306B and the support 302 may move relative to each other during the printing process.

The droplet ejecting printer 306 may include one or more print heads 308 (e.g., print heads 308A, 308B) having one or more nozzles (e.g., nozzles 309-312) for dispensing liquid precursors. In the implementation of FIG. 3A, the printer 306A includes print head 308A that has a nozzle 309 and a print head 308B having a nozzle 310. The nozzle 309 may be configured to dispense a first liquid precursor composition to form a first polymer material, such as a porous polymer, while the nozzle 310 may be used to dispense a second liquid precursor to form a second polymer material, such as a non-porous polymer, or a porous polymer. The liquid precursor compositions may be dispensed at selected locations or regions to form a porous polishing pad that has desirable properties. These selected locations collectively form the target printing pattern that can be stored as a CAD-compatible file that is then read by an electronic controller 305, which controls the delivery of the droplets from the nozzles of the droplet ejecting printer 306.

The electronic controller 305 is generally used to facilitate the control and automation of the components within the additive manufacturing system 350, including the printing station 300. The electronic controller 305 can be, for example, a computer, a programmable logic controller, or an embedded controller. The electronic controller 305 typically includes a central processing unit (CPU) (not shown), memory (not shown), and support circuits for inputs and outputs (I/O) (not shown). The CPU may be one of any form of computer processors that are used in industrial settings for controlling various system functions, substrate movement, chamber processes, and control support hardware (e.g., sensors, motors, heaters, etc.), and monitor the processes performed in the system. The memory is connected to the CPU, and may be one or more of a readily available non-volatile memory, such as random access memory (RAM), flash memory, read only memory (ROM), floppy disk, hard disk, or any other form of digital storage, local or remote. Software instructions and data can be coded and stored within the memory for instructing the CPU. The support circuits are also connected to the CPU for supporting the processor in a conventional manner. The support circuits may include cache, power supplies, clock circuits, input/output circuitry, subsystems, and the like. A program (or computer instructions) readable by the electronic controller 305 determines which tasks are performable by the components in the additive manufacturing system 350. The program may be software readable by the electronic controller 305 that includes code to perform tasks relating to monitoring, execution and control of the delivery and positioning of droplets delivered from the printer 306, and the movement, support, and/or positioning of the components within the printing station 300 along with the various process tasks and various sequences being performed in the electronic controller 305.

After 3D printing, the porous polishing pad 200 may be solidified or partially solidified by use of a curing device 320 that is disposed within the deposition section 355 of the additive manufacturing system 350. The curing process performed by the curing device 320 may be performed by heating the printed polishing pad to a curing temperature or exposing the pad to one or more forms of electromagnetic radiation or electron beam curing. In one example, the curing process may be performed by exposing the printed polishing pad to radiation 321 generated by an electromagnetic radiation source, such as a visible light source, an ultraviolet light source, x-ray source, or other type of electromagnetic wave source that is disposed within the curing device 320.

The additive manufacturing process offers a convenient and highly controllable process for producing porous polishing pads with discrete features formed from different materials and/or different compositions of materials.

In another implementation, the first polishing elements 204 and/or the second polishing element(s) 206 may each be formed from a mixture of two or more compositions. In one example, a first composition may be dispensed in the form of droplets by a first print head, such as the print head 308A, and the second composition may be dispensed in the form of droplets by a second print head, such as the print head 308B of the printer 306A. To form first polishing elements 204 with a mixture of the droplets delivered from multiple print heads typically includes the alignment of the pixels corresponding to the first polishing elements 204 on predetermined pixels within a deposition map found in the electronic controller 305. The print head 308A may then align with the pixels corresponding to where the first polishing elements 204 are to be formed and then dispense droplets on the predetermined pixels. The porous polishing pad may thus be formed from a first composition of materials that is formed by depositing droplets of a first droplet composition and a second material that comprises a second composition of materials that is formed by depositing droplets of a second droplet composition.

FIG. 3B is a schematic cross-sectional view of a portion of the printing station 300 and the porous polishing pad 200 during the pad manufacturing process. The printing station 300, as shown in FIG. 3B, includes two printers 306A and 306B that are used to sequentially form a portion of the porous polishing pad 200. The portion of the porous polishing pad 200 shown in FIG. 3B may, for example, include part of either the first polishing element 204 or the second polishing elements 206 in the finally formed porous polishing pad 200. During processing the printers 306A and 306B are configured to deliver droplets "A" or "B," respectively, to a first surface of the support 302 and then successively to a surface of the growing polishing pad that is disposed on the support 302 in a layer-by-layer process.

As shown in FIG. 3B, a second layer 348 is deposited over a first layer 346 which has been formed on the support 302. In one implementation, the second layer 348 is formed over the first layer 346, which has been processed by the curing device 320 that is disposed downstream from the printers 306A and 306B in the pad manufacturing process. In some implementations, portions of the second layer 348 may be simultaneously processed by the curing device 320 while one or more of the printers 306A and 306B are depositing droplets "A" and/or "B" onto the surface 346A of the previously formed first layer 346. In this case, the layer that is currently being formed may include a processed portion 348A and an unprocessed portion 348B that are disposed on either side of a curing zone 349A. The unprocessed portion 348B generally includes an array of dispensed droplets, such as dispensed droplets 343 and 347, which are deposited on the surface 346A of the previously formed first layer 346 by use of the printers 306B and 306A, respectively.

FIG. 3C is a close up cross-sectional view of a dispensed droplet 343 that is disposed on a surface 346A of the previously formed first layer 346. Based on the properties of the materials within the dispensed droplet 343, and due to surface energy of the surface 346A the dispensed droplet will spread across the surface an amount that is larger than the size of the original dispensed droplet (e.g., droplets "A" or "B"), due to surface tension. The amount of spread of the dispensed droplet will vary as a function of time from the instant that the droplet is deposited on the surface 346A. However, after a very short period of time (e.g., <1 second) the spread of the droplet will reach an equilibrium size, and have an equilibrium contact angle $\alpha$. The spread of the dispensed droplet across the surface affects the resolution of the placement of the droplets on the surface of the growing polishing pad, and thus the resolution of the features and material compositions found within various regions of the final polishing pad.

In some implementations, it is desirable to expose one or both of the droplets "A" and "B" after they have been contact with the surface of the substrate for a period of time to cure, or "fix," each droplet at a desired size before the droplet has a chance to spread to its uncured equilibrium size on the surface of the substrate. In this case, the energy supplied to the dispensed droplet and surface on which the droplet is placed by the curing device 320 and the droplet's material composition are adjusted to control the resolution of each of the dispensed droplets. Therefore, one optional parameter to control or tune during a 3D printing process is the control of the dispensed droplet's surface tension relative to the surface on which the droplet is disposed.

In some implementations, it is desirable to add one or more curing enhancement components (e.g., photoinitiators) to the droplet's formulation to control the kinetics of the curing process, prevent oxygen inhibition, and/or control the contact angle of the droplet on the surface on which the droplet is deposited. One will note that the curing enhancement components will generally include materials that are able to adjust: 1) the amount of bulk curing that occurs in the material in the dispensed droplet during the initial exposure to a desired amount of electromagnetic radiation, 2) the amount of surface curing that occurs in the material in the dispensed droplet during the initial exposure to a desired amount of electromagnetic radiation, and 3) the amount of surface property modification (e.g., additives) to the surface cured region of the dispensed droplet. The amount of surface property modification to the surface cured region of the dispensed droplet generally includes the adjustment of the surface energy of the cured or partially cured polymer found at the surface of the dispensed and at least partially cured droplet.

It has been found that it is desirable to partially cure each dispensed droplet to "fix" its surface properties and dimensional size during the printing process. Further, it has also been found the partial curing of the droplet allows for the removal of the porosity-forming agent (e.g., water) after the initial pad structure has been formed. The ability to "fix" the droplet at a desirable size can be accomplished by adding a desired amount of at least one curing enhancement components to the droplet's material composition and delivering a sufficient amount of electromagnetic energy from the curing device 320 during the additive manufacturing process. In some implementations, it is desirable to use a curing device 320 that is able to deliver between about 1 milli-joule per centimeter squared ($mJ/cm^2$) and 100 $mJ/cm^2$, such as about 10-20 $mJ/cm^2$, of ultraviolet (UV) light to the droplet during the additive layer formation process. The UV radiation may be provided by any UV source, such as mercury microwave arc lamps (e.g., H bulb, H+ bulb, D bulb, Q bulb, and V bulb type lamps), pulsed xenon flash lamps, high-efficiency UV light emitting diode arrays, and UV lasers. The UV radiation may have a wavelength between about 170 nm and about 500 nm.

In some implementations, the size of dispensed droplets "A", "B" may be from about 10 to about 200 microns, such as about 50 to about 70 microns. Depending on the surface energy (dynes) of the substrate or polymer layer that the droplet is dispensed over and upon, the uncured droplet may spread on and across the surface to a fixed droplet size 343A of between about 10 and about 500 microns, such as between about 50 and about 200 microns. In one example, the height of such a droplet may be from about 5 to about 100 microns, depending on such factors as surface energy, wetting, and/or resin precursor composition, which may include other additives, such as flow agents, thickening agents, and surfactants. One source for the additives is BYK-Gardner GmbH of Geretsried, Germany.

In some implementations, it is generally desirable to select a photoinitiator, an amount of the photoinitiator in the droplet composition, and the amount of energy supplied by curing device 320 to allow the dispensed droplet to be "fixed" in less than about 1 second, such as less than about 0.5 seconds after the dispensed droplet has come in contact with the surface on which it is to be fixed. The actual time it takes to partially cure the dispensed droplet, due to the exposure to delivered curing energy, may be longer or shorter than the time that the droplet resides on the surface before it is exposed to the delivered radiation, since the curing time of the dispensed droplet will depend on the amount of radiant energy and wavelength of the energy provide from the curing device 320. In one example, an exposure time used to partially cure a 120 micrometer ($\mu m$) dispensed droplet is about 0.4 microseconds ($\mu s$) for a radiant exposure level of about 10-15 $mJ/cm^2$ of UV radiation. In an effort to "fix" the droplet in this short timeframe one should position the dispense nozzle of the droplet ejecting printer 306 a short distance from the surface of the surface of the porous polishing pad, such as between 0.1 and 10 millimeters (mm), or even 0.5 and 1 mm, while the surface 346A of the porous polishing pad are exposed to the radiation 321 delivered from the curing device 320.

It has also been found that by controlling droplet composition, the amount of cure of the previously formed layer (e.g., surface energy of the previously formed layer), the amount of energy from the curing device 320 and the amount of the photoinitiator in the droplet composition, the contact angle $\alpha$ of the droplet can be controlled to control the fixed droplet size, and thus the resolution of the printing process. In one example, the underlying layer cure may be a cure of about 70% acrylate conversion. A droplet that has been fixed, or at least partially cured, is also referred to herein as a cured droplet. In some implementations, the fixed droplet size 343A is between about 10 and about 200 microns. In some implementations, the contact angle, also referred to herein as the dynamic contact angle (e.g., non-equilibrium contact angle), for a "fixed" droplet can be desirably controlled to a value of at least 50°, such as greater than 55°, or even greater than 60°, or even greater than 70°.

The resolution of the pixels within a pixel chart that is used to form a layer, or a portion of a layer, by an additive manufacturing process can be defined by the average "fixed" size of a dispensed droplet. The material composition of a layer, or portion of a layer, can thus be defined by a "dispensed droplet composition," which a percentage of the total number of pixels within the layer, or portion of the layer, that include droplets of a certain droplet composition. In one example, if a region of a layer of a formed porous polishing pad is defined as having a dispensed droplet composition of a first dispensed droplet composition of 60%, then 60% percent of the pixels within the region will include a fixed droplet that includes the first material composition. In cases where a portion of a layer contains more than one material composition, it may also be desirable to define the material composition of a region within a porous polishing pad as having a "material composition ratio." The material composition ratio is a ratio of the number of pixels that have a first material composition disposed thereon to the number of pixels that have a second material composition disposed thereon.

In one example, if a region was defined as containing 1,000 pixels, which are disposed across an area of a surface, and 600 of the pixels contain a fixed droplet of a first droplet composition and 400 of the pixels contain a fixed droplet of a second droplet composition then the material composition ratio would include a 3:2 ratio of the first droplet composition to the second droplet composition. In configurations where each pixel may contain greater than one fixed droplet (e.g., 1.2 droplets per pixel) then the material composition ratio would be defined by the ratio of the number of fixed droplets of a first material to the number of fixed droplets of a second material that are found within a defined region. In one example, if a region was defined as containing 1,000 pixels, and there were 800 fixed droplets of a first droplet composition and 400 fixed droplets of a second droplet composition within the region, then the material composition ratio would be 2:1 for this region of the porous polishing pad.

The amount of curing of the surface of the dispensed droplet that forms the next underlying layer is a polishing pad formation process parameter, since the amount of curing in this "initial dose" affects the surface energy that the subsequent layer of dispensed droplets will be exposed to during the additive manufacturing process. The amount of the initial cure dose is also influential since it will also affect the amount of curing that each deposited layer will finally achieve in the formed polishing pad, due to repetitive exposure of each deposited layer to additional transmitted curing radiation supplied through the subsequently deposited layers, as they are grown thereon. It is generally desirable to prevent over curing of a formed layer, since it will affect the material properties of the over cured materials and/or the wettability of the surface of the cured layer to subsequently deposited dispensed droplets in subsequent steps.

In one example, to effect polymerization of a 10-30 micron thick layer of dispensed droplets may be performed by dispensing each droplet on a surface and then exposing the dispensed droplet to UV radiation at a radiant exposure level of between about 10 and about 15 mJ/cm² after a period of time of between about 0.1 seconds and about 1 second has elapsed. However, in some implementations, the radiation level delivered during the initial cure dose may be varied layer-by-layer. For example, due to differing dispensed droplet compositions in different layers, the amount of UV radiation exposure in each initial dose may be adjusted to provide a desirable level of cure in the currently exposed layer, and also to one or more of the underlying layers.

In some implementations, it is desirable to control the droplet composition and the amount of energy delivered from the curing device 320 during the initial curing step, which is a step in which the deposited layer of dispensed droplets are directly exposed to the energy provided by the curing device 320, to cause the layer to only partially cure a desired amount. In general, it is desirable for the initial curing process to predominantly surface cure the dispensed droplet versus bulk cure the dispensed droplet, since controlling the surface energy of the formed layer is significant for controlling the dispensed droplet size. In one example, the amount that a dispensed droplet is partially cured can be defined by the amount of chemical conversion of the materials in the dispensed droplet. In one example, the conversion of the acrylates found in a dispensed droplet that is used to form a urethane polyacrylate containing layer, is defined by a percentage x, which is calculated by the equation:

$$x = 1 - [(A_{C=C}/A_{C=O})_x/(A_{C=C}/A_{C=O})_0],$$

where $A_{C=C}$ and $A_{C=O}$ are the values of the C=C peak at 910 cm$^{-1}$ and the C=O peaks at 1700 cm$^{-1}$ found using FT-IR spectroscopy. During polymerization, C=C bonds within acrylates are converted to C—C bond, while C=O within acrylates has no conversion. The intensity of C=C to C=O hence indicates the acrylate conversion rate. The $A_{C=C}/A_{C=O}$ ratio refers to the relative ratio of C=C to C=O bonds within the cured droplet, and thus the $(A_{C=C}/A_{C=O})_0$ denotes the initial ratio of $A_{C=C}$ to $A_{C=O}$ in the droplet, while $(A_{C=C}/A_{C=O})_x$ denotes the ratio of $A_{C=C}$ to $A_{C=O}$ on the surface of the substrate after the droplet has been cured.

In some implementations, the amount that a layer is initially cured may be equal to or greater than about 70% of the dispensed droplet. In some configurations, it may be desirable to partially cure the material in the dispensed droplet during the initial exposure of the dispensed droplet to the curing energy to a level from about 70% to about 80%, so that the target contact angle of the dispensed droplet may be attained. It is believed that the uncured or partially acrylate materials on top surface are copolymerized with the subsequent droplets, and thus yield cohesion between the layers.

The process of partially curing a dispensed droplet during the initial layer formation step can also be significant to assure water removal from the polishing pad structure to form the pores within the pad structure.

The process of partially curing a dispensed droplet during the initial layer formation step can also be significant to assure that there will be some chemical bonding/adhesion between subsequently deposited layers, due to the presence of residual unbonded groups, such as residual acrylic groups. Since the residual unbonded groups have not been polymerized, they can be involved in forming chemical bonds with a subsequently deposited layer. The formation of chemical bonds between layers can thus increase the mechanical strength of the formed porous polishing pad in the direction of the layer-by-layer growth during the pad formation process (e.g., Z-direction in FIG. 3B). As noted above, the bonding between layers may thus be formed by both physical and/or chemical forces.

The mixture of the dispensed droplet, or positioning of the dispensed droplets, can be adjusted on a layer-by-layer basis to form layers that individually have tunable properties, and a porous polishing pad that has desirable pad properties that are a composite of the formed layers. In one example, as shown in FIG. 3B, a mixture of dispensed droplets includes a 50:50 ratio of the dispensed droplets 343 and 347 (or a material composition ratio of 1:1), wherein the dispensed droplet 343 includes at least one different material from the material found in the dispensed droplet 347.

Properties of portions of the pad body 202, such as the first polishing elements 204 and/or second polishing elements 206 may be adjusted or tuned according to the ratio and/or distribution of a first composition and a second composition that are formed from the positioning of the dispensed droplets during the deposition process. For example, the weight % of the first composition may be from about 1% by weight based on total composition weight to about 100% based on total composition weight. In a similar fashion, the second composition may be from about 1% by weight based on total composition weight to about 100% based on total composition weight. Depending on the material properties that are desired, such as hardness and/or storage modulus, compositions of two or more materials can be mixed in different ratios to achieve a desired effect. In one implementation, the composition of the first polishing elements 204 and/or second polishing elements 206 is controlled by selecting at least one composition or a mixture of compositions, and size, location, and/or density of the droplets dispensed by one or more printers. Therefore, the electronic controller 305 is generally adapted to position the nozzles 309-310, 311-312 to form a layer that has interdigitated droplets that have been positioned in a desired density and pattern on the surface of the porous polishing pad that is being formed.

In some configurations, dispensed droplets may be deposited in such a way as to ensure that each drop is placed in a location where it does not blend with other drops, and thus each remains a discrete material "island" prior to being cured. In some configurations, the dispensed droplets may also be placed on top of prior dispensed droplets within the same layer to increase the build rate or blend material properties. Placement of droplets relative to each other on a surface may also be adjusted to allow partial mixing behavior of each of the dispensed droplets in the layer. In some cases, it may be desirable to place the droplets closer together or farther apart to provide more or less mixing of the components in the neighboring droplets, respectively. It has been found that controlling droplet placement relative to other dispensed droplets and the composition of each droplet can have an effect on the mechanical and polishing properties of the formed porous polishing pad.

Even though only two compositions are generally discussed herein for forming the first polishing elements 204 and/or second polishing elements 206, implementations of the present disclosure encompass forming features on a porous polishing pad with a plurality of materials that are interconnected via compositional gradients. In some configurations, the composition of the first polishing elements 204 and/or second polishing elements 206 in a porous polishing pad are adjusted within a plane parallel to the polishing surface and/or through the thickness of the porous polishing pad, as discussed further below.

The ability to form compositional gradients and the ability to tune the chemical content locally, within, and across a porous polishing pad are enabled by "ink jettable" low viscosity compositions, or low viscosity "inks" in the 3D printing arts that are used to form the droplets "A" and/or "B" illustrated in FIG. 3B. The low viscosity inks are "pre-polymer" compositions and are the "precursors" to the formed first polishing elements 204 and second polishing elements 206 found in the pad body 202. The low viscosity inks enable the delivery of a wide variety of chemistries and discrete compositions that are not available by conventional techniques (e.g., molding and casting), and thus enable controlled compositional transitions or gradients to be formed within different regions of the pad body 202. This may be achieved by the addition and mixing of viscosity thinning reactive diluents to high viscosity functional oligomers to achieve the appropriate viscosity formulation, followed by copolymerization of the diluent(s) with the higher viscosity functional oligomers when exposed to a curing energy delivered by the curing device 320. The reactive diluents may also serve as a solvent, thus eliminating the use of inert non-reactive solvents or thinners that should be removed at each step.

Referring to the precursor delivery section 353 and precursor formulation section 354 of FIG. 3A, in one implementation, a first porosity-forming agent/emulsifier mixture 352, a first precursor 356, and optionally a second precursor 357 are mixed with a diluent 358 to form a first printable ink composition 359, which is delivered to reservoir 304B of the printer 306B, and used to form portions of the pad body 202. Similarly, a second porosity-forming agent/emulsifier mixture 365, a third precursor 366, and optionally a fourth precursor 367 can be mixed with a diluent 368 to form a second printable ink composition 369, which is delivered to reservoir 304A of the printer 306A, and used to form another portion of the pad body 202. In some implementations, the first precursor 356 and the third precursor 366 each comprise an oligomer, such as multifunctional oligomer, the second precursor 357 and the fourth precursor 367 each comprise a multifunctional monomer, the diluent 358 and the diluent 368 each comprise a reactive diluent (e.g., monomer) and/or initiator (e.g., photo-initiator), and the porosity-forming agent/emulsifier mixtures 352, 365 provide the porous structure when removed from the pad body.

One example of a first printable ink composition 359 may include a first precursor 356 which includes a reactive difunctional oligomer, comprising aliphatic chain segments, which may have a viscosity from about 1,000 centipoise (cP) at 25 degrees Celsius, to about 12,000 cP at degrees Celsius, is then mixed with and thus diluted by a 10 cP at degrees Celsius reactive diluent (e.g., diluent 358), such as monoacrylate, to create a new composition that has new viscosity. The printable composition thus obtained may exhibit a viscosity from about 80 cP to about 110 cP at 25 degrees Celsius, and a viscosity from about 15 cP to about 30 cP at 70 degrees Celsius, which may be effectively dispensed from a 3D printer ink jet nozzle.

Referring to the precursor delivery section 353 and precursor formulation section 354 of FIG. 3A, in one implementation, a first precursor 356, and optionally a second precursor 357 are mixed with a diluent 358 to form a first printable ink composition 359, which is delivered to reservoir 304B of the printer 306B, and used to form portions of the pad body 202. Similarly, the second porosity-forming agent/emulsifier mixture 365, optionally a third precursor 366, and optionally a fourth precursor (e.g., an emulsifier precursor) 367 can be mixed with a diluent 368 to form a second printable ink composition 369, which is delivered to reservoir 304A of the printer 306A, and removed to form the porous areas of the pad body 202. In some implementations, the first precursor 356 and the third precursor 366 each comprise an oligomer, such as a multifunctional oligomer, the second precursor 357 and the fourth precursor 367 each comprise a multifunctional monomer, the diluent 358 and the diluent 368 each comprise a reactive diluent (e.g., monomer) and/or initiator (e.g., photo-initiator), and the second porosity-forming agent/emulsifier mixture 365 is at least one of water, a water-soluble polymer, a water-soluble inert material, a water-containing hydrophilic polymers, a hydrophilic polymerizable monomers, and combinations thereof. The second printable ink composition 369 containing the second porosity-forming agent/emulsifier mixture 365 provides the porous structure when removed from the pad body.

One example of a first printable ink composition 359 may include a first precursor 356 which includes a reactive difunctional oligomer, comprising aliphatic chain segments, which may have a viscosity from about 1,000 centipoise (cP) at 25 degrees Celsius, to about 12,000 cP at degrees Celsius, is then mixed with and thus diluted by a 10 cP at degrees Celsius reactive diluent (e.g., diluent 358), such as monoacrylate, to create a new composition that has new viscosity. The printable composition thus obtained may exhibit a viscosity from about 80 cP to about 110 cP at 25 degrees Celsius, and a viscosity from about 15 cP to about 30 cP at 70 degrees Celsius, which may be effectively dispensed from a 3D printer ink jet nozzle.

One example of a second printable ink composition 369 may include water.

Figure 4B:
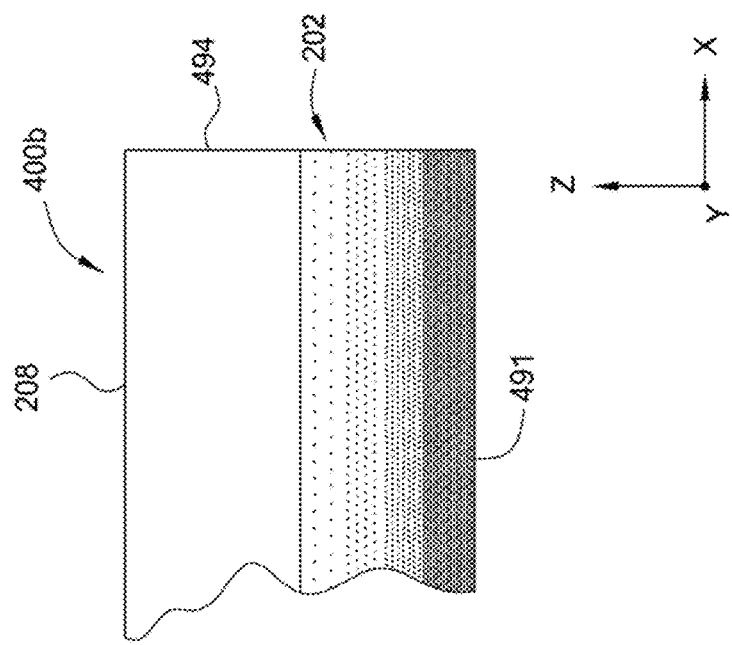
FIG. 4B is a schematic side cross-sectional view of a portion of a porous polishing pad, according to an implementation of the present disclosure.
Figure 4A:
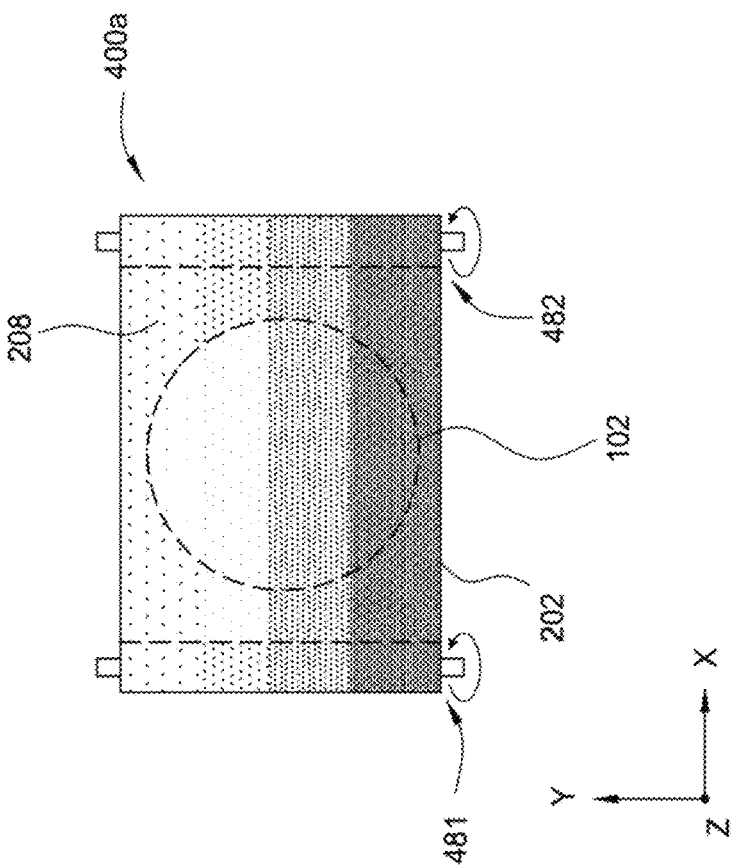
FIG. 4A is a schematic top view of a web or roll-to-roll type polishing pad, according to an implementation of the present disclosure.

FIG. 4A is a schematic view of a web based porous polishing pad 400a that is formed using an additive manufacturing process to form a polishing surface or upper surface(s) 208 that has a gradient in material composition across the polishing surface or upper surface(s) 208 (e.g., Y-direction). As shown in FIG. 4A the polishing material may be disposed over a platen 102 between a first roll 481 and a second roll 482. By building a web, or even standard polishing pad, with differing regions of porosity the substrate can be moved over different locations on the web based porous polishing pad 400a during different portions of the polishing process to provide the desired mechanical properties during each phase of the polishing process. One example may involve a substrate having an initial surface texture removed rapidly using a planarizing portion of the web based porous polishing pad 400a that has a first porosity and then moving the substrate to a second portion of the web based porous polishing pad 400a that has a second porosity that may be identical to or different than the first porosity.

FIG. 4B is schematic side cross-sectional view of a porous polishing pad 400b that is formed using an additive manufacturing process to form a polishing base layer 491 that has a gradient in material composition in the Z-direction. Gradients in the material composition and/or material properties of the stacked printed layers of the polishing base layer 491 can vary from a high concentration to a low concentration of a first material to a second material in one direction, or vice versa. In some cases, one or more regions within the porous polishing pad may include more complex concentration gradients, such as a high/low/high or low/high/low concentration gradient of at least two materials that have differing material properties. In one example, at least two materials that form the concentration gradient have different porosities. In some configurations, the porous polishing pad 400b may include a polishing element region 494 that may include discrete regions that include at least a first polishing element 204 and a second polishing element 206. In one example, the polishing element region 494 may include a portion of a pad body 202 that contains one or more of the structures shown in FIGS. 2A-2E.

In one implementation, the polishing base layer 491 includes a homogeneous mixture of two or more different materials in each layer formed within the polishing base layer 491. In one example, the homogeneous mixture may include a mixture of the materials used to form the first polishing element 204 and the second polishing element 206 in each layer formed within the polishing base layer 491. In some configurations, it is desirable to vary the composition of the homogeneous mixture of materials layer-by-layer to form a gradient in material composition in the layer growth direction (e.g., Z-direction in FIG. 4B). The phrase homogeneous mixture is intended to generally describe a material that has been formed by dispensing and curing printed droplets that have at least two different compositions within each layer, and thus may contain a mixture of small regions of the at least two different compositions that are each sized at a desired resolution. The interface between the polishing base layer 491 and the polishing element region 494 may include a homogeneous blend of the materials found at the upper surface of the polishing base layer 491 and the lower surface of the polishing element region 494, or include a discrete transition where the differing material composition in the first deposited layer of the polishing element region 494 is directly deposited on the surface of the polishing base layer 491.

In some implementations of the polishing element region 494, or more generally any of the pad bodies 202 described above, it is desirable to form a porosity gradient in the material composition in the first polishing elements 204 and/or second polishing elements 206 in a direction normal to the polishing surface of the porous polishing pad. In one example, it is desirable to have higher concentrations of a material composition used to form the low porosity features in the printed layers near the base of the porous polishing pad (e.g., opposite to the polishing surface), and higher concentrations of a material composition used to form the high porosity features in the printed layers near the polishing surface of the porous polishing pad. In another example, it is desirable to have higher concentrations of a material composition used to form the high porosity features in the printed layers near the base of the porous polishing pad, and a higher concentration of a material composition used to form the low porosity features in the printed layers near the polishing surface of the porous polishing pad.

In one implementation, it is desirable to form a gradient in the material composition within the material used to form the first and/or second polishing elements in a direction normal to the polishing surface of the porous polishing pad. In one example, it is desirable to have higher concentrations of a material composition used to form the second polishing elements 206 in the printed layers near the base of the porous polishing pad (e.g., opposite to the polishing surface), and higher concentrations of a material composition used to form the first polishing elements 204 in the printed layers near the polishing surface of the porous polishing pad. In another example, it is desirable to have higher concentrations of a material composition used to form the first polishing elements 204 in the printed layers near the base of the porous polishing pad, and a higher concentration of a material composition used to form the second polishing elements 206 in the printed layers near the polishing surface of the porous polishing pad. For example, a first layer may have a material composition ratio of the first printed composition to the second printed composition of 1:1, a material composition ratio of the first printed composition to the second printed composition of 2:1 in a second layer and a material composition ratio of the first printed composition to the second printed composition of 3:1 in a third layer. In one example, the first printed composition has a higher porosity containing material than the second printed composition, and the direction of sequential growth of the first, second and third layers is away from a supporting surface of the porous polishing pad. A gradient can also be formed within different parts of a single layer by adjusting the placement of the printed droplets within the plane of the deposited layer.

Figure 5B:
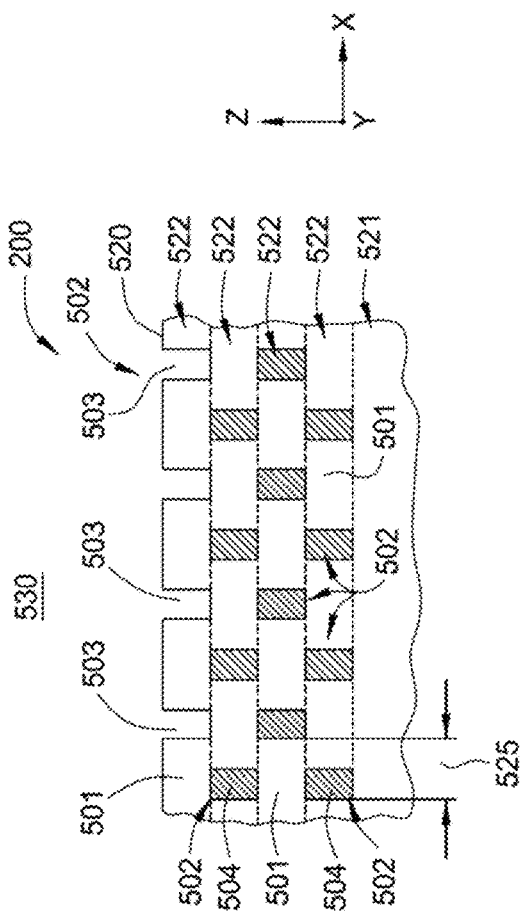
FIG. 5B is a schematic side cross-sectional view of a portion of an advanced polishing pad, according to an implementation of the present disclosure.
Figure 5C:
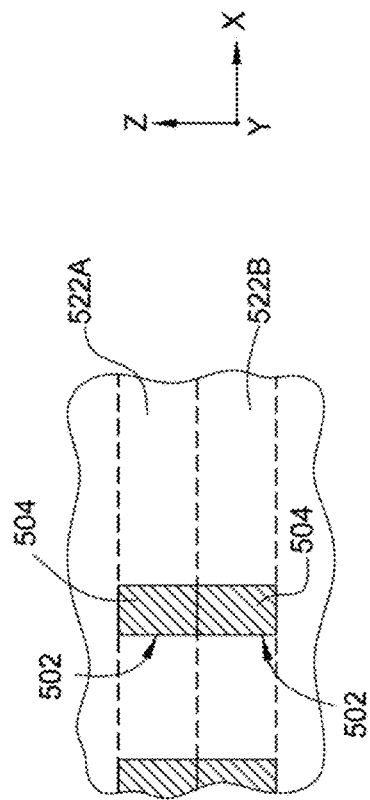
FIG. 5C is a schematic side cross-sectional view of a portion of an advanced polishing pad, according to an implementation of the present disclosure.
Figure 5A:
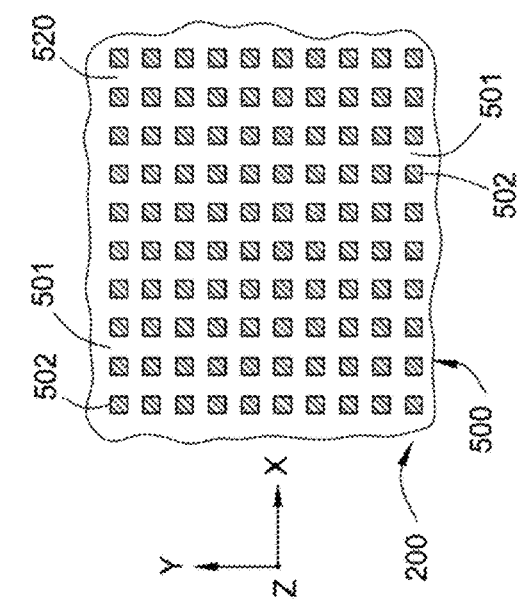
FIG. 5A is a top view of a pixel chart used to form an advanced polishing pad that may contain pores, according to at least one implementation of the present disclosure.

FIG. 5A illustrates a schematic plan view of a pixel chart that is used to form a region 500 of a layer 522 (FIG. 5B) of a first or a second polishing element of a polishing pad that contains pore-forming regions according to one or more implementations of the present disclosure. In this example, the pixel chart includes a rectangular pattern of pore-forming regions 502 that are formed by dispensing one or more droplets of a porosity-forming agent 504 (FIG. 5B) from a first print head onto a surface and then at least partially surrounding the pore-forming regions 502 with one or more structural material containing regions 501 that include a material that is formed by dispensing droplets of one or more resin precursor compositions from at least a second print head. The porosity-forming agent 504 can then later be removed in a post processing step or during a polishing process to form pores in one or more layers of the polishing pad. In one example, the porosity-forming agent material is removed from formed advanced polishing pad when the polishing pad is used in a CMP polishing process. In this example, the porosity-forming agent material may be removed due to the interaction of the porosity-forming agent disposed at a surface 520 of the first or second polishing elements in the advanced polishing pad with one or more components found within a slurry that is disposed between the first and/or second polishing elements and a substrate that is being polished. As shown in FIG. 5A, the pore-forming regions 502 are surrounded by a structural material containing region 501 that is formed by dispensing droplets of a resin-precursor formulation across a surface on which the layer 522 is formed. By use of the various techniques described herein, compositional gradients in the cured structural material found within the structural material containing region 501 and/or gradients in the size and density of the pore-forming regions 502 can be used to form at least part of a complete polishing pad that has desirable mechanical and thermal properties. The composition of the pore-forming material disposed within the pore-forming regions 502 and distribution and size of the pore-forming regions 502 across of the porous polishing pad 200 (i.e., X-Y plane) or through the thickness of the polishing element (i.e., Z direction) may vary in any suitable pattern. Although polishing pads described herein are shown to be formed from two kinds of materials, this configuration is not intended to be limiting of the scope of the disclosure provided herein, since polishing pads including three or more kinds of materials is within the scope of the present disclosure. It should be noted that the compositions of the structural material found within a polishing pad, such as the polishing pad designs illustrated in FIGS. 2A-2K, may be varied in a similar manner as discussed above in conjunction with FIGS. 4A-4F. Thus, in some implementations, the material found within a formed structural material containing region 501 may include a mixture of two or more different materials that varies in one or more directions across (e.g., X and/or Y direction) or through (e.g., Z direction) the formed layer.

FIG. 5B is a side cross-sectional view of a portion of the region 500 illustrated in FIG. 5A according to one or more aspects of the present disclosure. The portion shown in FIG. 5B includes a plurality of layers 522 that are formed on an optional base layer 521 by use of an additive manufacturing process as described herein. For clarity of discussion purposes, the layers are shown in FIG. 5B as being disposed between two dashed lines, however, due to the processes described herein at least the structural material containing region 501 parts of adjacent layers may be formed such that there is no distinct physical division between layers in a formed porous polishing pad 200. The layers 522 each include pore-forming regions 502 that are interspersed between regions of the structural material containing region 501. As noted above, due to the interaction of the porosity-forming agent disposed within the pore-forming regions 502 at the surface 520 (i.e., polishing surface 112) of the porous polishing pad 200 with a slurry (not shown), which is disposed within a polishing region 530, the porosity-forming agent 504 may be easily removed leaving an unfilled void within the pore-forming regions 502, and thus forming a pore 503.

In one implementation, the pixel charts used to form each layer 522 includes pattern that includes an array of porosity-forming agent 504 containing pore-forming regions 502 that are formed in a desired pattern across the surface of the formed layer. As noted above, in some implementations, the pattern of porosity-forming agent 504 containing pore-forming regions 502 can be formed in a rectangular array that has a desirable pitch in both the X and Y directions. However, the pattern of porosity-forming agent 504 containing pore-forming regions 502 may be formed in any desirable pattern including a hexagonal array of pore-forming regions 502, a directionally varying pattern of pore-forming regions 502, a random pattern of pore-forming regions 502 or other useful pattern of pore-forming regions 502. In some implementations, the pixel charts used to form adjacent layers 522 are shifted a desired distance 525 in one or more directions (e.g., X, Y or X and Y directions) relative to each other, or formed in differing relative X-Y patterns, so that the pore-forming regions 502 are not placed on top of each other in adjacently positioned layers as the polishing pad is formed. In one implementation, similarly configured patterns of pore-forming regions 502 in adjacent layers may be staggered a desired distance in one or more directions relative to each other so that the pore-forming regions 502 are not placed on top of each other in the adjacently positioned layers.

FIG. 5C illustrates is a side cross-sectional view of a portion of the region 500 illustrated in FIG. 5A according to another aspect of the present disclosure. In some implementations, two or more of the deposited layers may be aligned with each other so that the layers are formed directly on top of each other. In one example, as shown in FIG. 5C, two layers 522A and 522B are formed so that the 522A layer is directly on top of the layer 522B so that the pore-forming regions 502 are placed one on top of the other. The next or subsequent layers may then be shifted a desired distance 525 relative to the layers 522A-B, so that the pore-forming regions 502 in the subsequent layers are not placed on top of the layers 522A-B. This configuration in which two or more layers, within a larger stack of layers, are formed directly on top of each other may be useful in cases where the fixed droplet size resolution in the X and Y directions may be greater than the thickness of the layer in the Z direction. In one example, the fixed droplet size in the X and Y directions is twice as large as the thickness in the Z direction, thus allowing a regular pattern of printed material to be formed in the X, Y and Z directions when two layers are placed on top of each other.

Referring back to FIG. 5A, the pixel charts used to form the pore-forming regions 502 and the surrounding structural material containing region 501 within a layer can be used to create portions of the polishing features that have a consistent or varying porosity in one or more directions X, Y, or Z. In one example, the polishing features near an edge region of the advanced polishing pad may include more of the resin precursor formulation used to form the structural material within the structural material containing region 501 than the porosity-forming agent 504 containing pore-forming regions 502. The polishing features near a center region of the polishing pad may also include a higher percentage of pore-forming regions 502 per layer (e.g., higher density) than the polishing features near the edge region. In this example, each polishing feature of the same type (e.g., first polishing elements 204), or of different types (e.g., first and second polishing elements 204, 206), has a unique combination of the resin precursor formulation, the porosity-forming agent and the density of the pore-forming regions 502 per layer and/or per polishing element. In one example, the first polishing elements 204 include a first combination of the resin precursor formulation and the porosity-forming agent and the second polishing elements 206 include a different second combination of the resin precursor formulation and the porosity-forming agent. Therefore, by use of pixel charts, the polishing body can be sequentially formed so that a desired porosity gradient is achieved in different parts of the polishing body to achieve a desired polishing performance of the advanced polishing pad.

A method of forming a layer of a porous advanced polishing pad according to implementations described herein may include the following steps. First, one or more droplets of a resin composition, such as described herein, are dispensed in a desired X and Y pattern to form the structural material portion of a formed layer. In one implementation, the one or more droplets of a resin composition are dispensed on a support if the one or more droplets constitute a first layer. In some implementations, the one or more droplets of a resin composition are dispensed on a previously deposited layer (e.g., second layer, etc.). Second, one or more droplets of a porosity-forming composition containing a porosity-forming agent 504 are dispensed in a desired X and Y pattern to form the pore-forming regions 502 within the formed layer. In one implementation, the one or more droplets of the porosity-forming composition are dispensed on a support if the one or more droplets constitute a first layer. In some implementations, the one or more droplets of the porosity-forming composition are dispensed on a previously deposited layer. The dispensing processes of the first and second operations are typically performed separately in time and at different X-Y coordinates. Next, or third, the dispensed one or more droplets of the curable resin precursor and the dispensed one or more droplets of the porosity-forming composition are at least partially cured. Next, at the optional fourth step, the dispensed one or more droplets of the curable resin precursor and the dispensed one or more droplets of the porosity-forming composition are exposed to at least one of an annealing process, a rinsing process, or both to remove the porosity-forming agent. The rinsing process may include rinsing with water, another solvent such as alcohol (e.g., isopropanol) or both. The annealing process may include heating the deposited pad structure to a low temperature (e.g., about 100 degrees Celsius) under a low pressure to vaporize the porosity-forming agent. Next, at the fifth step, an optional second curing process is performed on the formed layer or final pad to form the final porous pad structure. In some cases, the first, second, third and fifth processing steps may also be sequentially repeated in any desired order to form a number of stacked layers before the fourth step is completed.

In some implementations, the porosity-forming agent 504 may include materials that have hydrophilic and/or have hydro-degradable behaviors, such as hydrogels, poly(lactic-co-glycolic acid) (PLGA), and Polyethylene glycol (PEG), which degrade in the presence of an aqueous solutions. In some configurations, during a CMP polishing process, the porosity-forming agent 504 disposed within a formed polishing pad is configured to degrade, such as dissolve into an aqueous slurry (e.g., porosity-forming agent is soluble in the slurry) or break down in the presence of slurry, and leave a pore (e.g., 100 nm 1 μm opening or void) in the exposed surface of the advanced polishing pad. The porosity-forming agent 504 may include an oligomeric and/or polymeric material that is mixed with an inert soluble component. The inert soluble components may include ethylene glycol, polyethylene glycol, propylene glycol, diethylene glycol, dipropylene glycol, triethylene glycol, tetraethylene glycol and glycerol. The inert soluble components may also include corresponding mono alkyl or dialky ethers and alkyl groups that may include methyl, ethyl, propyl, isopropyl, butyl or isobutyl groups. In one implementation, the porosity-forming agent 504 includes PEG and about 5% to 15% of an oligomeric and/or polymeric material, such as an acrylate material. In some configurations, a hydrogel material may be used that is based on polyethylene glycol acrylates or methacrylates. These types of materials can be made from polar materials that are not soluble in most resin precursor formulations. The hydrogel materials can be made into pore-forming materials by cross-linking with diacrylates and dimethacrylates in a ratio of about 1 to 10%. The hydrogel materials formed in this way will still have solubility in water and can be washed away with water to generate pores.

In some implementations, the structural material containing region 501 may include a material that is formed from one or more of the resin precursor components disclosed herein. For example, the structural material containing region 501 may include a material that is formed by use of a resin precursor component that is selected from, but not restricted to, at least one of the materials listed in Table 3 or families of materials in which the materials listed in Table 3 are from. Other useful resin precursor components that may be used alone or in combination with one or more of the resin precursor components disclosed herein may also include the thiol-ene and thiol-yne type, epoxy, Michael addition type, ring-opening polymerization (ROP), and ring forming or Diels-Alder polymerization (DAP) type components described herein.

In one implementation, the pores formed with the pad body 202 may be formed by causing the porosity-forming agent 504 change phase, such as vaporize, during a subsequent advanced polishing pad formation process. In one example, the porosity within the formed pad may be generated by delivering electromagnetic radiation to a portion of the polishing pad to induce the generation change in phase of the porosity-forming agent material. In one implementation, an advanced polishing pad pre-polymer composition may contain compounds, polymers, or oligomers that are thermally labile and that may contain of thermally labile groups. These porogen and thermally labile groups may be cyclic groups, such as unsaturated cyclic organic groups. The porogen may comprise a cyclic hydrocarbon compound. Some exemplary porogens include, but are not restricted to norbornadiene (BCHD, bicycle(2.2.1)hepta-2,5-diene), alpha-terpinene (ATP), vinylcyclohexane (VCH), phenylacetate, butadiene, isoprene, and cyclohexadiene. In one implementation, a pre-polymer layer is deposited that contains a radiation curable oligomer with a covalently bound porogen group. After exposure to UV radiation and heat, a porous polymer layer may be formed by the effusion of the porogen group. In another implementation, an advanced polishing pad pre-polymer composition may contain compounds, polymers, or oligomers that are mixed with a water containing compound. In this example, a plurality of porous layers may be formed by sequential layer deposition and then driving out the water containing compound to form a pore. In other implementations, pores may be generated by thermally induced decomposition of compounds that form a gas by-product, such as azo compounds, which decompose to form nitrogen gas.

Alternately, in some implementations, the resin precursor composition may include polymer spheres, such as 100 nm-1 μm of diameter sized polymer nano-spheres or microspheres that are disposed within the droplets that are used to form the advanced polishing pad. In some implementations, the polymer sphere is between 100 nm and 20 μm in size, such as between 100 nm and 5 μm in size. In some additive manufacturing implementations, it may be desirable to dispense a resin precursor composition containing droplet out of a first nozzle and also dispense a droplet of a polymer sphere containing formulation out of a second nozzle so that the two dispensed droplets can mix to form a complete droplet that can then be partially or fully cured to form part of the growing polishing pad. In some configurations, during a CMP polishing process, the polymer spheres are configured to degrade, such as dissolve into the aqueous slurry or break down in the presence of slurry, and leave a pore (e.g., 100 nm-1 μm pore feature) in the exposed surface of the advanced polishing pad.

The polymer spheres may comprise one or more solid polymer materials that have desirable mechanical properties, thermal properties, wear properties, degradation properties, or other useful property for use within the formed advanced polishing pad. Alternately, the polymer spheres may comprise a solid polymer shell that encloses a liquid (e.g., water) or gas material so that the polymer sphere will provide desirable mechanical, thermal, wear, or other useful property to the formed advanced polishing pad. The polymer spheres may also be used to form pores within regions of a fixed droplet that is used to form one or more regions within portions of a formed polishing element (e.g., polishing elements 204 and/or 206) to provide desirable mechanical, thermal, wear, or other useful property to these portions of a formed advanced polishing pad. The polymer spheres may include materials that have hydrophilic and/or have hydrodegradable behaviors, such as hydrogels and poly(lactic-co-glycolic acid), PLGA, which degrade in the presence of an aqueous solutions. The polymer spheres are typically uniformly dispersed in the droplet formulations and in the cured materials after performing the additive manufacturing process (e.g., 3D printing).

In some configurations, hydrogel particles may be used that are based on polyethylene glycol acrylates or methacrylates. These types of particles are made from polar materials and are not soluble in most formulations. The hydrogel particles can be made into particle form by cross-linking with diacrylates and dimethacrylates in a ratio of about 1 to 15%. The hydrogel particles formed in this way will still have solubility in water and can be washed away with water to generate pores.

Advance Polishing Pad Formation Process Example

In some implementations, as discussed above, the construction of the porous polishing pad 200 by an additive manufacturing process begins by creating a CAD model of the porous polishing pad design. This can be done using existing CAD design software, such as Unigraphics or other similar software. An output file, which is generated by the modelling software, is then loaded to an analysis program to ensure that the porous polishing pad design meets the design requirements (e.g., water tight, mass density). The output file is then rendered, and the 3D model is then "sliced" into a series of 2D data bitmaps, or pixel charts. As noted above, the 2D bitmaps, or pixel charts, are used to define the locations across an X and Y plane where the layers in the porous polishing pad will be built. In one implementation, the 2D bitmaps of the polishing article are represented in a data structure readable by a computer rendering device or a computer display device.

The computer-readable medium may contain a data structure that represents the polishing article. The data structure may be a computer file, and may contain information about the structures, materials, textures, physical properties, or other characteristics of one or more articles. The data structure may also contain code, such as computer executable code or device control code that engages selected functionality of a computer rendering device or a computer display device. The data structure may be stored on the computer-readable medium. The computer-readable medium may include a physical storage medium such as a magnetic memory, floppy disk, or any convenient physical storage medium. The physical storage medium may be readable by the computer system to render the article represented by the data structure on a computer screen or a physical rendering device, which may be an additive manufacturing device, such as a 3D printer. In some additive manufacturing process applications the pixel chart locations will define where a laser will pulse, and in other applications the location where a nozzle will eject a droplet of a material.

The coordinates found in the pixel charts are used to define the location at which a specific droplet of uncured polymer will be placed using, for example, a poly jet print head. Every coordinate for an X and Y location and a given pad supporting Z stage position will be defined based on the pixel charts. Each X, Y and Z location will include either a droplet dispense or droplet non-dispense condition. Print heads may be assembled in an array in the X and/or Y directions to increase build rate or to deposit additional types of materials. In the examples shown in FIGS. 2F-2K, the black pixels indicate locations where nozzles will not deposit materials and the white pixels indicate where nozzles will deposit materials. By combining the material maps, or pixel charts, in each formed layer a porous polishing pad of any desirable shape or structural configuration can be printed by the positioning of the discrete droplets near one another.

An additive manufacturing device, such as a 3D printer can be used to form a porous polishing pad by depositing water, emulsifiers/surfactants, thermoplastic polymers, depositing and curing of a photosensitive resin precursor compositions, and/or laser pulse type sintering and fusing of a dispensed powder layer. In some implementations, the porous polishing pad formation process may include a method of polyjet printing of UV sensitive materials. In this configuration, droplets of a precursor formulation (e.g., first printable ink composition 359) are ejected from a nozzle in the droplet ejecting printer 306 and resin precursor composition is deposited onto the build stage. As material is deposited from an array of nozzles, the material may be leveled with the use of a roller or other means to smooth drops into a flat film layer or transfer away excess material. While the droplet is being dispensed, and/or shortly thereafter, a UV lamp or LED radiation source passes over the deposited layer to cure or partially cure the dispensed droplets into a solid polymer network.

In some implementations, a monochromatic light source (e.g., LED light source) is used that has a narrow emitted wavelength range and/or a narrow spot size that is specifically tailored to substantially or partially cure one or more dispensed droplets, and thus not adversely affect other surrounding regions or prior formed layers of the formed advanced polishing pad. In some implementations, the monochromatic light source is configured to deliver wavelengths of light within a range between 100 nm and 500 nm, such as between about 170 nm and 400 nm. In one example, a UV LED source is configured to deliver UV light within a band of +/−10 nm at a central wavelength of 240 nm, 254 nm, 365 nm, 385 nm, 395 nm or 405 nm wavelengths. This process is built layer on top of layer with adequate cohesion within the layer and between layers to ensure the final implementation of the pad model is mechanically sound.

In order to better control the polymer stress through the build process, heat may be added during the formation of one or more of the layers. The delivery of heat allows the polymer network formed in each cured or partially cured layer to relax and thus reduce stress and remove stress history in the film. Stress in the film can result in unwanted deformation of the porous polishing pad during or after the porous polishing pad formation process. Heating the partially formed polishing pad while it is on the printer's build tray ensures that the final pad properties are set through the layer-by-layer process and a predictable pad composition and polishing result can be achieved. In addition to inducing heat into the porous polishing pad formation process, the area surrounding the growing polishing pad may be modified to reduce the oxygen exposure to the uncured resin. This can be done by employing vacuum or by flooding the build chamber with nitrogen ($N_2$) or other inert gas. The reduction in oxygen over the growing pad will reduce the inhibition of the free radical polymerization reaction, and ensures a more complete surface cure of the dispensed droplets.

Following production of the polishing pad, the polishing pad can be annealed by heating to a temperature above the glass transition temperature $T_g$ for a period of time to remove water from the formed pad to from the porous pad structure. Optionally, water removal can be facilitated faster under vacuum.

The polishing pad can be further processed using any suitable technique. For example, the polishing pad can be skived or milled to provide a polishing surface. The produced polishing surface can be further processed using techniques such as conditioning the polishing surface, for example, by diamond conditioning.

Porous Polishing Pad Formulation Examples

As noted above, in some implementations, one or more of the materials that are used to form at least one of the two or more polishing elements, such as the first and second polishing elements 204 and 206, is formed by sequentially depositing and post deposition processing of at least one curable resin precursor composition. In general, the curable resin precursor compositions, which are mixed during the precursor formulation process performed in the precursor delivery section 353 of the additive manufacturing system 350, will include the formulation of resin precursor compositions that contain functional oligomers, porosity-forming agents (e.g., water), emulsifiers, hydrophobes, reactive diluents and curing components, such as initiators. Examples of some of these components are listed in Table 1.

TABLE 1

| Reference Name | Material Information | Functionality | Tg (° C.) | UTS (psi) | % Elongation |
|---|---|---|---|---|---|
| O1 | Aliphatic urethane acrylate oligomer | 2 | 27 | 5378 | 79 |
| O2 | Aliphatic hexafunctional urethane acrylate | 6 | 145 | 11,000 | 1 |
| O3 | Low viscosity diacrylate oligomer | 2 | 26 | 1,600 | 10 |
| O4 | Aliphatic hexafunctional acrylate | 6 | 120 | | |
| O5 | Multifunctional urethane acrylate oligomer | 3.4 | 46 | 3045 | 2 |
| O6 | Aliphatic urethane diacrylate oligomer 1 | 2 | N/A | N/A | N/A |
| O7 | Aliphatic urethane acrylate oligomer 2 | N/A | N/A | N/A | N/A |
| O8 | Aliphatic polyester urethane diacrylate blend with aliphatic diacrylate | 2 + 2 | N/A | N/A | N/A |
| O9 | Acrylic oligomer | N/A | N/A | N/A | N/A |
| M1 | Dipropylene glycol diacrylate | 2 | 104 | 2938 | 5 |
| M2 | 2-Propenoic acid, 2-phenoxyethyl ester | 1 | 5 | 19 | 236 |
| M3 | Tertio-butyl cyclohexanol acrylate (TBCHA) | 1 | 41 | | |
| M4 | Polyether-modified polydimethylsiloxane | | | | |
| M5 | CTFA 2 Ethers | 1 | 32 | — | — |
| M6 | EOEO—EA | 1 | −54 | — | — |
| M7 | 2-(((butylamino)carbonyl)oxy)ethyl ester | 1 | −3 | | |
| M8 | Tetrahydrofurfuryl | 1 | −12 | | |
| M9 | Tetrafunctional polyether acrylate | 4 | N/A | N/A | N/A |
| M10 | Isobornyl acrylate | 1 | N/A | N/A | N/A |
| P1 | 2-Hydroxy-2-methyl-1-phenyl-propan-1-one | | N/A | N/A | N/A |
| P2 | 4-Phenylbenzophenone | | N/A | N/A | N/A |
| P3 | Acyl phosphine oxide | N/A | N/A | N/A | N/A |
| P4 | Bis-benzoyl phosphine oxide | N/A | N/A | N/A | N/A |
| P5 | Blend of P1 and P3 | N/A | N/A | N/A | N/A |
| A1 | Acrylated amine synergist | <1 | N/A | N/A | N/A |
| A2 | Polyoxyethylene alkyl phenyl ether ammonium sulfate non-migratory surfactant | | | | |
| H1 | Hexadecane | | | | |
| H2 | Hexadecanol | | | | |
| E1 | MAXEMUL 6106 | | | | |
| E2 | E-Sperse RS1618 | | | | |
| X1 | Diethylene glycol | | | | |
| X2 | Glycerol | | | | |
| X3 | Glycerol propoxylate | | | | |

Examples of functional oligomers can be found in items O1-O9 in Table 1. Examples of functional reactive diluents and other additives can be found in items M1-M10 in Table 1. Examples of curing components are found in items P1-P5 and A1 in Table 1. Examples of emulsifiers are found in items E1-E2 in Table 1. Examples of hydrophobes are found in items H1-H2 in Table 1. Examples of porosity-forming agents are found in items X1-X3 in Table 1. Items O1-O3, M1-M3 and M5-M6 found in Table 1 are available from Sartomer USA, item O4 is available from Miwon Specialty Chemicals Corporation Ltd. of Korea, item O5 is available from Allnex Corporation of Alpharetta, Ga., USA, item M4 is available from BYK-Gardner GmbH of Germany and items P1-P5 and A1 are available from Chiba Specialty Chemicals Inc. and RAHN USA Corporation. Item A2 is available from Montello, Inc. of Tulsa, Okla. Items H1-H2 in Table 1 are available from Sigma-Aldrich® Co. Item E1 is available from Croda International Plc. Item E2 is available from Ethox Chemicals, LLC. Items X1-X3 in Table 1 are available from Sigma-Aldrich® Co.

One advantage of the additive manufacturing processes described herein includes the ability to form an advance polishing pad that has properties and porosity that can be adjusted based on the composition of the resin precursor components and structural configuration of the various formed materials used within the pad body structure. The information below provides some examples of some material formulations and the affect that varying various components in these formulations and/or processing techniques have on some of the properties needed to form a porous polishing pad that will achieve improved polishing results over conventional polishing pad designs. The information provided in these examples can be used to form at least a portion of the porous polishing pad 200, such as part of the first polishing element 204, the second polishing element 206, or both the first and second polishing elements 204 and 206. The examples provided herein are not intended to be limiting as to the scope of the disclosure provided herein, since other similar chemical formulations and processing techniques can be used to adjust some of the properties described herein.

Examples of the curable resin precursor composition components, which are described above and below, are intended to be comparative examples and one skilled in the art can find other suitable monomers/oligomers from various sources to achieve the desired properties. Some examples for reactive diluents are 2-ethylhexyl acrylate, octyldecyl acrylate, cyclic trimethylolpropane formal acrylate, caprolactone acrylate, isobornyl acrylate (IBOA), and alkoxylated lauryl methacrylate. The first material is available from Sigma-Aldrich, and the balance may be obtained from Sartomer USA and/or Rahn AG USA (SR series 203, 217, 238, 242, 306, 339, 355, 368, 420, 484, 502, 506A, 508, SR 531, 550, 585, 495B, 256, 257, 285, 611, 506, 833S, and 9003B, CD series 421A, 535, 545, 553, 590, 730, and 9075, Genomer series 1116, 1117, 1119, 1121, 1122, 5142, 5161, 5275, 6058, 7151, and 7210, Genocure series, BP, PBZ, PMP, DETX, ITX, LBC, LBP, TPO, and TPO-L, and Miramer series, M120, M130, M140, M164, M166, and M170). Some examples for difunctional cross-linkers are bisphenol A glycerolate dimethacrylate, ethylene glycol dimethacrylate, diethylene glycol dimethacrylate, tetraethylene glycol dimethacrylate, 1,6-hexanediol diacrylate and 1,4-butanediol diacrylate, which may be obtained from Sigma-Aldrich. Some examples of oligomers could include aliphatic oligomers (CN series 131, 131B, 132, 152, 508, 549, 2910, 3100 and 3105 from Sartomer USA), polyester acrylate oligomers (CN series 292, 293, 294E, 299, 704, 2200, 2203, 2207, 2261, 2261LV, 2262, 2264, 2267, 2270, 2271E, 2273, 2279, 2282, 2283, 2285 and 2303 from Sartomer USA) and aliphatic urethane oligomers (CN series 929, 959, 961H81, 962, 969, 964A85, 965, 968, 980, 986, 989, 991, 992, 996, 2921, 9001, 9007, 9013, 9178 and 9783 from Sartomer USA). The agents or additives could be supplied from BYK, such as 3550, 3560, 307, 378, 1791, 1794, 9077, A515, A535, JET9510, JET9511, P9908, UV3500, UV3535, DISPERBYK168, and DISPERBYK2008. The first type photoinitiator could be from BASF, such as Irgacure series 184, 2022, 2100, 250, 270, 295, 369, 379, 500, 651, TPO, TPO-L, 754, 784, 819, 907, 1173, or 4265. Additionally, other functional oligomers and resin precursor composition components can be purchased from Allnex Corp., such as the Ebecryl series (EB): 40, 53, 80, 81, 83, 110, 114, 130, 140, 150, 152, 154, 168, 170, 180, 220, 230, 242, 246, 264, 265, 270, 271, 284, 303, 350, 411, 436, 438, 450, 452, 524, 571, 600, 605, 608, 657, 745, 809, 810, 811, 812, 830, 860, 870, 871, 885, 888, 889, 893, 1258, 1290, 1291, 1300, 1360, 1710, 3200, 3201, 3411, 3415, 3418, 3500, 3600, 3700, 3701, 3720, 4265, 4827, 4833, 4849, 4858, 4883, 5129, 7100, 8100, 8296, 8301, 8311, 8402, 8405, 8411, 8412, 8413, 8414, 8465, 8501, 8602, 8701, 8702, 8804, 8807, 8808, and 8810. Free and non-migratory (polymerizable) surfactants such as triethanol amine (TEA) and Hitenol and Maxemul branded materials are available from Sigma-Aldrich, Montello, Inc., of Tulsa, Okla. USA and Croda, Inc., of New Castle, Del., USA.

Examples of formulations that contain different porosity are illustrated below in Table 2. Example 1 was a control performed without the addition of water and emulsifier. Example 2 was performed with the addition of water only. Example 3 was performed with both water and emulsifier. Items 4-7 each represent a formulation that may be modified with water, emulsifiers, or both.

TABLE 2

| Item No. | Material Composition (See Table 1 Ref. Name) | Formulation Composition (wt. %) | Pore Size Range (microns) | Average Pore Size (microns) |
|---|---|---|---|---|
| 1 | O1:O3:O4:M1 | 30:33:15:33 | | |
| 2 | O1:O3:O4:M1:H$_2$O | 30:33:15:33:11 | 6-130 | |
| 3 | O1:O3:O4:M1:H$_2$O:E2 | 30:33:15:33:11:1.1 | 6-40 | 15 |
| 4 | O1:M3 | 45:55 | n/a | n/a |
| 5 | O1:M1 | 45:55 | n/a | n/a |
| 6 | O1:M3:M1:M2 | 45:22:22:11 | n/a | n/a |
| 7 | O4:O1:M3:M1:M2 | 30:15:22:22:11 | n/a | n/a |

Example 1 (Control)

As noted in Item 1 in Table 2, a formulation that contains multifunctional oligomers with O1:O3:O4:M1 was mixed in the ratio of 30:33:15:33. Then photoinitiators and additives (P1:P2:A1 in the ratio of 67:8.25:24.75) in about 3% by weight of the formulation were added for curing. This mixture (8 g) was placed in an aluminum cup and exposed to UV radiation to cure the acrylate monomers. This did not result in measureable pores.

Example 2

Figure 6A:
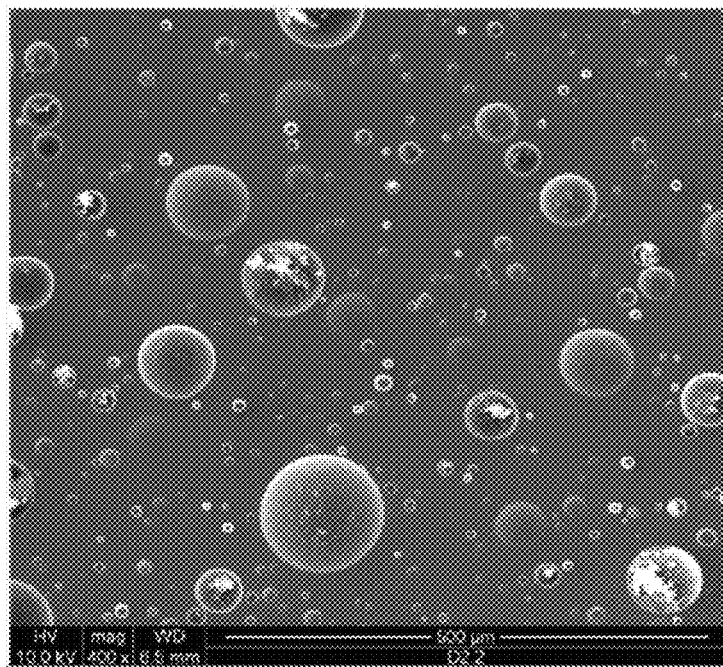
FIG. 6A is a scanning electron microscope (SEM) image of one implementation of a porous pad structure formed according to implementations described herein.

Referring to Item 2 in Table 2, Example 1 was repeated by adding water (11 wt. %; 1.6 g) and photoinitiator (6.4 g) and was shaken very well. The mixture was cured similar to the Example 1. Then water was removed by heating to 60 degrees Celsius for 2 days under vacuum. The SEM image revealed the pore size as 6-130 microns and it is illustrated in FIG. 6A.

Example 3

Figure 6B:
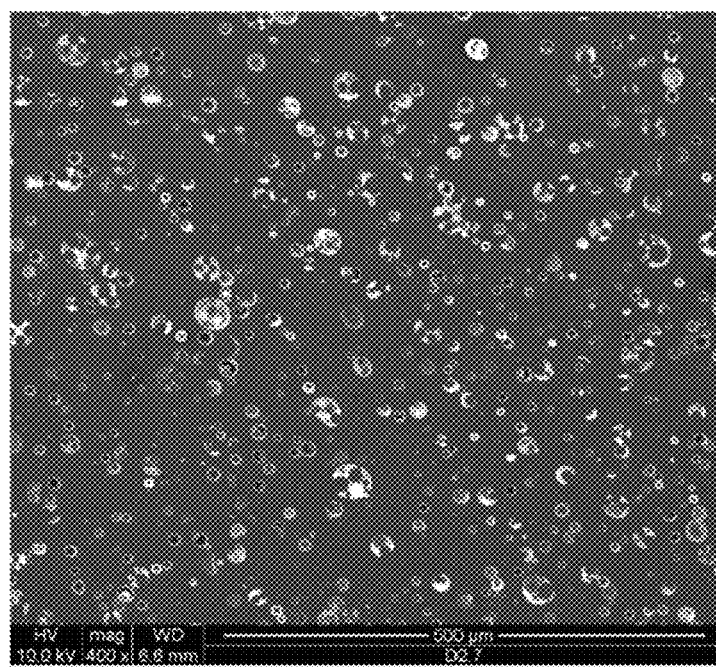
FIG. 6B is a scanning electron microscope (SEM) image of another implementation of a porous pad structure formed according to implementations described herein.

Referring to Item 3 in Table 2, Example 2 was repeated by adding emulsifier E2 (1.1 wt. %) and shaken very well. It was then sonicated using Kaijo's Sono Cleaner Model 100Z for 3 minutes. This mixture was transferred to aluminum cup and exposed to UV radiation to cure the acrylate monomers similar to Example 2. Then water was removed similar to Example 1. The SEM image revealed the pore size as 6-40 microns and is illustrated in FIG. 6B. The pore size depicted in the SEM image of FIG. 6B is considerably reduced compared to the pore size depicted in the SEM image of FIG. 6A with an average size of 15 microns having a narrower pore size distribution. In some cases, a narrower pore size distribution is desirable to control the spread of variation in mechanical properties of the formed porous material within desired regions of the porous polishing pad, provide more consistent and reproducible pad polishing properties, and control the slurry retention provided by the porous structure(s).

Table 3 depicts various formulations that may be used to form the porous pad structures described herein. Item No. 8 does not contain a porosity-forming agent. Item 9, Item 10 and Item 11 contain 20 wt. %, 30 wt. %, and 40 wt. % of a porosity-forming agent X1 respectively.

TABLE 3

| Item No. | Material Composition (See Table 1 Ref. Name) | Formulation Composition (wt. %) | Viscosity at 70° C. (cps) | CA with water (°) | CA with water (°) after 5 min |
|---|---|---|---|---|---|
| 8 | O1:O2:O3:M1: M3:M4:P2:P4: A1:A2 | 24.1:12.1:0.20: 24.7:26.5:0.10:0.20: 1.61:0.60:9.97 | | | |
| 9 | O1:O2:O3:M1: M3:M4:P2:P4: A1:A2:X1 | 19.3:9.64:0.16:19.7: 21.2:0.08:0.16: 1.29:0.48:7.98: 20.0 | 12.0 | 57 | 47 |
| 10 | O1:O2:O3:M1: M3:M4:P2:P4: A1:A2:X1 | 16.9:8.44:0.14:17.3: 18.6:0.07:0.14: 1.13:0.42:6.98: 30.0 | 7.3 | 83 | 77 |
| 11 | O1:O2:O3:M1: M3:M4:P2:P4: A1:A2:X1 | 14.5:7.23:0.12:14.8: 15.9:0.06:0.12: 0.97:0.36:5.98: 40.0 | 6.5 | 88 | 76 |

Table 4 depicts various formulations that may be used to form the porous pad structures described herein.

TABLE 4

| Item No. | Material Composition (See Table 1 Ref. Name) | Formulation Composition (wt. %) | CA drop on cured film (°) | Viscosity at 70° C. (cps) | Viscosity at 70° C. (cps) after 90 C./3 days |
|---|---|---|---|---|---|
| 12 | Item 8:X1 | 90:10 | 34 | 12.5 | 12.9 |
| 13 | Item 8:X1:O3:M4 | 90:10:0.2:0.1 | 39 | 12.3 | 12.5 |
| 14 | Item 8:X1:A2:O3:M4 | 80:10:10: 0.2:0.1 | 43 | 17.3 | 20.3 |

Table 5 depicts various hypothetical formulations that may be used to form the porous pad structures described herein.

TABLE 5

| Component | Weight % range |
|---|---|
| Formulation of Item 8 | 60 to 90 |
| Diethylene glycol | 0 to 40 |
| Glycerol | 0 to 40 |
| Glycerol propoxylate | 0 to 30 |
| CN132 | 0 to 2 |
| BYK307 | 0 to 2 |
| Hitenol BC-10 | 0 to 15 |
| Maxemul 6106 | 0 to 15 |

Figure 7:
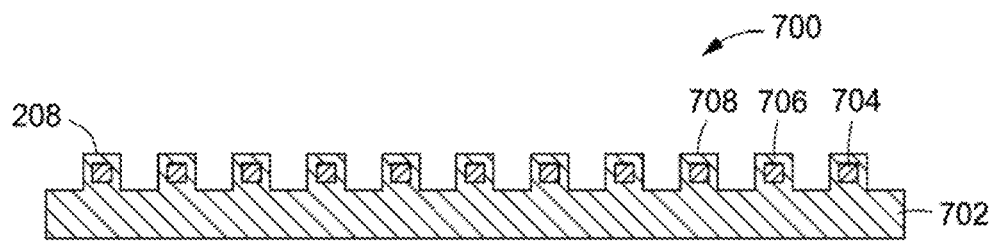
FIG. 7 is a schematic side cross-sectional view of a portion of a porous polishing pad according to an implementation of the present disclosure.

FIG. 7 is a schematic perspective sectional view of a porous polishing pad 700 according to one implementation of the present disclosure. The porous polishing pad 700 includes a second polishing element 702 that is a soft or low storage modulus E' material similar to the second polishing elements 206 of the 3D printed polishing pad. Similar to the second polishing elements 206, the second polishing element 702 may be formed from one or more elastomeric polymer compositions that may include polyurethane and aliphatic segments. The porous polishing pad 700 includes a plurality of surface features 706 extending from the second polishing element 702. Outer surfaces 708 of the surface features 706 may be formed from a porous material. In one implementation, the outer surface 708 of the surface features 706 may be formed from the same material or the same composition of materials as the second polishing element 702. The surface features 706 may also include a hard feature 704 embedded therein. The high storage modulus E' or hard features 704 may be formed from a material or a composition of materials that is harder than the surface features 706. The high storage modulus E' or hard features 704 may be formed from materials similar to the material or materials of the hard or high storage modulus E' features of the porous polishing pad 200, including crosslinked polymer compositions and compositions containing aromatic groups. The embedded hard features 704 alter the effective hardness of the surface features 706, and thus provide a desired target pad hardness for polishing. The soft or low storage modulus E' polymeric layer of the outer surface 708 can be used to reduce defects and improve planarization on the substrate being polished. Alternatively, a soft or low storage modulus E' polymer material may be printed on surfaces of other polishing pads of the present disclosure to provide the same benefit.

Figure 8:
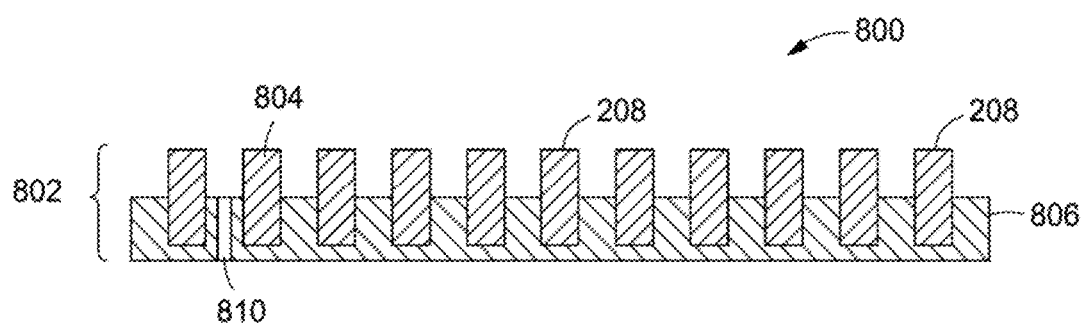
FIG. 8 is a schematic side cross-sectional view of a porous polishing pad having a transparent region formed therein, according to an implementation of the present disclosure.

FIG. 8 is a schematic perspective sectional view of a porous polishing pad 800 having one or more observation windows 810. The porous polishing pad 800 may have a pad body 802. The pad body 802 may include one or more features such as a plurality of first polishing elements 804 extending from second polishing elements 806 for polishing. The second polishing elements 806 and the first polishing elements 804 may be formed from materials similar to those for the second polishing element(s) 206 and first polishing elements 204 of the porous polishing pad 200. The first polishing elements 804 may be arranged in any suitable patterns according to the present disclosure.

The one or more observation windows 810 may be formed from a transparent material or compositions to allow observation of the substrate being polished. The one or more observation windows 810 may be formed through, and/or about portions of, the second polishing elements 806 or the first polishing elements 804. In some implementations, the one or more observation windows 810 may be formed from a material that is substantially transparent, and thus is able to transmit light emitted from a laser and/or white light source for use in a CMP optical endpoint detection system. The optical clarity should be high enough to provide at least about 25% (e.g., at least about 50%, at least about 80%, at least about 90%, at least about 95%) light transmission over the wavelength range of the light beam used by the end point detection system's optical detector. Typical optical end point detection wavelength ranges include the visible spectrum (e.g., from about 400 nm to about 800 nm), the ultraviolet (UV) spectrum (e.g., from about 300 nm to about 400 nm), and/or the infrared spectrum (e.g., from about 800 nm to about 1550 nm). In one implementation, the one or more observation windows 810 is formed from a material that has a transmittance of >35% at wavelengths between 280-800 nm. In one implementation, the one or more observation windows 810 is formed from a material that has a transmittance of >35% at wavelengths between 280-399 nm, and a transmittance of >70% at wavelengths between 400-800 nm. In some implementations, the one or more observation windows 810 is formed from a material that has a low refractive index that is about the same as that of the polishing slurry and has a high optical clarity to reduce reflections from the air/window/water interface and improve transmission of the light through the one or more observation windows 810 to and from the substrate.

In one implementation, the one or more observation windows 810 may be formed from a transparent printed material, including polymethylmethacrylate (PMMA). In another implementation, the window is formed using transparent polymeric compositions that contain epoxide groups, wherein the compositions may be cured using a cationic cure, and may provide additional clarity and less shrinkage. In a similar implementation, the window may be formed from a mixture of compositions that undergo both cationic and free radical cure. In another implementation, the window may be produced by another process, and may be mechanically inserted into a preformed opening in the porous polishing pad that is formed by a 3D process.

Figure 9:
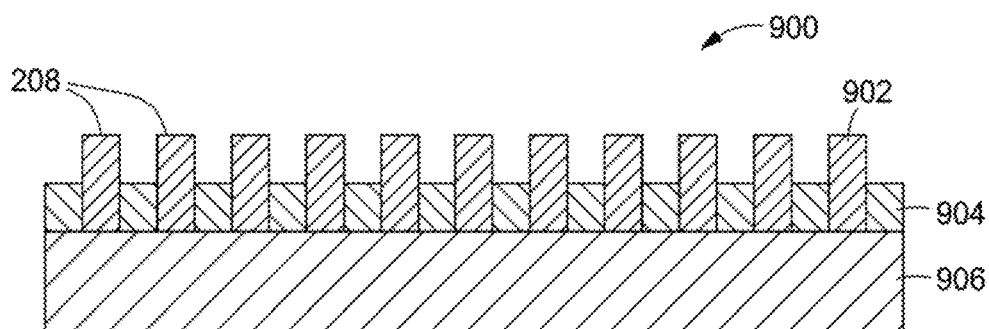
FIG. 9 is a schematic perspective sectional view of a porous polishing pad including a supporting foam layer, according to an implementation of the present disclosure.

FIG. 9 is a schematic perspective sectional view of a porous polishing pad 900 including a backing layer 906. The porous polishing pad 900 includes a second polishing element 904 and a plurality of first polishing elements 902 protruding from the second polishing element 904. The porous polishing pad 900 may be similar to any of the porous polishing pads 200, 700, 800 described above, with the exception that the backing layer 906 is attached to the second polishing element 904. The backing layer 906 may provide a desired compressibility to the porous polishing pad 900. The backing layer 906 may also be used to alter the overall mechanical properties of the porous polishing pad 900 to achieve a desired hardness and/or have desired storage modulus E' and loss modulus E". The backing layer 906 may have a hardness value of less than 70 Shore A scale. In one implementation, the backing layer 906 may be formed from an open-cell or a closed-cell foam, such as polyurethane or polysiloxane (silicone), so that under pressure the cells collapse and the backing layer 906 compresses. In another implementation, the backing layer 906 may be formed from natural rubber, EPDM rubber (ethylene propylene diene monomer), nitrile, or neoprene (polychloroprene).

Although polishing pads described herein are circular in shape, polishing particles according to the present disclosure may include any suitable shape, such as polishing webs configured to move linearly during polishing.

The increased complexity of polishing pad designs that will be needed to polish the next generation IC devices greatly increases the manufacturing complexity of these polishing pads. There are non-additive manufacturing type processes and/or subtractive process that may be employed to manufacture some aspects of these complex pad designs. These processes may include multi-material injection molding and/or sequential step UV casting to form material layers from single discrete materials. These forming steps are then typically followed by machining and post processing using milling, grinding or laser ablation operations or other subtractive techniques.

Figure 10C:
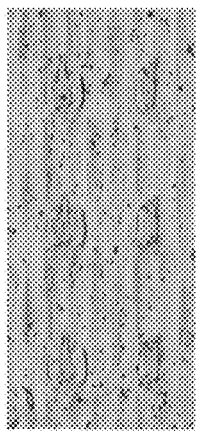
FIGS. 10A-10O depict SEM images of various implementations of porous pads formed according to implementations described herein.
Figure 10F:
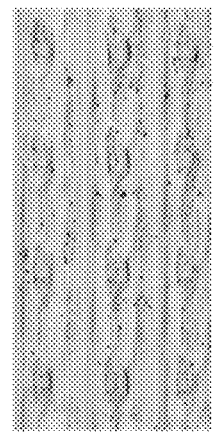
Figure 10I:
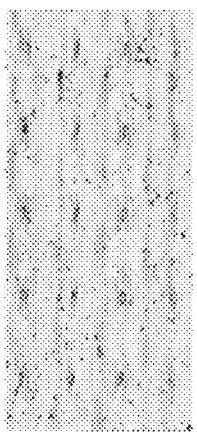
Figure 10B:
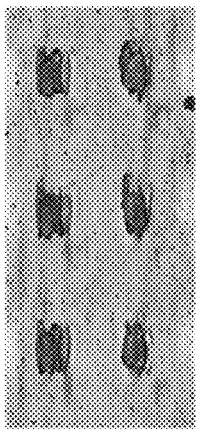
Figure 10E:
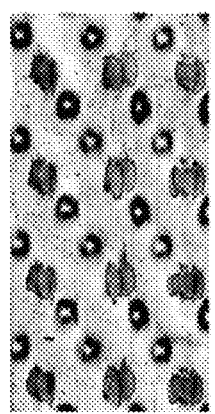
Figure 10H:
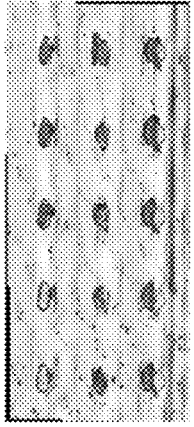
Figure 10A:
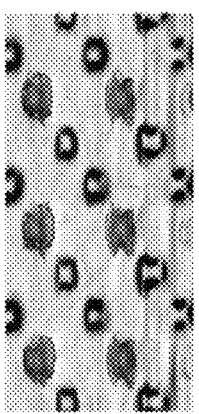
Figure 10D:
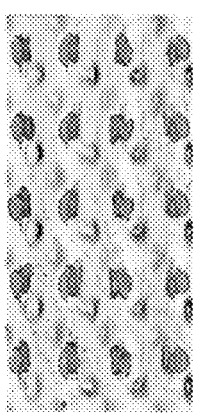
Figure 10G:
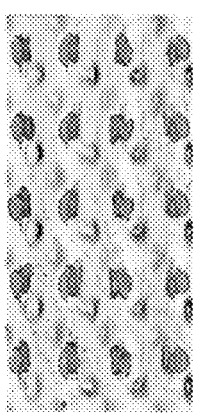
Figure 10J:
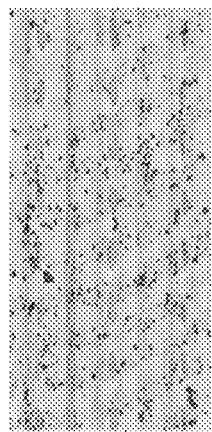
Figure 10K:
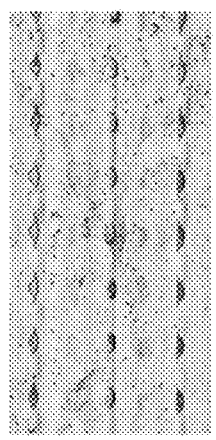
Figure 10L:
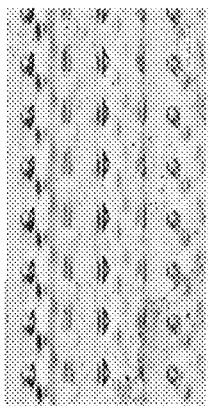
Figure 10M:
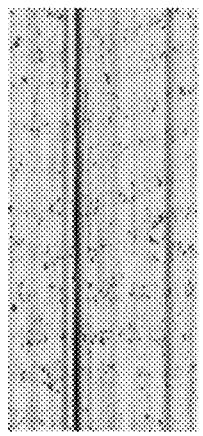
Figure 10N:
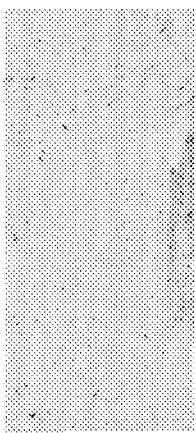
Figure 10O:
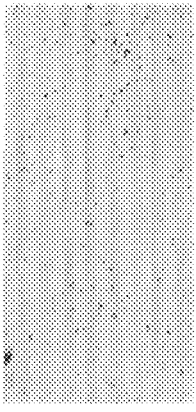

FIGS. 10A-10O depict SEM images of various implementations of porous pads formed according to implementations described herein. FIGS. 10A-10C depict SEM images for a porous pad formed using a 5×5 bitmap design. FIG. 10C depicts the formed porous pad containing the porosity-forming agent after deposition. FIG. 10B depicts the formed porous pad after exposure to a washing/rinsing process to remove the porosity-forming agent. FIG. 10A depicts the formed porous pad after exposure to both a washing/rinsing process and an anneal process to remove the porosity-forming agent.

FIGS. 10D-10F depict SEM images for a porous pad formed using a 4×4 bitmap design. FIG. 10F depicts the formed porous pad containing the porosity-forming agent after deposition. FIG. 10E depicts the formed porous pad after exposure to a washing/rinsing process to remove the porosity-forming agent. FIG. 10D depicts the formed porous pad after exposure to both a washing/rinsing process and an anneal process to remove the porosity-forming agent.

FIGS. 10G-10I depict SEM images for a porous pad formed using a 3×3 bitmap design. FIG. 10I depicts the formed porous pad containing the porosity-forming agent after deposition. FIG. 10H depicts the formed porous pad after exposure to a washing/rinsing process to remove the porosity-forming agent. FIG. 10G depicts the formed porous pad after exposure to both a washing/rinsing process and an anneal process to remove the porosity-forming agent.

FIGS. 10J-10L depict SEM images for a porous pad formed using a 2×2 bitmap design. FIG. 10L depicts the formed porous pad containing the porosity-forming agent after deposition. FIG. 10K depicts the formed porous pad after exposure to a washing/rinsing process to remove the porosity-forming agent. FIG. 10J depicts the formed porous pad after exposure to both a washing/rinsing process and an anneal process to remove the porosity-forming agent.

FIGS. 10M-10O depict SEM images for a porous pad formed using a 1×1 bitmap design. FIG. 10O depicts the formed porous pad containing the porosity-forming agent after deposition. FIG. 10N depicts the formed porous pad after exposure to a washing/rinsing process to remove the porosity-forming agent. FIG. 10M depicts the formed porous pad after exposure to both a washing/rinsing process and an anneal process to remove the porosity-forming agent.

Figure 11A:
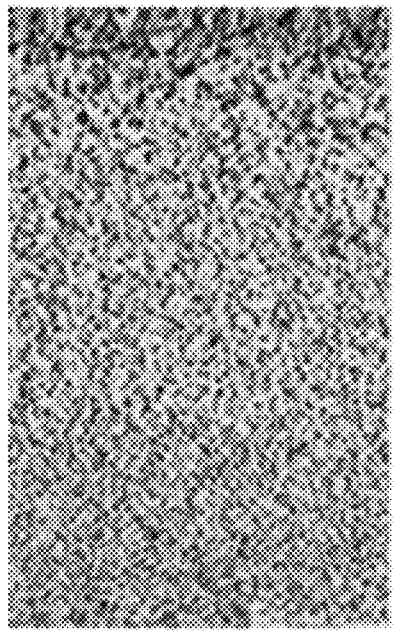
FIG. 11A-11B depict SEM images of surfaces of porous pads formed according to implementations described herein.
Figure 11B:
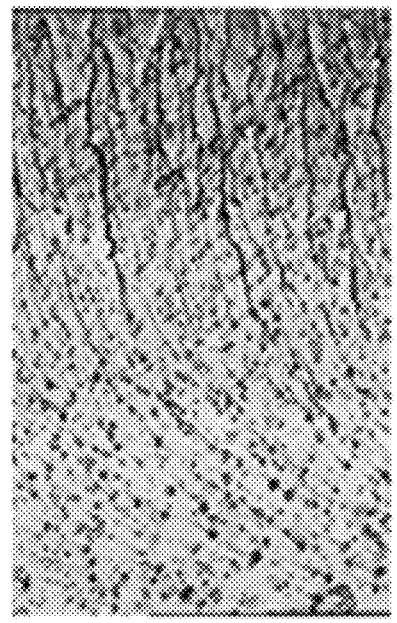

FIG. 11A-11B depict SEM images of surfaces of porous pads formed according to implementations described herein.

Figure 12:
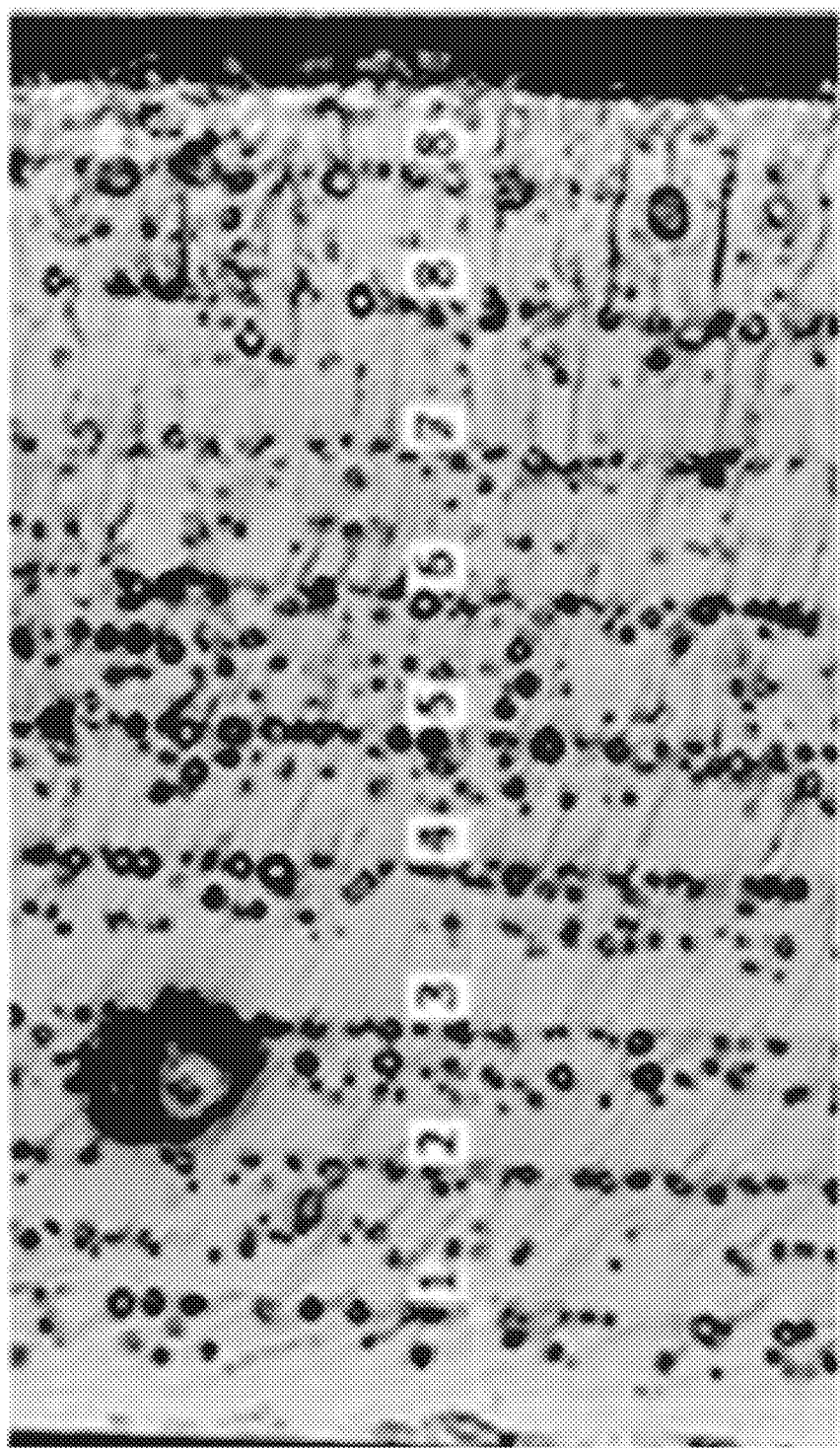
FIG. 12 depict SEM images of surfaces of porous pads formed according to implementations described herein.

FIG. 12 depict SEM images of surfaces of porous pads formed according to implementations described herein. In some implementations, as shown in FIG. 12, the majority of the pores form adjacent to the interface between the deposited layers.

Figure 13:
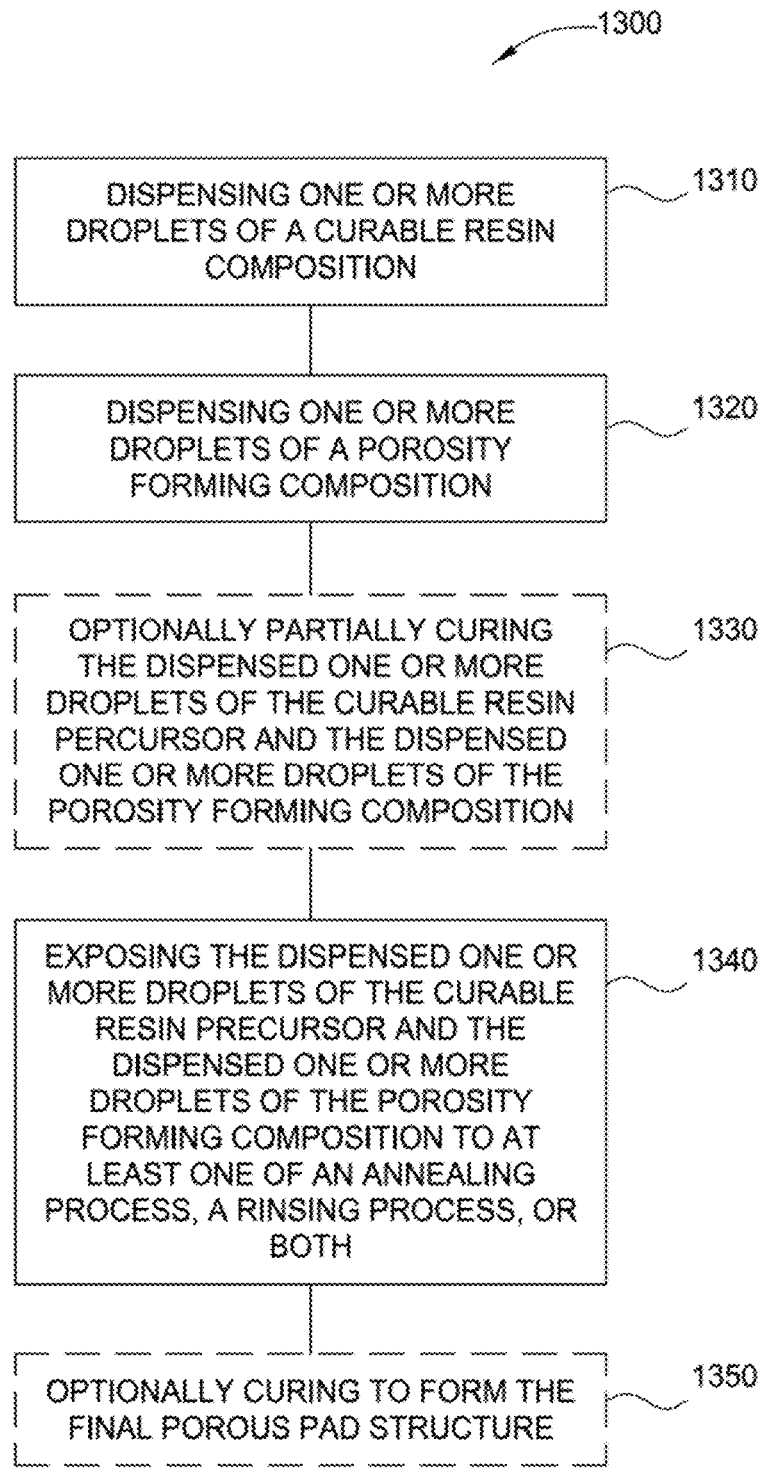
FIG. 13 is a flow chart depicting a method of forming a porous pad according to implementations described herein.

FIG. 13 is a flow chart depicting a method 1300 of forming a porous pad according to implementations described herein. At operation 1310, one or more droplets of a resin composition are dispensed. In one implementation, the one or more droplets of a resin composition are dispensed on a support if the one or more droplets constitute a first layer. In some implementations, the one or more droplets of a resin composition are dispensed on a previously deposited layer. At operation 1320, one or more droplets of a porosity-forming composition containing a porosity-forming agent are dispensed. In one implementation, the one or more droplets of the porosity-forming composition are dispensed on the support if the one or more droplets constitute a first layer. In some implementations, the one or more droplets of the porosity-forming composition are dispensed on a previously deposited layer. The dispensing processes of operation 1310 and operation 1320 are typically performed separately. Optionally, at operation 1330, the dispensed one or more droplets of the curable resin precursor and the dispensed one or more droplets of the porosity-forming composition are partially cured. Operations 1310, 1320, and 1330 may be repeated to form a 3-D relief. At operation 1340, the dispensed one or more droplets of the curable resin precursor and the dispensed one or more droplets of the porosity-forming composition are exposed to at least one of an annealing process, a rinsing process, or both to remove the porosity-forming agent. The rinsing process may include rinsing with water, another solvent such as alcohol (e.g., isopropanol) or both. The annealing process may include heating the deposited pad structure to a low temperature (e.g., about 100 degrees Celsius) under a low pressure to vaporize the porosity-forming agent. At operation 1350, an optional curing process is performed to form the final porous pad structure.

While the foregoing is directed to implementations of the present disclosure, other and further implementations of the disclosure may be devised without departing from the basic scope thereof, and the scope thereof is determined by the claims that follow.

The invention claimed is:

1. A method of forming a porous polishing pad, comprising:
 depositing a plurality of composite layers with a 3D printer to reach a target thickness, wherein depositing the plurality of composite layers comprises:
  dispensing one or more droplets of a curable resin precursor composition onto a support;
  dispensing one or more droplets of a porosity-forming composition onto the support, wherein at least one component of the porosity-forming composition is removable to form pores in the porous polishing pad; and
  exposing the dispensed one or more droplets of the curable resin precursor composition and the dispensed one or more droplets of the porosity-forming composition to at least one of an annealing process, a rinsing process, or both to remove the at least one component of the porosity-forming composition to form the pores in the porous polishing pad.

2. The method of claim 1, wherein the porosity-forming composition includes a porosity-forming agent selected from the group consisting of water, water-soluble inert materials, water-containing hydrophilic polymers, hydrophilic polymerizable monomers, and combinations thereof.

3. The method of claim 1, wherein the porosity-forming composition includes a porosity-forming agent selected from the group consisting of glycols, glycol-ethers, amines, and combinations thereof.

4. The method of claim 1, wherein the porosity-forming composition includes a porosity-forming agent selected from the group consisting of ethylene glycol, butanediol, dimer diol, propylene glycol-(1,2), propylene glycol-(1,3), octane-1,8-diol, neopentyl glycol, cyclohexane dimethanol (1,4-bis-hydroxymethylcyclohexane), 2-methyl-1,3-propane diol, glycerin, trimethylolpropane, hexanediol-(1,6), hexanetriol-(1,2,6), butanetriol-(1,2,4), trimethylolethane, pentaerythritol, quinitol, mannitol, sorbitol, methylglycoside, diethylene glycol, triethylene glycol, tetraethylene glycol, polyethylene glycols, dibutylene glycol, polybutylene glycols, ethylene glycol monobutyl ether (EGMBE), diethylene glycol monoethyl ether, ethanolamine, diethanolamine (DEA), triethanolamine (TEA), and combinations thereof.

5. The method of claim 1, wherein the porosity-forming composition includes diethylene glycol.

6. The method of claim 1, wherein the porosity-forming composition includes a water-containing hydrophilic polymer selected from the group consisting of polyvinyl alcohol, polyvinylpyrrolidone (PVP), polyvinyl methyl ether, and combinations thereof.

7. The method of claim 1, wherein the porosity-forming composition includes a porosity-forming agent selected from the group consisting of triethanolamine (TEA) surfactant, polyoxyethylene alkyl phenyl ether ammonium sulfates, polyoxyethylene alkyl phenyl ethers, anionic phosphate esters, and combinations thereof.

8. The method of claim 1, wherein the at least one component of the porosity-forming composition is vaporizable, soluble in water or soluble in another solvent.

9. The method of claim 1, further comprising partially curing the dispensed one or more droplets of the curable resin precursor composition and the dispensed one or more droplets of the porosity-forming composition prior to exposing the dispensed one or more droplets of the curable resin precursor composition and the dispensed one or more droplets of the porosity-forming composition to at least one of the annealing process, the rinsing process, or both.

10. A method of forming a porous polishing pad, comprising:
 depositing a plurality of composite layers with a 3D printer to reach a target thickness, wherein depositing the plurality of composite layers comprises:
  dispensing one or more droplets of a curable resin precursor composition onto a support, wherein the curable resin precursor composition comprises:
   a first resin precursor component that comprises a multifunctional acrylate oligomer;
   a second resin precursor component that comprises a multifunctional acrylate monomer;
   a surfactant; and
   a porosity-forming agent;
  exposing the one or more droplets of the curable resin precursor composition to electromagnetic radiation to at least partially cure the curable resin precursor composition; and
  repeating the dispensing and exposing to build a 3D-relief on the support; and
 solidifying the plurality of composite layers, wherein solidifying the plurality of composite layers comprises heating the 3D-relief to below a softening temperature of a polymer formed from the curable resin precursor composition to remove the porosity-forming agent.

11. The method of claim 10, wherein the curable resin precursor composition further comprises a curing agent that comprises a photoinitiator.

12. The method of claim 10, wherein the porosity-forming agent is present between 5 wt. % to about 30 wt. % of a total wt. % of the curable resin precursor composition.

13. The method of claim 12, wherein the porosity-forming agent is selected from the group of water, water-soluble inert materials, water-containing hydrophilic polymers, hydrophilic polymerizable monomers, and combinations thereof.

14. The method of claim 10, wherein the porosity-forming agent is selected from the group of glycols, glycol-ethers, amines, and combinations thereof.

15. The method of claim 10, wherein the porosity-forming agent is selected from the group of ethylene glycol, butanediol, dimer diol, propylene glycol-(1,2), propylene glycol-(1,3), octane-1,8-diol, neopentyl glycol, cyclohexane dimethanol (1,4-bis-hydroxymethylcyclohexane), 2-methyl-1,3-propane diol, glycerin, trimethylolpropane, hexanediol-(1,6), hexanetriol-(1,2,6), butanetriol-(1,2,4), trimethylolethane, pentaerythritol, quinitol, mannitol, sorbitol, methylglycoside, diethylene glycol, triethylene glycol, tetraethylene glycol, polyethylene glycols, dibutylene glycol, polybutylene glycols, ethylene glycol monobutyl ether (EGMBE), diethylene glycol monoethyl ether, ethanolamine, diethanolamine (DEA), triethanolamine (TEA), and combinations thereof.

16. The method of claim 10, wherein the porosity-forming agent is diethylene glycol.

17. The method of claim 10, wherein the porosity-forming agent is a water-containing hydrophilic polymer selected from the group of polyvinyl alcohol, polyvinylpyrrolidone (PVP), polyvinyl methyl ether, and combinations thereof.

18. The method of claim 10, wherein the porosity-forming agent is selected from the group of triethanolamine (TEA) surfactant, polyoxyethylene alkyl phenyl ether ammonium sulfates, polyoxyethylene alkyl phenyl ethers, anionic phosphate esters, and combinations thereof.

19. A method of forming a porous polishing pad, comprising:
depositing a plurality of composite layers with a 3D printer to reach a target thickness, wherein depositing the plurality of composite layers comprises:
dispensing one or more droplets of a curable resin precursor composition onto a support; and
dispensing one or more droplets of a porosity-forming composition onto the support, wherein at least one component of the porosity-forming composition is removable to form pores in the porous polishing pad, wherein the porosity-forming composition includes a porosity-forming agent selected from the group consisting of triethanolamine (TEA) surfactant, polyoxyethylene alkyl phenyl ether ammonium sulfates, polyoxyethylene alkyl phenyl ethers, anionic phosphate esters, and combinations thereof.

20. The method of claim 19, further comprising partially curing the dispensed one or more droplets of the curable resin precursor composition and the dispensed one or more droplets of the porosity-forming composition prior to exposing the dispensed one or more droplets of the curable resin precursor composition and the dispensed one or more droplets of the porosity-forming composition to at least one of an annealing process, a rinsing process, or both.

* * * * *